(12) United States Patent
Hosek et al.

(10) Patent No.: US 11,404,929 B2
(45) Date of Patent: *Aug. 2, 2022

(54) STRUCTURES UTILIZING A STRUCTURED MAGNETIC MATERIAL AND METHODS FOR MAKING

(71) Applicant: Persimmon Technologies, Corp., Wakefield, MA (US)

(72) Inventors: Martin Hosek, Lowell, MA (US); Sripati Sah, Wakefield, MA (US); Jayaraman Krishnasamy, Boxborough, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 272 days.

This patent is subject to a terminal disclaimer.

(21) Appl. No.: 16/741,111

(22) Filed: Jan. 13, 2020

(65) Prior Publication Data

US 2020/0153303 A1 May 14, 2020

Related U.S. Application Data

(63) Continuation of application No. 15/848,646, filed on Dec. 20, 2017, now Pat. No. 10,559,991, which is a
(Continued)

(51) Int. Cl.
*H02K 3/28* (2006.01)
*C23C 8/10* (2006.01)
(Continued)

(52) U.S. Cl.
CPC ............... *H02K 3/28* (2013.01); *B22F 1/16* (2022.01); *B22F 3/115* (2013.01); *C23C 4/06* (2013.01);
(Continued)

(58) Field of Classification Search
CPC .. H02K 3/28; H02K 3/46; H02K 1/12; H02K 1/22; H02K 1/182; H02K 21/12;
(Continued)

(56) References Cited

U.S. PATENT DOCUMENTS 4,441,043 A 4/1984 DeCesare .................. 310/46
4,748,361 A * 5/1988 Ohnishi ................. H02K 21/24
310/156.36

(Continued)

FOREIGN PATENT DOCUMENTS

CN 101142044 A 3/2008
DE 3128220 A1 2/1983
(Continued)

OTHER PUBLICATIONS

Cvetkovski, G. *Performance Improvement of PM Synchronous Motor by Using Soft Magnetic Composite Material Magnetics*, IEEE Transactions on (vol. 44, Issue 11) Publication Date Nov. 2008. pp. 3812-3815.
(Continued)

*Primary Examiner* — Michael Andrews
(74) *Attorney, Agent, or Firm* — Harring & Smith

(57) ABSTRACT

A motor comprises a stator comprising at least one core; a coil wound on the at least one core of the stator; a rotor having a rotor pole and being rotatably mounted relative to the stator; and at least one magnet disposed between the rotor and the stator. The at least one core comprises a composite material defined by iron-containing particles having an alumina layer disposed thereon.

18 Claims, 45 Drawing Sheets

Related U.S. Application Data continuation of application No. 14/501,668, filed on Sep. 30, 2014, now Pat. No. 9,887,598.

(60) Provisional application No. 61/941,644, filed on Feb. 19, 2014, provisional application No. 61/933,386, filed on Jan. 30, 2014, provisional application No. 61/920,043, filed on Dec. 23, 2013, provisional application No. 61/884,415, filed on Sep. 30, 2013.

(51) Int. Cl.
| | |
|---|---|
| *C23C 4/06* | (2016.01) |
| *C23C 8/02* | (2006.01) |
| *H01F 1/24* | (2006.01) |
| *H01F 41/02* | (2006.01) |
| *H02K 21/12* | (2006.01) |
| *H02K 21/16* | (2006.01) |
| *H02K 1/02* | (2006.01) |
| *B22F 3/115* | (2006.01) |
| *B22F 1/16* | (2022.01) |
| *H02K 1/12* | (2006.01) |
| *H02K 1/22* | (2006.01) |

(52) U.S. Cl.
CPC ............... *C23C 8/02* (2013.01); *C23C 8/10* (2013.01); *H01F 1/24* (2013.01); *H01F 41/0246* (2013.01); *H02K 1/02* (2013.01); *H02K 1/12* (2013.01); *H02K 1/22* (2013.01); *H02K 21/12* (2013.01); *H02K 21/16* (2013.01); *C22C 2202/02* (2013.01)

(58) Field of Classification Search
CPC . H02K 21/16; B22F 1/02; B22F 3/115; C23C 4/06; C23C 8/02; C23C 8/10; C23C 2202/02; H01F 1/24; H01F 41/0246
USPC ....................................................... 310/208
See application file for complete search history.

(56) References Cited

U.S. PATENT DOCUMENTS

| | | | | |
|---|---|---|---|---|
| 4,900,590 | A | 2/1990 | Ritsko et al. | |
| 5,102,620 | A | 4/1992 | Watson et al. | 420/469 |
| 5,225,004 | A | 7/1993 | O'Handley et al. | 148/101 |
| 5,266,098 | A | 11/1993 | Chun et al. | 75/335 |
| 5,350,628 | A * | 9/1994 | Kugimiya | H01F 1/24 360/110 |
| 5,834,865 | A | 11/1998 | Sugiura | 310/49 R |
| 5,898,253 | A | 4/1999 | El-Antably et al. | 310/261 |
| 5,936,325 | A | 8/1999 | Permuy | 310/162 |
| 5,942,828 | A | 8/1999 | Hill | |
| 5,952,756 | A | 9/1999 | Hsu et al. | 310/156 |
| 6,511,718 | B1 | 1/2003 | Paz de Araujo et al. | 427/576 |
| 6,661,151 | B2 | 12/2003 | Tan et al. | 310/263 |
| 6,700,271 | B2 | 3/2004 | Detela | 310/164 |
| 6,707,224 | B1 | 3/2004 | Petersen | 310/254 |
| 6,750,588 | B1 | 6/2004 | Gabrys | 310/268 |
| 6,762,525 | B1 | 7/2004 | Maslov et al. | 310/112 |
| 6,830,057 | B2 | 12/2004 | Dolechek et al. | 134/148 |
| 6,882,066 | B2 | 4/2005 | Kastinger | 310/49 R |
| 6,891,306 | B1 | 5/2005 | Soghomonian et al. | 310/218 |
| 6,919,543 | B2 | 7/2005 | Abbott et al. | 219/543 |
| 6,946,771 | B2 | 9/2005 | Cros et al. | 310/257 |
| 7,034,422 | B2 | 4/2006 | Ramu | 310/114 |
| 7,061,152 | B2 | 6/2006 | Petro et al. | 310/156.38 |
| 7,155,804 | B2 | 1/2007 | Calico | 29/596 |
| 7,205,697 | B2 | 4/2007 | Rhyu et al. | 310/257 |
| 7,208,787 | B2 | 4/2007 | Manabe | 257/295 |
| 7,557,480 | B2 | 7/2009 | Filatov | 310/90.5 |
| 7,579,744 | B2 | 8/2009 | Kato | |
| 7,635,932 | B2 | 12/2009 | Matin et al. | |
| 7,830,057 | B2 | 11/2010 | Gieras | 310/156.02 |
| 7,952,252 | B2 | 5/2011 | Kang et al. | 310/216.015 |
| 8,053,944 | B2 | 11/2011 | Calley et al. | 310/216.033 |
| 9,887,598 | B2 * | 2/2018 | Hosek | H01F 41/0246 |
| 10,559,991 | B2 * | 2/2020 | Hosek | H01F 41/0246 |
| 2003/0203205 | A1 | 10/2003 | Bi et al. | |
| 2004/0007790 | A1 | 1/2004 | Kato et al. | 264/13 |
| 2004/0150289 | A1 | 8/2004 | James | |
| 2005/0056347 | A1 | 3/2005 | Takaya et al. | 148/306 |
| 2005/0099080 | A1 | 5/2005 | Matsumoto | 310/156.26 |
| 2006/0013962 | A1 | 1/2006 | Fuller et al. | 427/446 |
| 2006/0038450 | A1 | 2/2006 | Matin et al. | |
| 2006/0087186 | A1 * | 4/2006 | Wasson | H02K 21/12 310/268 |
| 2006/0124464 | A1 | 6/2006 | Lemieux | 204/554 |
| 2006/0138890 | A1 | 6/2006 | Kato | |
| 2008/0029300 | A1 | 2/2008 | Harada et al. | 174/391 |
| 2008/0231409 | A1 | 9/2008 | Kugai et al. | 336/233 |
| 2008/0278022 | A1 | 11/2008 | Burch et al. | 310/156.38 |
| 2009/0001831 | A1 | 1/2009 | Cho et al. | 310/112 |
| 2009/0081066 | A1 | 3/2009 | Illston | |
| 2010/0040488 | A1 * | 2/2010 | Yukitake | H02K 1/02 310/44 |
| 2010/0109453 | A1 | 5/2010 | Calley et al. | |
| 2011/0163618 | A1 | 7/2011 | Kanazawa et al. | 310/46 |
| 2013/0000447 | A1 | 1/2013 | Hosek et al. | |
| 2013/0000860 | A1 | 1/2013 | Hosek et al. | 164/46 |
| 2013/0000861 | A1 | 1/2013 | Hosek et al. | 164/46 |
| 2013/0002085 | A1 | 1/2013 | Hosek et al. | 310/216.004 |
| 2013/0004359 | A1 | 1/2013 | Hosek | 419/29 |
| 2013/0292081 | A1 | 11/2013 | Hosek et al. | 164/46 |
| 2014/0009025 | A1 | 1/2014 | Hosek et al. | 310/156.48 |
| 2018/0123415 | A1 | 5/2018 | Hosek | |

FOREIGN PATENT DOCUMENTS

| | | |
|---|---|---|
| EP | 0 401 835 A1 | 6/1990 |
| EP | 1 235 324 A2 | 1/2002 |
| EP | 1 662 517 A1 | 9/2004 |
| EP | 2 113 984 A1 | 2/2008 |
| IE | 020538 | 2/2004 |
| JP | H-03278501 A | 12/1991 |
| JP | 06038421 A | 2/1994 |
| JP | 2007135392 A | 5/2007 |
| JP | 2008-301650 A | 12/2008 |
| KR | 10-2008-0018207 | 2/2008 |
| WO | WO-2013002840 A1 | 1/2013 |
| WO | WO-2013002841 A1 | 1/2013 |

OTHER PUBLICATIONS

Jack, A.G. *Combined Radial and Axial Permanent Magnet Motors Using Soft Magnetic Composites* Electrical Machines and Drives, 1999. Ninth International Conference on (Conf. Publ. No. 468), Meeting Date Sep. 1-Sep. 3, 1999. pp. 25-29.

Jack, A.G. *Permanent-Magnet Machines with Powdered Iron Cores and Prepressed Windings* Industry Applications, IEEE Transactions on (vol. 36 , Issue 4) Publication Date Jul./Aug. 2000. pp. 1077-1084.

S. Roy et al, "Nucleation Kinetics and Microstructure Evolution of Traveling ASTM F75 Droplets", Advanced Engineering Materials, vol. 12, No. 9, 2010, pp. 912-919.

G. Uozumi et al., "Properties of Soft Magnetic Composite with Evaporated MgO Insulation Coating for low iron loss", Materials Science Forum vols. 234-536, 2007, pp. 1361-1364.

J. Hur et al, "Development of High-efficiency 42V Cooling Fan Motor for Hybrid Electric Vehicle Applications", IEEE Vehicle Power and Propulsion Conference, Windsor, UK, 2006, whole document (6 pages).

Davis, J.R. (editor); "Cold Spray Process"; Handbook of Thermal Spray Technology; ASM International; Jan. 1, 2004; pp. 77-84.

Borisov, Y. et al.; "Electric and Magnetic Properties of Thermal Spray Coatings with an Amorphous Structure"; Proceedings of the 15$^{th}$ International Thermal Spray Conference; May 25-29, 1998; Nice, France; ASM International; whole document (5 pages).

Liu, W. et al.; "Highly stable alumina-coated iron nanocomposites synthesized by wet chemistry method"; Surface & Coatings Technology, 200 (2006); Jun. 4, 2005; pp. 5170-5174.

(56) References Cited

OTHER PUBLICATIONS

Hanson, T.C. et al.; "Independent Control of HVOF Particle Velocity and Temperature"; Journal of Thermal Spray Technology, vol. 11(1); Mar. 2002; pp. 75-85.

Cherigui, M. et al.; "Microstructure and magnetic properties of Fe—Si-based coatings produced by HVOF thermal spraying process"; Journal of Alloys and Compounds 427 (2007); Apr. 24, 2006; pp. 281-290.

Kolman, D. et al.; "Modeling of Oxidation During Plasma Spraying of Iron Particles"; Plasma Chemistry and Plasma Processing, vol. 22, No. 3; Sep. 2002; pp. 437-450.

Wank, J. et al.; "Nanocoating individual cohesive boron nitride particles in a fluidized bed by ALD"; Powder Technology 142 (2004); May 18, 2004; pp. 59-69.

Newbery, A.P. et al.; "Oxidation during electric arc spray forming of steel"; Journal of Materials Processing Technology 178 (2006); pp. 259-269.

Neiser, R.A. et al.; "Oxidation in Wire HVOF-Sprayed Steel"; Journal of Thermal Spray Technology, vol. 7(4); Dec. 1998; pp. 537-545.

Hoile, S. et al.; "Oxide formation in the Sprayform Tool Process"; Materials Science and Engineering A 383 (2004); pp. 50-57.

Ageorges, H. et al.; "Plasma spraying of stainless-steel particles coated with an alumina shell"; Thin Solid Films 370 (2000); pp. 213-222.

Sugaya, Y. et al.; "Soft Magnetic Properties of Nano-Structure-Controlled Magnetic Materials"; IEEE Transactions on Magnetics, vol. 31, No. 3; May 1995; whole document (3 pages).

Cherigui, M. et al.; "Studies of magnetic properties of iron-based coatings produced by a high-velocity oxy-fuel process"; Materials Chemistry and Physics 92 (2005); pp. 419-423.

Espie, G. et al.; "Study of metal particles oxidation during the atmospheric plasma spraying. Effect on the wettability of the liquid drops"; ISPC-14 Proceedings, vol. IV; 1999; pp. 2025-2030.

Brunckova, H. et al.; "The effect of iron phosphate, alumina and silica coatings on the morphology of carbonyl iron particles"; Surface and Interface Analysis 2010, 42; Dec. 7, 2009; pp. 13-20.

Shafrir, S.N. et al.; "Zirconia-Coated-Carbonyl-Iron-Particle-Based Magnetorheological Fluid for Polishing Optical Glasses and Ceramics"; LLE Review, vol. 120; Jul.-Sep. 2009; University of Rochester Laboratory for Laser Energetics; pp. 190-205.

\* cited by examiner

XZ PLANE

YZ PLANE

XY PLANE

PHASE DIAGRAMS OF Fe-10%Al ALLOY, (a) ISOPLETH OF Fe-10%Al-C SHOWING BCC STRUCTURE UP TO 1000C, (b) ISOPLETH OF Fe-10%Al-O SHOWING PREFERENCE FOR FORMATION OF $Al_2O_3$

PHASE DIAGRAMS OF Fe-Al-Si ALLOY, (a) ISOPLETH OF Fe-9%Al-Si ALLOY SHOWING BCC STRUCTURE UP TO 1400C, (b) ISOPLETH OF Fe-9%Al-1%Si-O SHOWING PREFERENCE FOR FORMATION OF $Al_2O_3$

STRUCTURES UTILIZING A STRUCTURED MAGNETIC MATERIAL AND METHODS FOR MAKING

CROSS REFERENCE TO RELATED APPLICATIONS

This application is a continuation of U.S. Ser. No. 15/848,646, filed Dec. 20, 2017, which is a continuation of U.S. Ser. No. 14/501,668, filed Sep. 30, 2014 (now U.S. Pat. No. 9,887,598), which claims the benefits of Provisional Patent Application No. 61/884,415 filed Sep. 30, 2013; Provisional Patent Application No. 61/920,043 filed Dec. 23, 2013; Provisional Patent Application No. 61/933,386 filed Jan. 30, 2014; and Provisional Patent Application No. 61/941,644 filed Feb. 19, 2014, the contents of which are hereby incorporated by reference in their entireties.

GOVERNMENT SUPPORT

This invention was made with Government support under SBIR Phase II Grant Number 1230458 awarded by the National Science Foundation. The Government has certain rights in this invention.

BACKGROUND

Technical Field

The exemplary and non-limiting embodiments disclosed herein relate generally to magnetic materials and structures incorporating such materials and, more particularly, to soft magnetic materials having properties favorable for use in energy efficient devices.

Brief Description of Prior Developments

Automated mechanical devices generally use electric motors to provide translational or rotational motion to the various moving elements of the devices. The electric motors used typically comprise rotating elements assembled with stationary elements. Magnets are located between the rotating and stationary elements. Coils are wound around soft iron cores on the stationary elements and are located proximate the magnets.

In operating an electric motor, an electric current is passed through the coils, and a magnetic field is generated, which acts upon the magnets. When the magnetic field acts upon the magnets, one side of the rotating element is pushed and an opposing side of the rotating element is pulled, which thereby causes the rotating element to rotate relative to the stationary element. Efficiency of the rotation is based at least in part on the characteristics of the materials used in the fabrication of the electric motor.

SUMMARY

The following summary is merely intended to be exemplary and is not intended to limit the scope of the claims.

In accordance with one aspect, one example of a motor comprises a stator comprising at least one core; a coil wound on the at least one core of the stator; a rotor having a rotor pole and being rotatably mounted relative to the stator; and at least one magnet disposed between the rotor and the stator. The at least one core comprises a composite material defined by iron-containing particles having an alumina layer disposed thereon.

In accordance with another aspect, another example of a motor comprises a slotless stator comprising at least one core formed of a soft magnetic composite material and coils disposed on the at least one core; a rotor rotatably mounted relative to the slotless stator; and at least one magnet mounted on the rotor between the rotor and the slotless stator. The soft magnetic composite material comprises particles of an iron-aluminum alloy having insulating outer surfaces comprising alumina.

In accordance with another aspect, an example of a slotless flux motor comprises a stator defined by a continuous surface at which at least one core is disposed and a winding disposed on the at least one core; a rotor having a rotor pole and being rotatably mounted in the stator; and at least one magnet mounted between the stator and the rotor pole. A conical air gap is defined between the stator and the at least one magnet, wherein the conical air gap allows flux flow along radial, axial, and circumferential directions of the motor. The at least one core comprises a soft magnetic composite material defined by iron particles encapsulated in alumina.

BRIEF DESCRIPTION OF THE DRAWINGS

The foregoing aspects and other features are explained in the following description, taken in connection with the accompanying drawings, wherein:

FIGS. 11 through 14A are perspective sectional views of other exemplary embodiments of a motor incorporating the soft magnetic material;

DETAILED DESCRIPTION OF EMBODIMENTS

Figure 1:
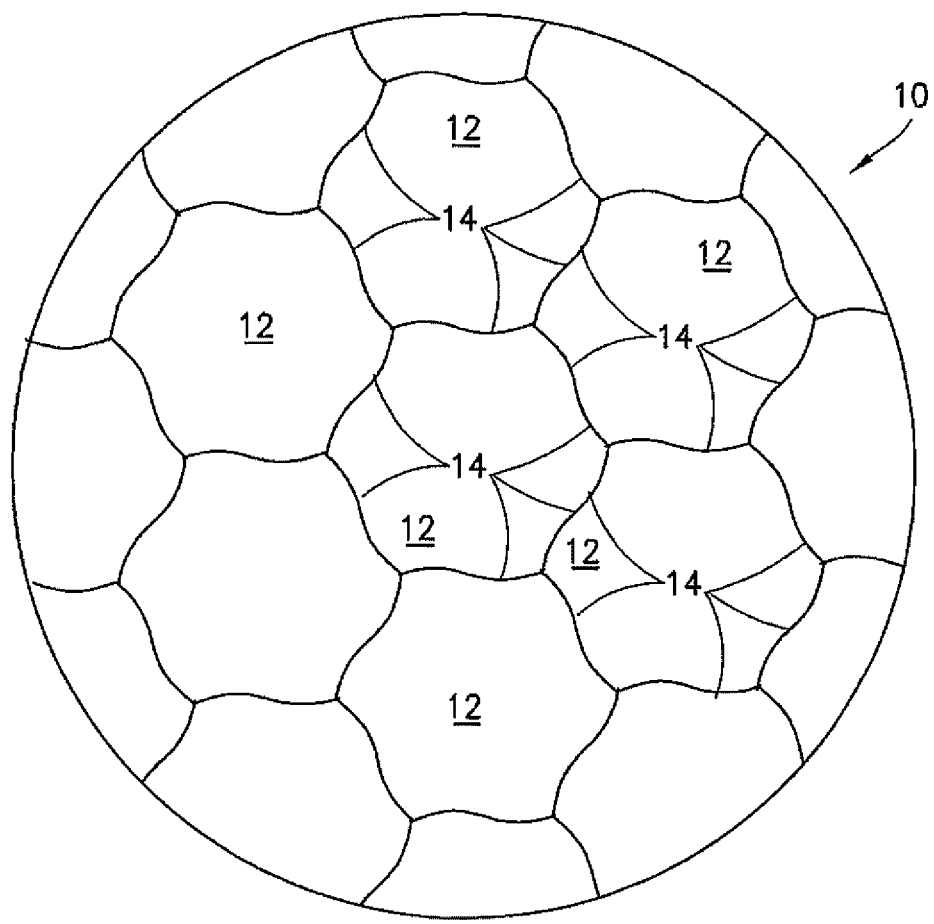
FIG. 1 is a schematic representation of one exemplary embodiment of a soft magnetic material having an aggregate microstructure of permeable micro-domains separated by insulation boundaries.

Referring to FIGS. 1 through 6D, exemplary embodiments of a soft magnetic material for electrical devices and components of electrical devices, as well as methods of making such materials and the electrical devices themselves, are disclosed. The soft magnetic material is designated generally by the reference number 10. Electrical devices with which such soft magnetic material 10 may be used include, but are not limited to, electric motors. Such electric motors may be used, for example, in robotic applications, industrial automation, HVAC systems, appliances, medical devices, and military and space exploration applications. Components with which such material may be used include, but are not limited to, electric motor winding cores or other suitable soft magnetic cores. Although the present invention will be described with reference to the embodiments shown in the drawings, it should be understood that the present invention may be embodied in many forms of alternative embodiments. In addition, any suitable size, shape, or type of materials or elements could be used.

Referring specifically to FIG. 1, the soft magnetic material 10 has a microstructure of suitable softness and mechanical strength and is formed as a bulk material via deposition of an alloying element in a reactive atmosphere to produce an aggregate of small micro-domains 12 of high permeability and low coercivity separated by insulation boundaries 14 that limit electrical conductivity between the micro-domains 12. Use of such bulk material in electrical devices allows for gains in performance and efficiency. For example, use of the soft magnetic material 10 in motor winding cores may provide an efficient magnetic path while minimizing losses associated with eddy currents induced in the winding cores due to rapid changes of magnetic fields as a motor in which the motor winding cores are mounted rotates. This allows for the substantial elimination of design constraints generally associated with the anisotropic laminated cores of conventional motors.

Figure 2A:
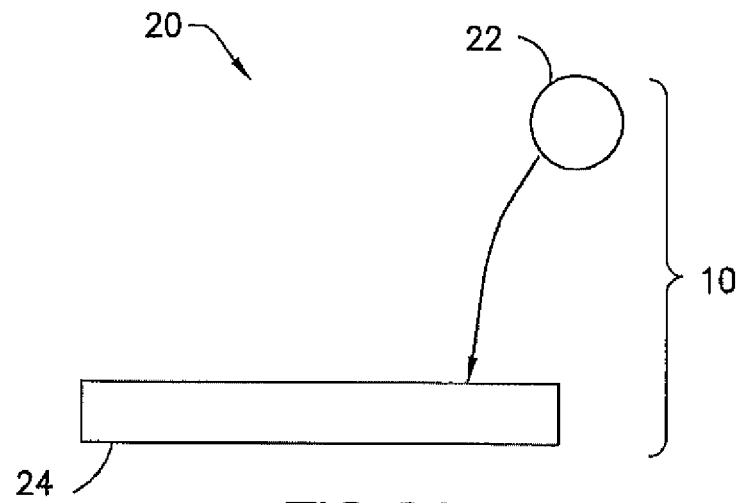
FIGS. 2A and 2B are schematic representations of a deposition process of an iron-aluminum alloy to form the soft magnetic material of FIG. 1.
Figure 2B:
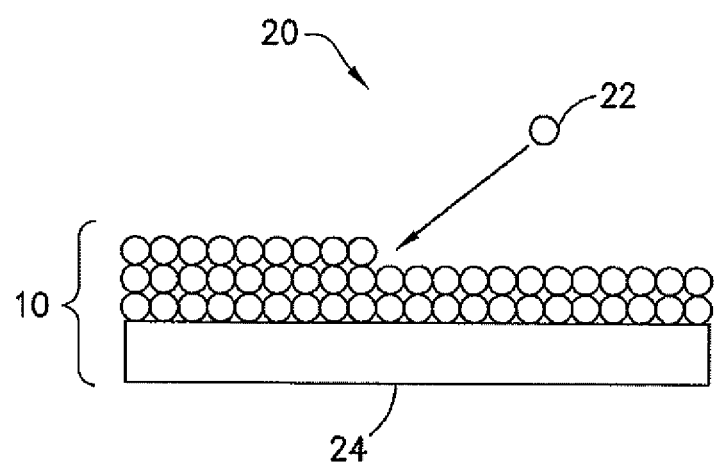

Referring to FIGS. 2A and 2B, a schematic representation of one exemplary embodiment of a deposition process to obtain the soft magnetic material 10 is designated generally by the reference number 20 and is hereinafter referred to as "deposition process 20." As shown in FIG. 2A of the deposition process 20, a particle 22 of the alloying element is deposited onto a substrate 24 using a single-step net-shape fabrication process based on metal spray techniques. To obtain the resulting soft magnetic material 10 as having the desired microstructure, various parameters pertaining to the state of alloy used are defined. With regard to a first exemplary parameter, the temperature of the particle 22 is sufficiently high enough to soften the material of the particle 22 while being below the melting point of the material. Thus, the particle 22 remains substantially a solid and maintains its overall aspect ratio upon impacting the surface of the substrate 24. More specifically, the particle 22 is in a semi-molten state while in flight. With regard to a second exemplary parameter, oxidation of the particle 22 is limited during the deposition process 20, which allows it to remain substantially metallic and to retain its mechanical strength and magnetic properties. With regard to a third parameter, the velocity of the particle 22 during the deposition process 20 may meet or exceed some minimum in-flight velocity that ensures adhesion of the particle 22 with previously deposited particles, thereby allowing for the buildup of a bulk of alloy to form the soft magnetic material 10 with sufficient mechanical strength, as shown in FIG. 2B. The foregoing parameters (as well as other parameters) may be met through the selection of a particle size range, chemical composition, and various process parameters of the deposition process 20. A system used to carry out the deposition process 20 may be a High Velocity Air Fuel (HVAF) system, a High Velocity Oxy-Fuel (HVOF) system, or a plasma spray system.

Commercially available alloying elements may be used as the particles 22. For example, the alloying element may be any suitable aluminum-based powder (e.g., FE-125-27, or the like), such as those available from Praxair Surface Technologies of Indianapolis, Ind. In one exemplary embodiment, the alloy may have a composition of 89% Fe-10% Al-0.25% C (all percentages being weight percent). Such an alloy has a melting point of about 1450 degrees C. and is suited to use in HVAF systems in which a carrier gas used to gas-atomize the alloy has a temperature of about 900 degrees C. to about 1200 degrees C. Such alloy is also suited for HVOF systems that operate at temperatures below about 1400 degrees C. Although the exemplary embodiments described herein are directed to an alloy having a composition of 89% Fe-10% Al-0.25% C, alloys of other compositions may be employed in other exemplary embodiments.

The alloy particles are generally spherical and capable of being gas-atomized, which renders them suitable for use as the particles 22 in the HVAF or HVOF systems as they can flow freely without forming clusters during the deposition process 20. Selection of the size of the alloy particles influences the particle velocity as well as the temperature of the alloy particles during the deposition process 20. In one exemplary embodiment using deposition via HVOF, alloy particles in the range of about 25 microns to about 45 microns may yield the desired particle temperatures and velocities.

Figure 3A:
FIGS. 3A through 3C are photographs of the microstructure of the soft magnetic material produced using various deposition techniques.

In the deposition process 20 using the HVAF system, the desired microstructure of the resulting soft magnetic material 10 may be produced as a bulk material by deposition of successive thin coatings. The HVAF system may use a focused particle beam and may have a deposition efficiency of about 80% or more. As shown in FIG. 3A, a cross-section of the microstructure of the soft magnetic material 10 illustrates the distinct micro-domains 12, where larger particles of the soft magnetic material 10 maintain their overall aspect ratio and are marked by the distinct boundaries 14.

Figure 3B:
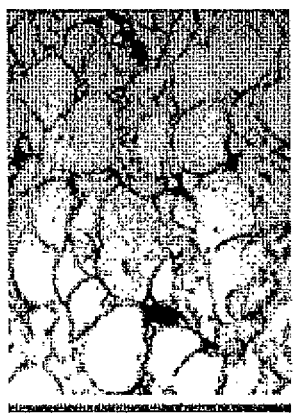

The deposition process 20 using the HVOF system may operate in a temperature range of about 1400 degrees C. to about 1600 degrees C. to produce the desired microstructure of the soft magnetic material 10 as shown in FIG. 3B. In the HVOF system, the soft magnetic material 10 may be produced using a low combustion temperature setting to provide deposited material as a thin coating. However, this low combustion temperature setting may be accompanied by lower velocities of the particles 22 impacting the substrate 24, thereby resulting in deposition efficiencies of less than 50%.

Figure 3C:
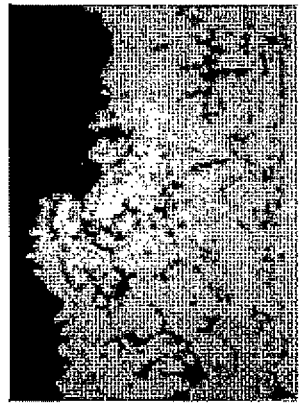

Referring to FIG. 3C, the desired microstructure of the soft magnetic material 10 may be produced using a low-energy plasma spray system. As can be seen, the distinction between the micro-domains 12 and larger particles may not be as readily discernible as in soft magnetic materials 10 produced using HVAF or HVOF systems.

In the deposition process 20 using any of the foregoing exemplary systems, the soft magnetic material 10 is formed by the thermal spraying of the alloy as particles 22 on the substrate 24. The sprayed particles 22 form a dense, closely-packed solid layer of material that is comprised of the densely-packed micro-domains 12 separated by the electrically insulating insulation boundaries 14. Furthermore, the sprayed particles 22 forming the solid layer of material may be subject to heat treatment at a temperature of about 1925 degrees F. for about 4 hours, then slow cooled to about 900 degrees F. (at a rate of about 100 F degrees per hour for about 10 hours), then further air cooled to about room temperature.

The alloying element may be defined by particles 22 having any of several various morphologies. In any morphology, the alloying element (impacting particles) comprises iron and aluminum, of which the aluminum oxidizes to form a protective layer of alumina (i.e., aluminum oxide) on the iron. The protective layer of alumina may completely surround the particle core, or the particle core may be less than fully covered due to the presence of imperfections or occlusions in the protective layer. Because alumina is more stable than any oxide of iron, a suitable concentration of aluminum in the alloy provides for sufficient amounts of alumina with no (or substantially no) iron oxide. In one example embodiment, the alloy is an Fe—Al alloy comprising 89% Fe-10% Al-0.25% C. The alloy is not limited in this regard, as any other suitable material may be used.

Figure 4A:
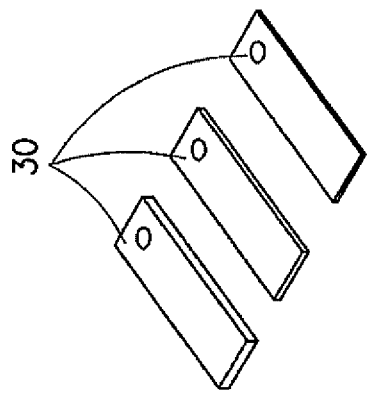
FIGS. 4A through 4C are photographs of structures fabricated using the soft magnetic material.
Figure 4B:
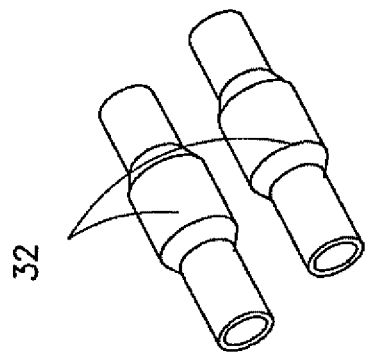
Figure 4C:
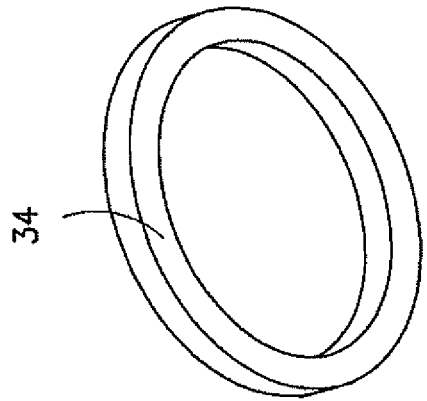

Referring to FIGS. 4A through 4C, using the deposition process 20, the soft magnetic material 10 may be used to produce ingots 30 (FIG. 4A), cylinders 32 (FIG. 4B), or any suitable structure that can be machined to produce ring-shaped parts 34 (FIG. 4C). The structures produced in the deposition process 20 (e.g., the cylinders 32, the ring-shaped parts, and the like) may be used as elements in the fabrication of motors and motor components.

Figure 5A:
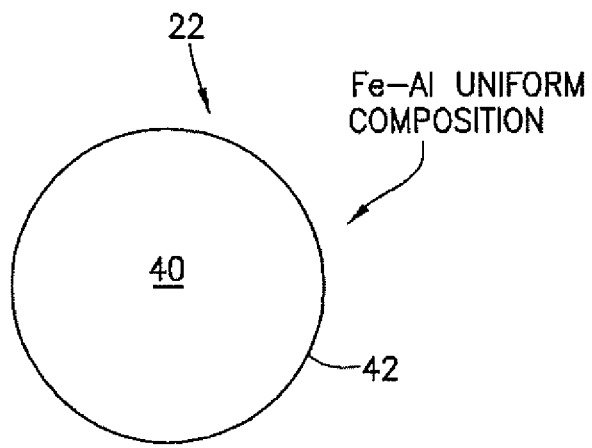
FIGS. 5A through 5D are schematic representations of various morphologies of the soft magnetic material.

In one exemplary morphology of the particle 22 used to form the soft magnetic material 10, as shown in FIG. 5A, the particle 22 has a uniform composition of Fe—Al alloy 40. Aluminum at the surface of the particle 22 reacts with the oxygen in the surrounding environment (which may be air or oxygen-enriched air) to form alumina, thus resulting in a Fe—Al alloy particle with a thin alumina layer 42 on an outer surface thereof. The aluminum concentration of the Fe—Al alloy 40 is selected to facilitate formation of a continuous alumina layer 42 while eliminating or at least minimizing the formation of iron-oxide. Because the rate of oxidation increases with temperature, the particles may be at an elevated temperature to increase the oxidation kinetics. Particle temperature is also raised to a sufficiently high temperature to soften it and to enable deformation necessary to form a densely packed structure. In order to form a densely packed solid, particles are accelerated to a sufficient speed prior to hitting the surface. In some embodiments, silicon may be added as an alloying element. In some compositions, silicon will improve magnetic properties and at the same time not impede the formation of alumina.

Figure 5C:
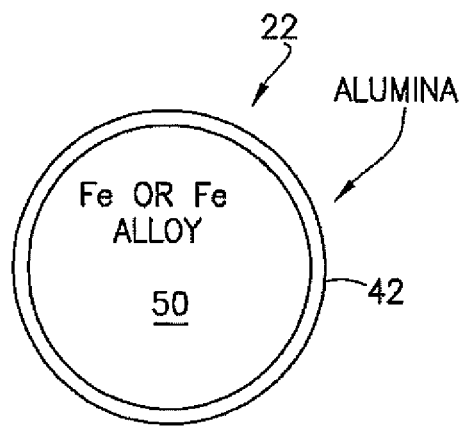
Figure 5B:
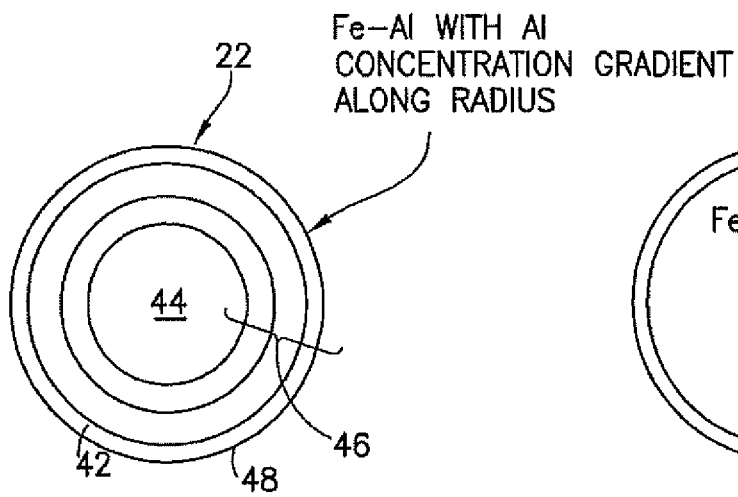

In another exemplary morphology of the particle 22 as shown in FIG. 5B, the particle 22 may be defined by a concentration gradient from the Fe—Al alloy 40 to the surface. Aluminum at the surface is formed by suitable concentrations of aluminum in the Fe—Al alloy. However, aluminum decreases the saturation flux density of iron. To maximize saturation flux density, the resulting particles have a pure iron core 44 and an increasing concentration 46 of aluminum from the iron core 44 to the particle surface 48. This morphology is achieved by deposition of a layer of aluminum on the particle and heat treatment to allow aluminum to diffuse into the particle to form an alloy with the varying concentration 46 of aluminum. The particles are heat treated in an inert environment to prevent oxidation of aluminum with the aluminum concentration being selected to facilitate the formation of the continuous alumina layer 42 along the surface 48 without (or at least substantially without) formation of iron oxide. The surrounding environment may be air or oxygen-enriched air, and since the rate of oxidation increases with temperature, the alloy particles may be at an elevated temperature to increase the oxidation kinetics. As with the previous embodiment, in order to form a densely packed solid, particles are accelerated to a sufficient speed prior to impacting the surface. Particle temperature is also raised to a sufficiently high temperature to soften the alloy material and to enable deformation necessary to form a densely packed structure. Furthermore, silicon may be added as an alloying element to, for example, improve magnetic properties while not impeding the formation of alumina.

In another exemplary morphology of the particle 22 as shown in FIG. 5C, a base particle 50 of iron or an iron alloy may be encapsulated in the alumina layer 42. These alumina-coated iron (or iron alloy) particles may be obtained through an atomic layer deposition (ALD) process, which involves depositing a thin layer of aluminum and exposing the layer to oxygen to allow the layer to oxidize, then successively depositing and oxidizing subsequent layers. Deposition processes are not limited to ALD, however, as any suitable process may be provided to form the alumina layer on the iron or iron alloy particles. Several such layers are deposited to arrive at the required thickness of the alumina layer 42. The base particle 50 could be pure iron or an alloy of iron that enhances magnetic properties, such as iron-cobalt, iron-nickel, iron-silicon, or the like. In order to form a densely packed solid, particles are accelerated to a sufficient speed prior to hitting the surface. During the deposition process 20, particle temperature is raised to a sufficiently high temperature to soften the particles and to enable deformation of the particles to form a densely packed structure. As with other embodiments, silicon may also be added as an alloying element to improve magnetic properties while avoiding or minimizing the formation of alumina. The addition of 1% silicon as an alloying element to the Fe—Al alloy having about 10 wt. % aluminum allows for the production of raw material with minimal carbon content (and possibly larger-sized particles).

Figure 5D:
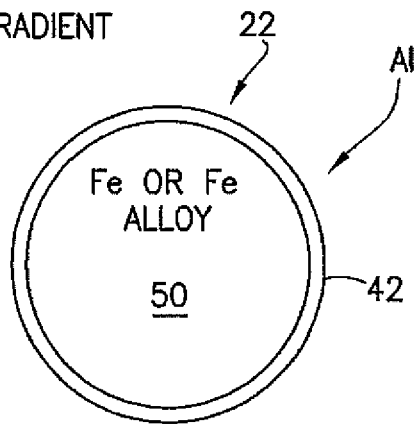

In another exemplary morphology of the particle 22 as shown in FIG. 5D, the base particle 50 comprises an iron or an iron alloy core that may be encapsulated in aluminum, which oxides to form the alumina layer 42 during the deposition process. The base particle 50 is, for example, pure iron or an alloy of iron that enhances magnetic properties (e.g., iron-cobalt, iron-nickel, iron-silicon, or the like). The surrounding environment may be air or oxygen-enriched air or an environment with a tightly controlled oxygen environment. As with previous embodiments, in order to form a densely packed solid, particles are accelerated to a sufficient speed prior to hitting the surface. During the deposition process 20, particle temperature is raised to a sufficiently high temperature to soften the particles and to enable deformation of the particles to form a densely packed structure. As with previous embodiments, silicon may also be added as an alloying element to improve magnetic properties while avoiding or minimizing the formation of alumina.

The electromagnetic properties of the resulting soft magnetic material 10 formed from any of the foregoing described morphologies of the particle 22 include, but are not limited to, saturation flux density, permeability, energy loss due to hysteresis, and energy loss due to eddy currents. A microstructure comprising densely packed micro-domains with suitable magnetic properties, each surrounded by thin insulating boundaries, provides such desired electro-magnetic properties. The magnetic properties of the micro-domains and the insulating properties of the boundaries are in turn functions of one or more physical and chemical properties such as alloy composition, lattice structure, oxidation thermodynamics, and kinetics.

With regard to lattice structure, an alloy comprising 89% Fe-10% Al has the same body-centered cubic (BCC) structure as iron. This lattice structure is associated with a high magnetic permeability and suitable magnetic properties. Furthermore, in the presence of 0.25% carbon, the alloy maintains its BCC structure up to a temperature of 1000 degrees C. The heat treatment enables the conversion of any face-centered cubic structure and martensitic structures present in the solid into BCC structure. The atomic fraction of aluminum in the alloy is about 20% and, therefore, the alloy has a saturation flux density that is about 20% lower than that of pure iron. In addition, the alloy is known to have an electrical resistivity greater than that of pure iron, resulting in lower eddy current losses.

Carbon in the range of about 0.25% may facilitate the gas atomization process during powder production. Below about 1000 degrees C., carbon is present as carbide precipitates that may affect magnetic properties by, for example, lowering initial permeability and increasing hysteresis loss.

A suitable stable oxide that forms when the alloy particle is in an oxidizing environment at the temperature range of about 1000 degrees C. to about 1500 degrees C. is alumina. The rate of formation and expected thickness of this oxide layer are determined by the oxidation kinetics of the alloy particles in the deposition environment. Elemental aluminum forms a 1-2 nanometer (nm) thick oxide layer, effectively blocking further oxidation. In addition, through oxidation kinetics simulations using software simulation packages, it was determined that pure iron particles, sized at 25-40 microns and at a temperature of about 1500 degrees C. develop a 500 nm thick oxide layer over the duration of their flight (which is estimated to be about 0.001 seconds using the deposition process 20 of any of the HVAF, HVOF, or plasma spray systems described herein). Therefore, the expected oxide layer around each particle is at least about 1 nm and up to about 500 nm in thickness.

Figure 6A:
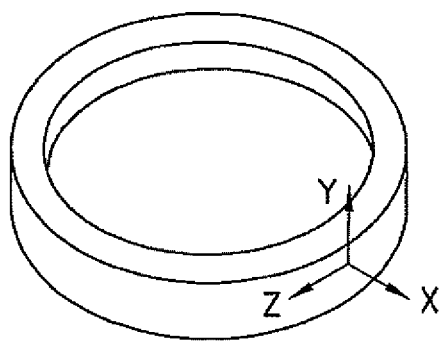
FIG. 6A is a schematic representation of a ring structure fabricated using the soft magnetic material.
Figure 6B:
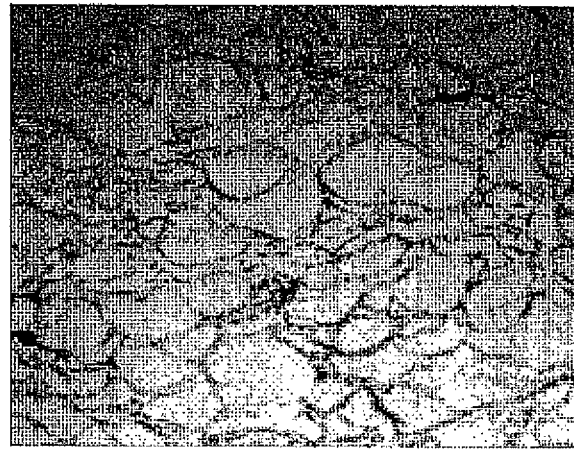
FIGS. 6B through 6D are photographs of the microstructure of the soft magnetic material illustrating isotropic characteristics in the XZ, YZ, and XY planes.
Figure 6C:
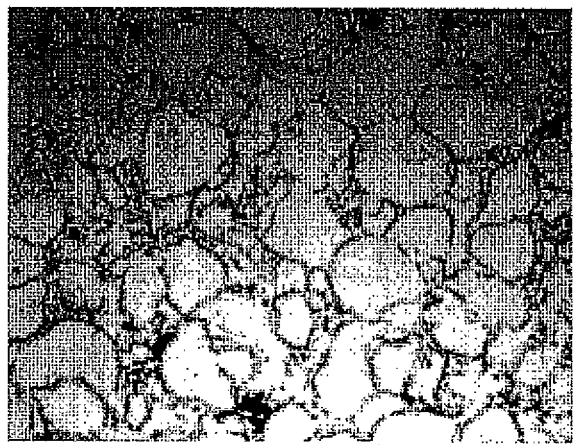
Figure 6D:
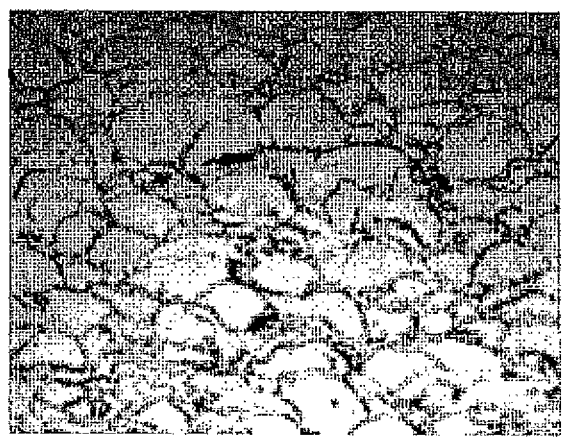

Referring now to FIGS. 6A through 6D, in any embodiment, it is desired to have isotropy in the magnetic properties of the sprayed samples. The isotropy allows for the use of the material in motors with 3-dimensional flow of magnetic flux. The magnetic properties measurable in the disclosed embodiments are measureable along the circumferential direction of a ring-shaped sample (as shown in FIG. 6A) per the ASTM A773 standard. Even though measurements along the other two orthogonal directions (axial and radial) may not be possible, the microstructure of the sample cross-section on the three orthogonal planes, shown in FIGS. 6B, 6C, and 6D and corresponding to views along the XZ plane, YZ plane, and XY plane, respectively, shows the degree of isotropy in the material. Even though the micro-domains are, to some extent, stretched along the circumferential direction as this is the direction normal to the direction of spray, they nevertheless exhibit a high degree of isotropy in their shape.

Referring to FIGS. 7 through 40 and 46, various exemplary embodiments of motors in which the soft magnetic material 10 may be incorporated are shown. The motors described are intended to be driven as three-phase brushless motors with sinusoidal commutation using position feedback from high resolution rotary encoders.

Figure 7:
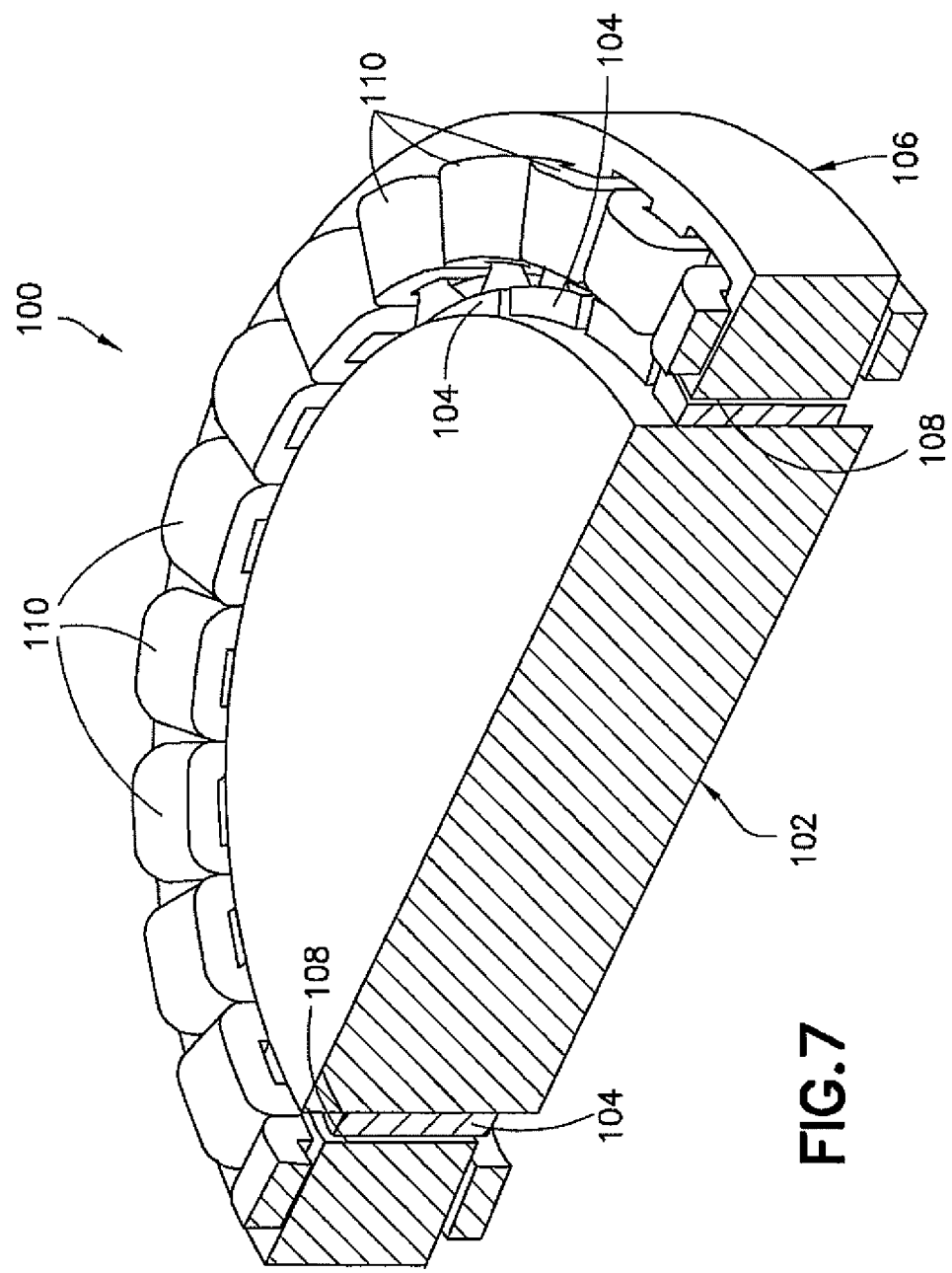
FIG. 7 is a perspective sectional view of one exemplary embodiment of a motor incorporating the soft magnetic material.

Referring specifically to FIG. 7, a permanent magnet motor where a flux flow is along a plane normal to an axis of rotation of the motor is shown generally at 100. The motor 100 has a rotor 102 of magnetic steel (or other suitable magnetic material) rotatably mounted in a stator 106. Magnets 104 are located on an outer radial surface of the rotor 102. The stator 106 has a laminated steel core with stator poles 108 defined along an inner edge of the stator 106 and windings or coils 110 located at each stator pole 108. The motor 100 may incorporate the soft magnetic material 10.

Figure 8:
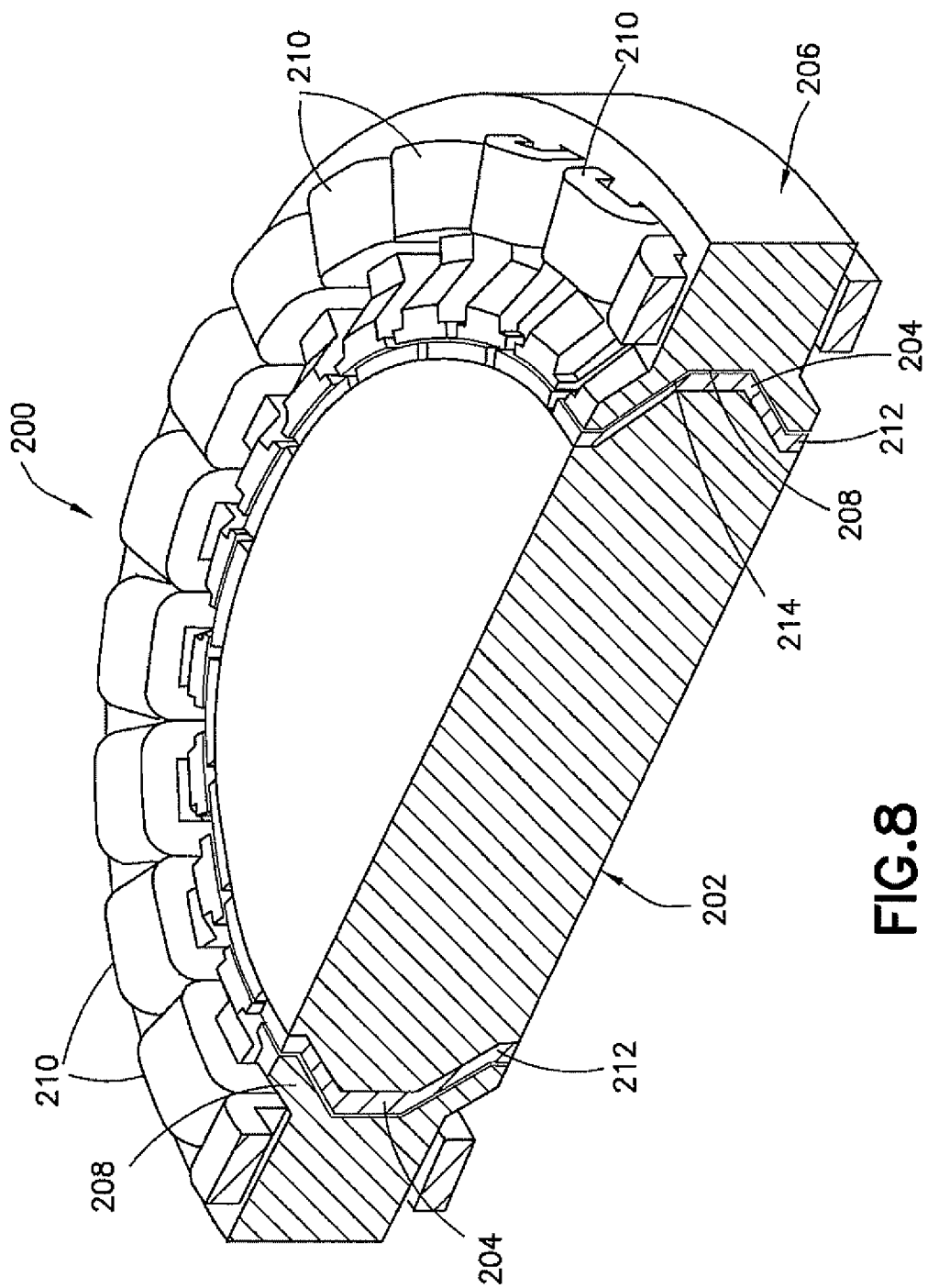
FIG. 8 is a perspective sectional view of another exemplary embodiment of a motor incorporating the soft magnetic material.

Referring to FIG. 8, the soft magnetic material 10 as described herein may be incorporated into an electric motor (e.g., as the stator or at least a portion of the stator). One exemplary embodiment of a flux motor incorporating the soft magnetic material 10 is designated generally by the reference number 200 and is hereinafter referred to as "motor 200." Motor 200 is a three-dimensional flux motor having a rotor 202 rotatably mounted in a stator 206. The rotor 202 may be configured as a shaft. A radially outer cylindrical surface of the rotor 202 defines a rotor pole 212, and an inner edge of the stator 206 defines a stator pole 208. The stator 206, along the stator pole 208, includes a plurality of slots which define cores around which coils 210 are disposed as individual windings. In alternate configurations, however, coils formed as distributed windings may be provided at the stator pole 208.

In the motor 200, magnets 204 are located at the rotor pole 212. The rotor pole 212 and the stator pole 208 in conjunction with the shapes of the magnets 204 direct magnetic flux between the rotor and the stator in directions that are outside of a single plane in three dimensions. The magnets 204 may have a radially outer cylindrical surface that abuts two conical surfaces and terminates with two smaller diameter cylindrical surfaces. The magnets 204 are shown as being unitary in shape. However, in alternate embodiments the magnets may comprise individual segments to form the shape. Similarly, the stator pole 208 is configured to approximate a Y-shaped cross-section that defines surfaces corresponding to the opposing surfaces on the magnets 204. The Y-shaped cross-section further allows flux flow along one or more of the radial, axial, and/or circumferential directions of the motor within the stator.

A conical air gap 214 between the magnets 204 and the stator pole 208 allows flux flow along the radial, axial, and circumferential directions of the motor 200. Because the rotor pole 212 is extended in the direction of the stator pole 208 and because the stator pole 208 is also extended in the direction of the rotor pole 212, a conical torque-producing area is defined in the conical air gap 214 between the rotor pole 212 and the stator pole 208, which results in a higher torque capacity when compared to the permanent magnet motor 100 as shown in FIG. 7. The larger conical torque-producing area defined by the conical air gap 214 more than offsets the marginally lower torque producing radius and a marginally lower coil space.

The rotor 202 and/or the stator 206 (or at least the core of the stator 206) may be made from the soft magnetic material 10 having a high saturation flux density, permeability, and low energy loss due to hysteresis and energy loss due to eddy currents. A microstructure comprising densely packed micro-domains with suitable magnetic properties, each surrounded by thin insulating boundaries may yield the desired electro-magnetic properties facilitating the use of a magnetic flux path in three dimensions as opposed to conventional motors that utilize a magnetic flux path that is one-dimensional, for example, a path in a plane. Similarly, the further disclosed embodiments may utilize such a material.

Figure 9:
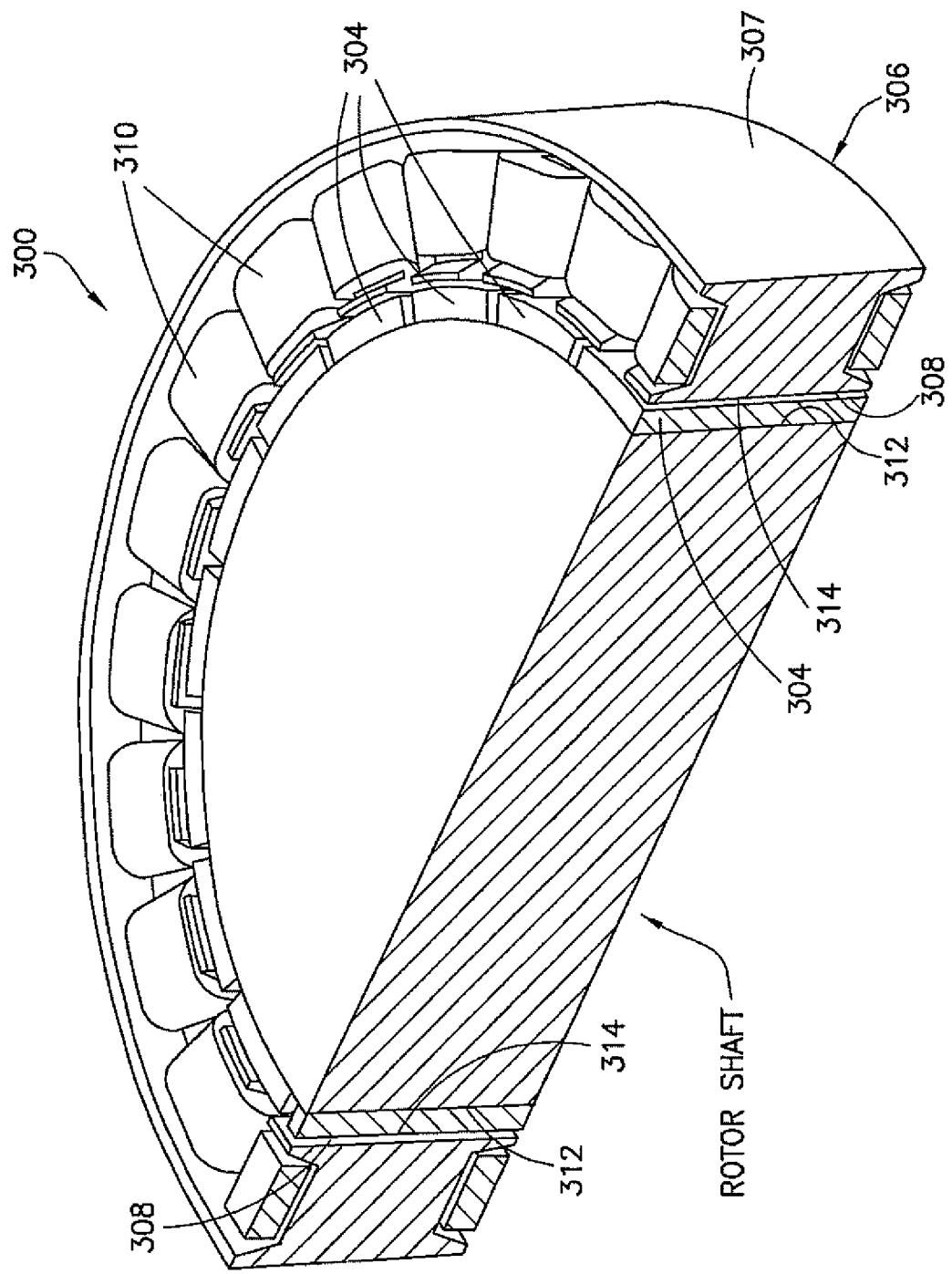
FIG. 9 is a perspective sectional view of another exemplary embodiment of a motor incorporating the soft magnetic material.

Referring now to FIG. 9, a variation of the three-dimensional flux motor with a cylindrical air gap is shown generally at 300. In motor 300, a rotor 312 is rotatably mounted in a stator 306 such that a rotor pole 312 faces a stator pole 308. The stator 306 (or at least the core thereof) may comprise the soft magnetic material 10. Magnets 304 are located on the rotor pole 312. A torque-producing area defined by a conical air gap 314 between the magnets 304 on the rotor pole 312 and the stator pole 308 is cylindrical and extended only along the axial direction. In addition, an outer wall 307 of the stator 306 is extended in the axial direction as well. This extension of the outer wall 307 allows for the use of a thinner stator wall without compromising the stator wall cross-sectional area available for flux flow. The extension of the outer wall 307 also provides for additional space for coils 310. Although the conical air gap 314 is cylindrical, due to the extended nature of the magnets 304 located on the rotor pole 312 and adjacent the stator pole 308, flux is directed in more than one plane, thereby resulting in a three-dimensional flux pattern.

Figure 10A:
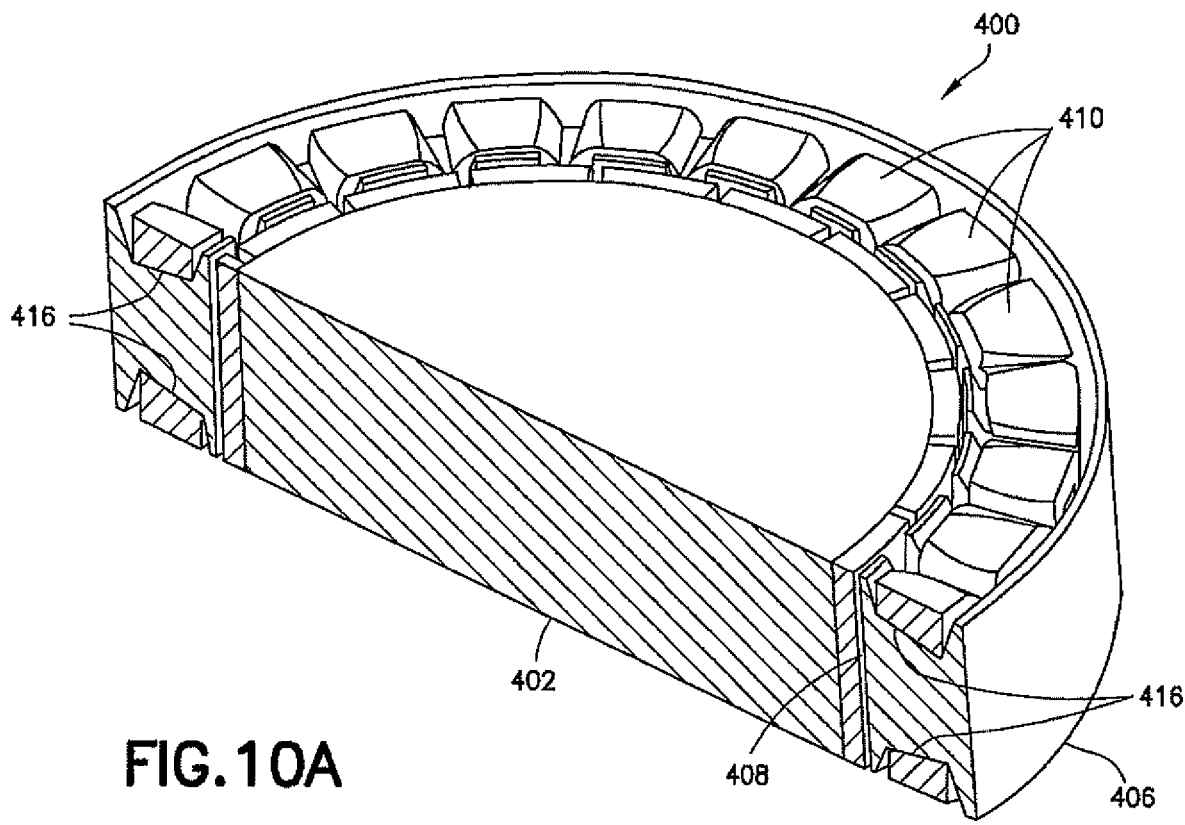
FIG. 10A is a perspective sectional view of another exemplary embodiment of a motor incorporating the soft magnetic material.
Figure 10B:
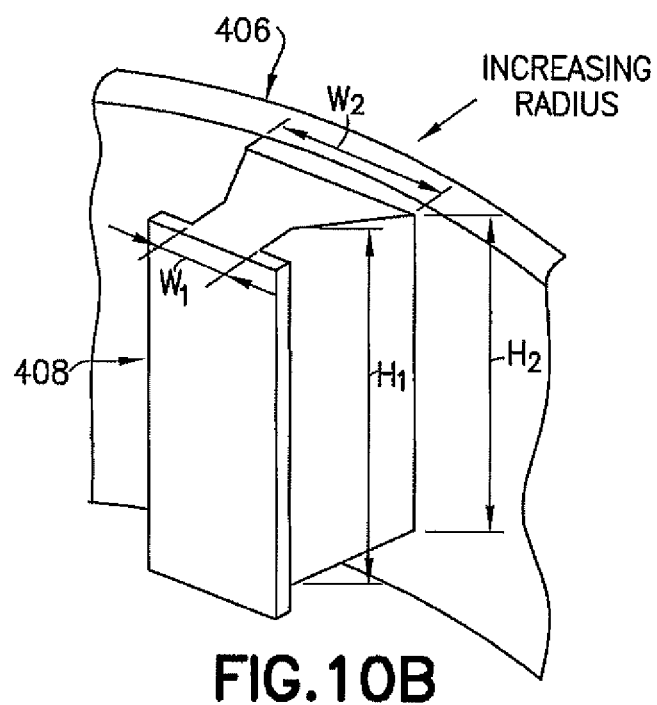
FIG. 10B is a perspective view of one exemplary embodiment of a stator pole of the motor of FIG. 10A.

Referring now to FIGS. 10A and 10B, another exemplary embodiment of a flux motor is shown generally at 400. As with previously disclosed embodiments, motor 400 comprises a rotor 402 rotatably located in a stator 406. The stator 406 includes a stator pole 408 and coils 410, the cross-sectional areas of each coil 410 being maximized by the cross-sectional areas of the stator pole 408 by both the coils 410 and the stator pole 408 being tapered along the radial direction. More specifically, the circumferential dimension of each of coil 410 is tapered along an interface 416 such that the circumferential dimension of each of coil 410 increases with radius, while the axial dimension of the stator pole 408 is tapered along the interface 416 such that the axial dimension of the stator pole 408 decreases with radius. Even though the examples disclosed herein depict permanent magnet motors, in alternate aspects any of the disclosed embodiments are applicable to variable reluctance motors (e.g., non-permanent magnetic poles) or any other suitable motor. The tapered stator pole 408 in combination with the extended stator pole faces facilitate magnetic flux between the stator 406 and rotor 402 in more than one plane.

Referring to FIG. 10B, one exemplary embodiment of the stator pole 408 illustrating a two-dimensional taper is shown. As can be seen, axial dimensions of the stator pole 408 decrease from a height $H_1$ to a height $H_2$ with increasing radius. In addition, a circumferential width of the stator pole 408 increases from a width $W_1$ to a width $W_2$ in the radial direction to preserve a "tooth area" of the cross-section of the stator pole 408. In one exemplary aspect, the cross-sectional area of the tapered portion of the stator pole 408 may be maintained constant such that the flux density within the stator pole 408 may be maintained across the section.

Figure 11:
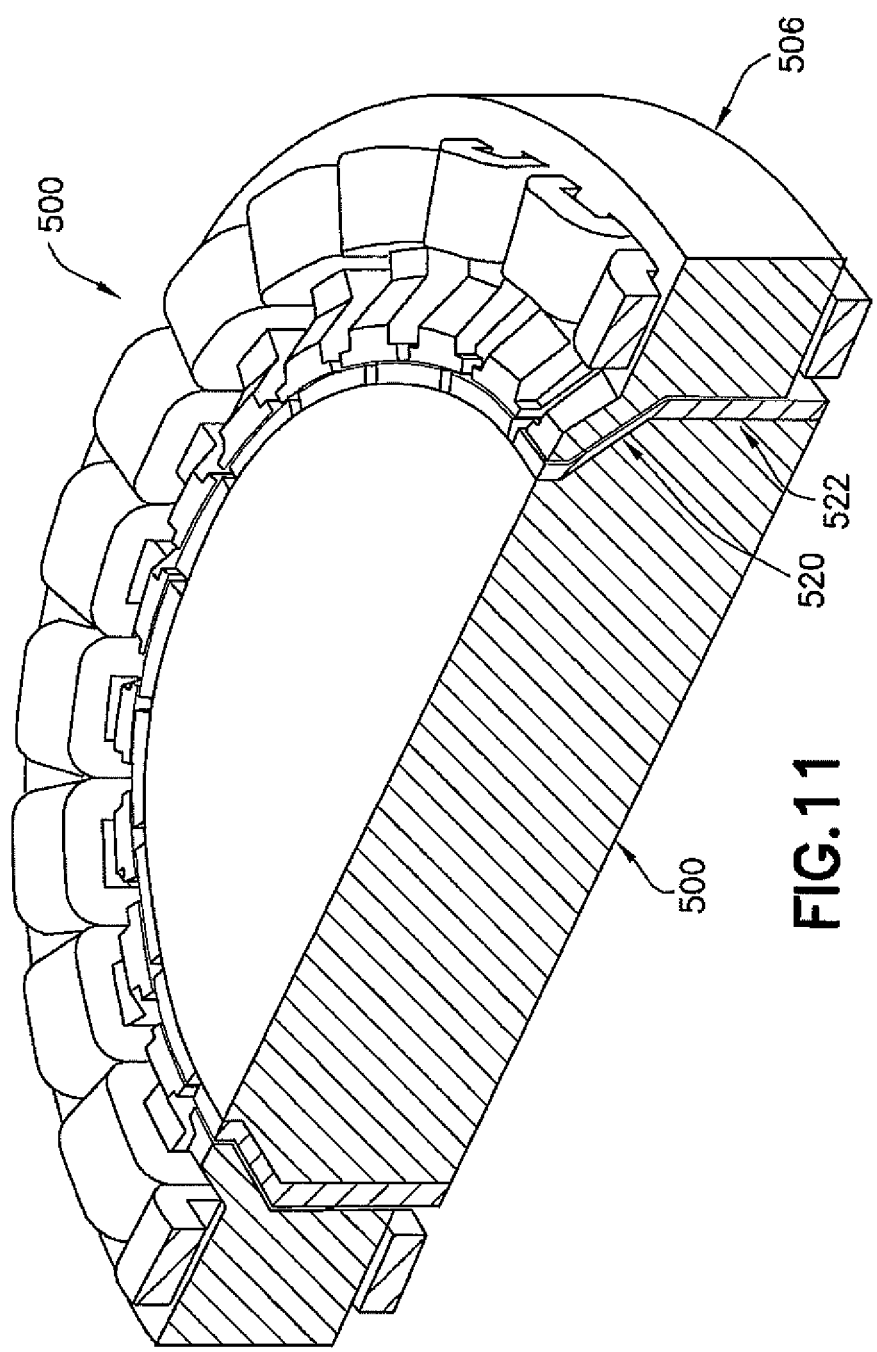

Referring now to FIG. 11, another exemplary variation of a motor is shown generally at 500. Motor 500 allows axial assembly of a rotor 502 and a stator 506. The embodiment is similar to that of FIG. 10A and FIG. 10B except that only one end is of the rotor 502 and the stator 506 is angled (along surface 520) while the other end is straight or cylindrical (along surface 522). The embodiment shown in FIG. 11 allows the rotor 502 to be axially assembled to the stator 506. In alternate embodiments, aspects of any of the disclosed embodiments may be combined in any suitable combination.

Figure 12:
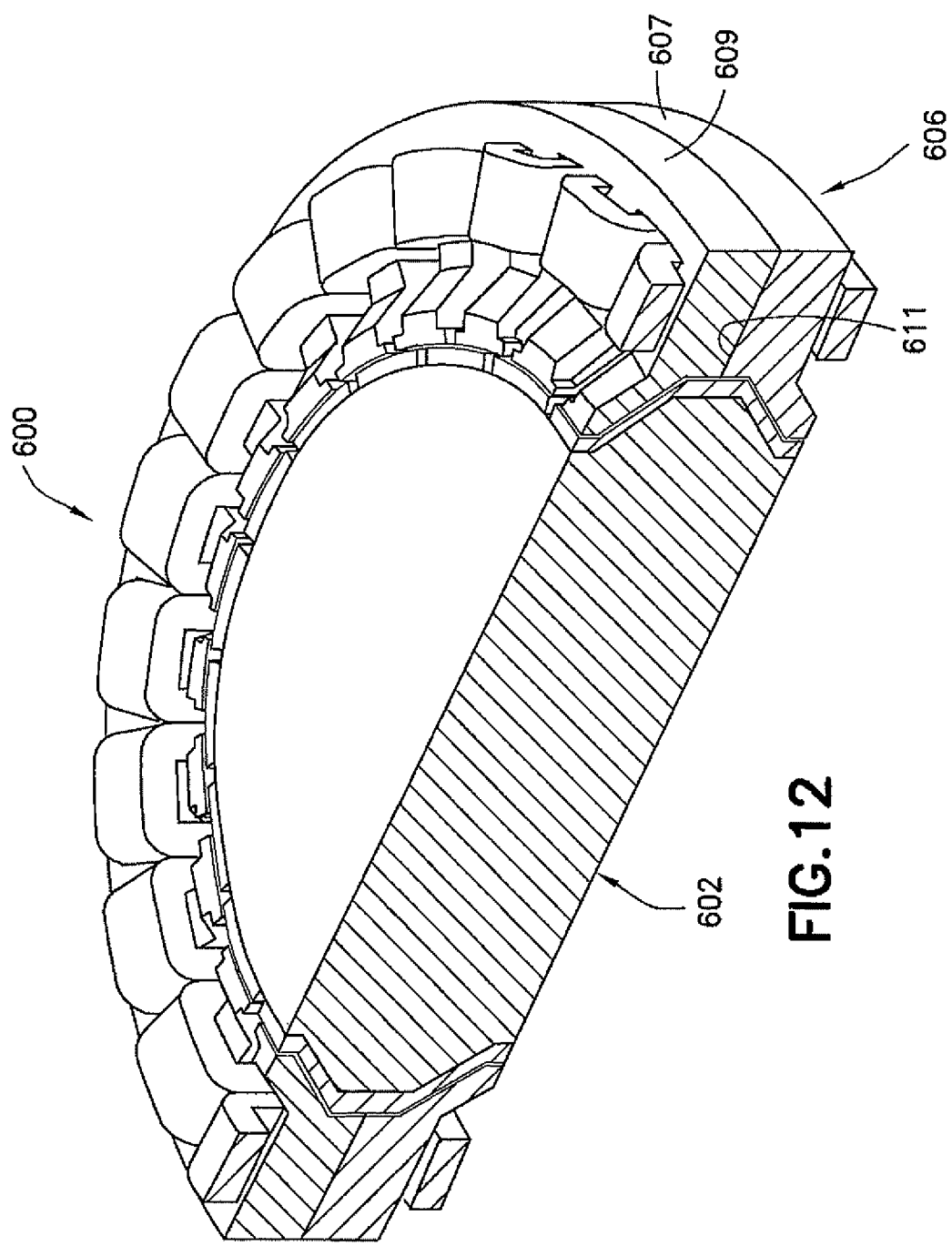

Referring now to FIG. 12, a motor 600 has a rotor 602 and a split stator 606 to facilitate assembly of the stator 606 about the rotor 602 prior to or after winding. As shown, motor 600 may have features similar to those illustrated above. However, the split stator 606 allows for the rotor 602 to be of a single unitary construction where a first stator portion 607 and a second stator portion 609 may be assembled circumferentially about the rotor 602, each of the two portions 607, 609 being joined at a separation line 611 that lies in a plane where the flux would be directed in a planar direction. Portions of the split stator 606 on opposing sides of the separation line 611 direct the flux between the rotor 602 and the split stator 606 in directions that include more than one plane resulting in a three-dimensional flux pattern.

Figure 13:
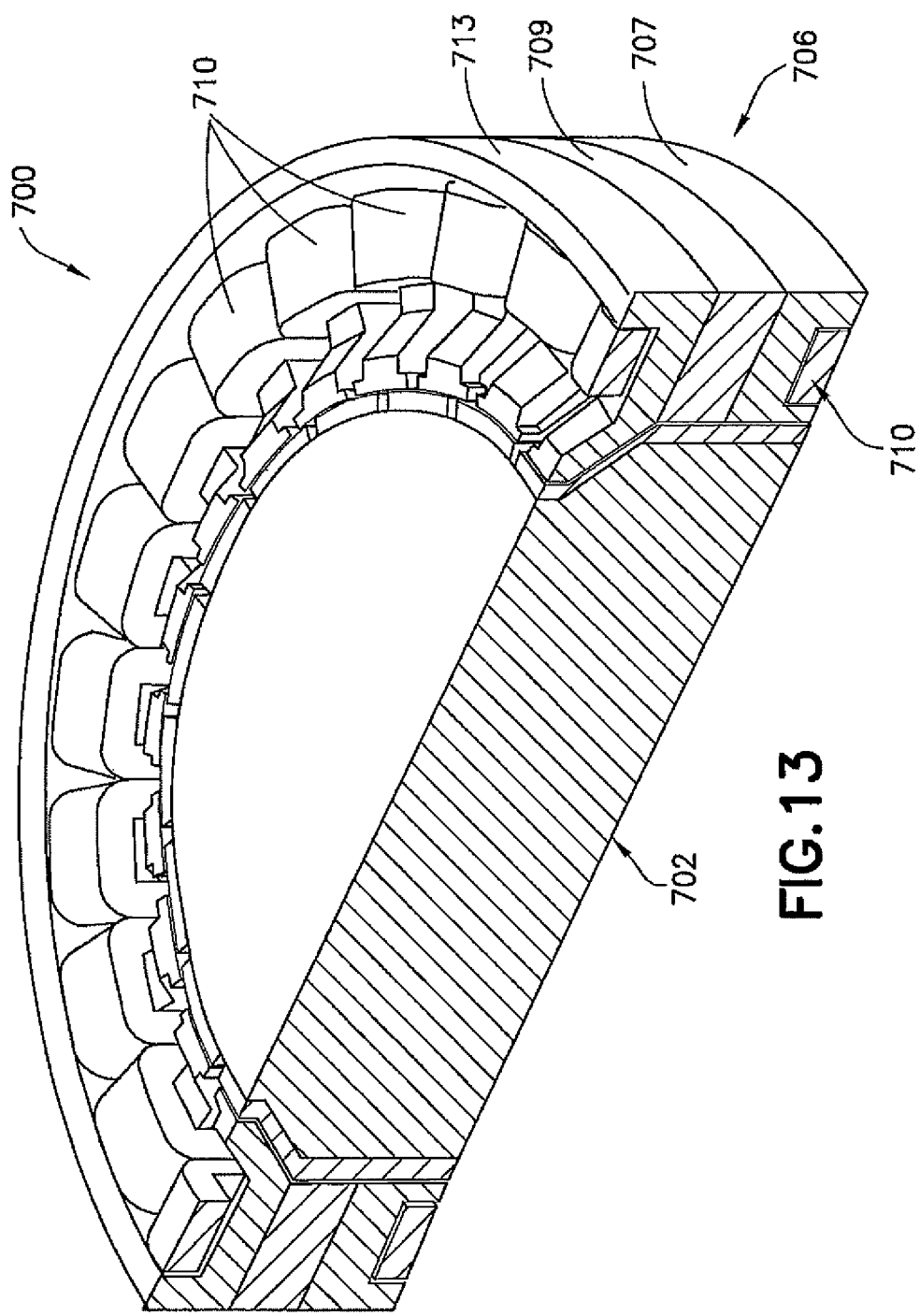

Referring now to FIG. 13, another exemplary embodiment of a motor 700 comprises a rotor 702 and a split stator 706 in which the split stator 706 is divided into three layers (an inner portion 707, a middle portion 709, and an outer portion 713) around which a coil 710 is wound. The middle portion 709 may be fabricated of a material (e.g., laminated steel or the like) that is different from the inner portion 707 and the outer portion 713. In the middle portion 709, the flux flow may be substantially planar substantially. The inner portion 707 and the outer portion 713 may be fabricated of materials that facilitate a three-dimensional flux flow.

Figure 14A:
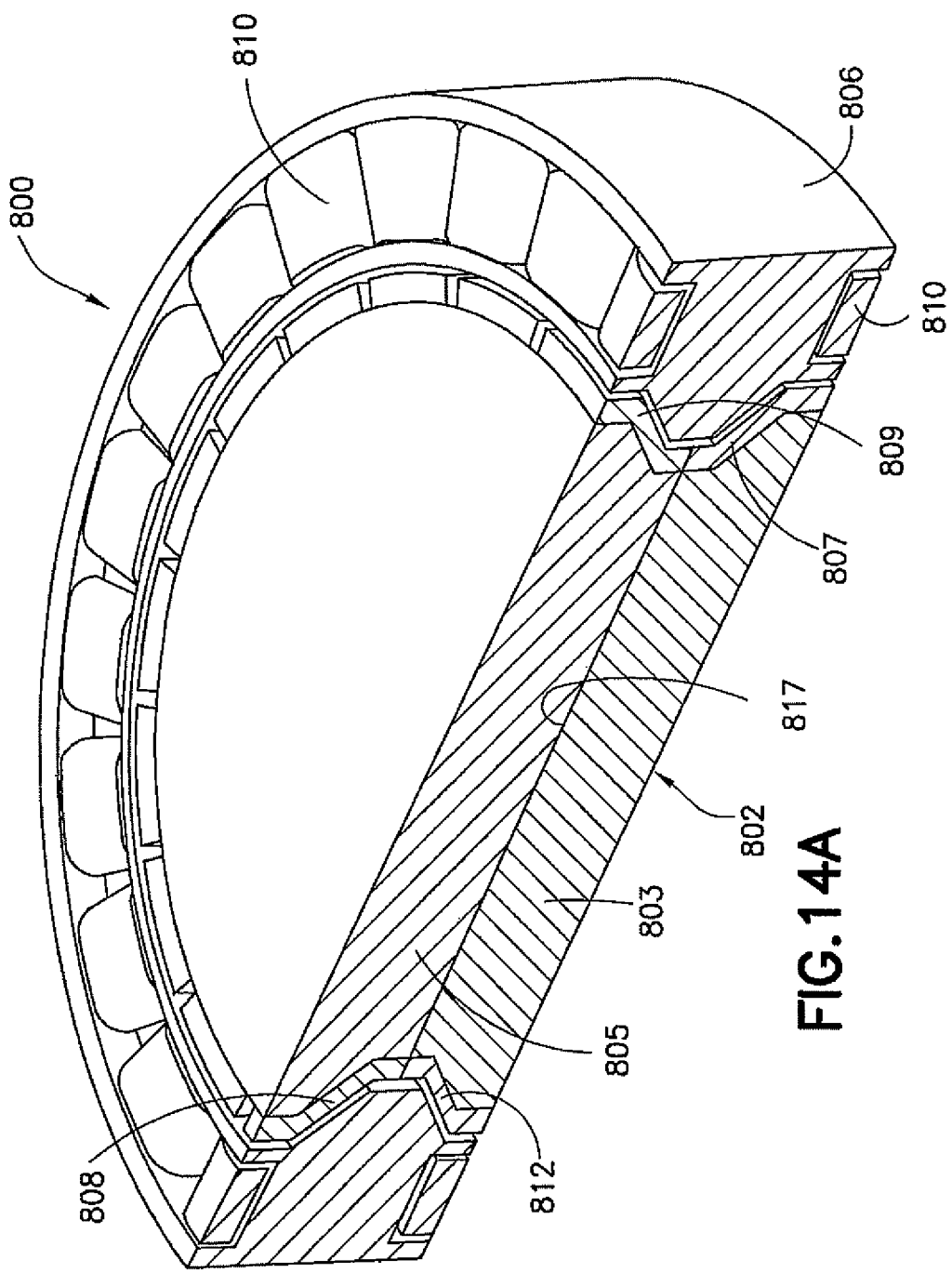
Figure 14B:
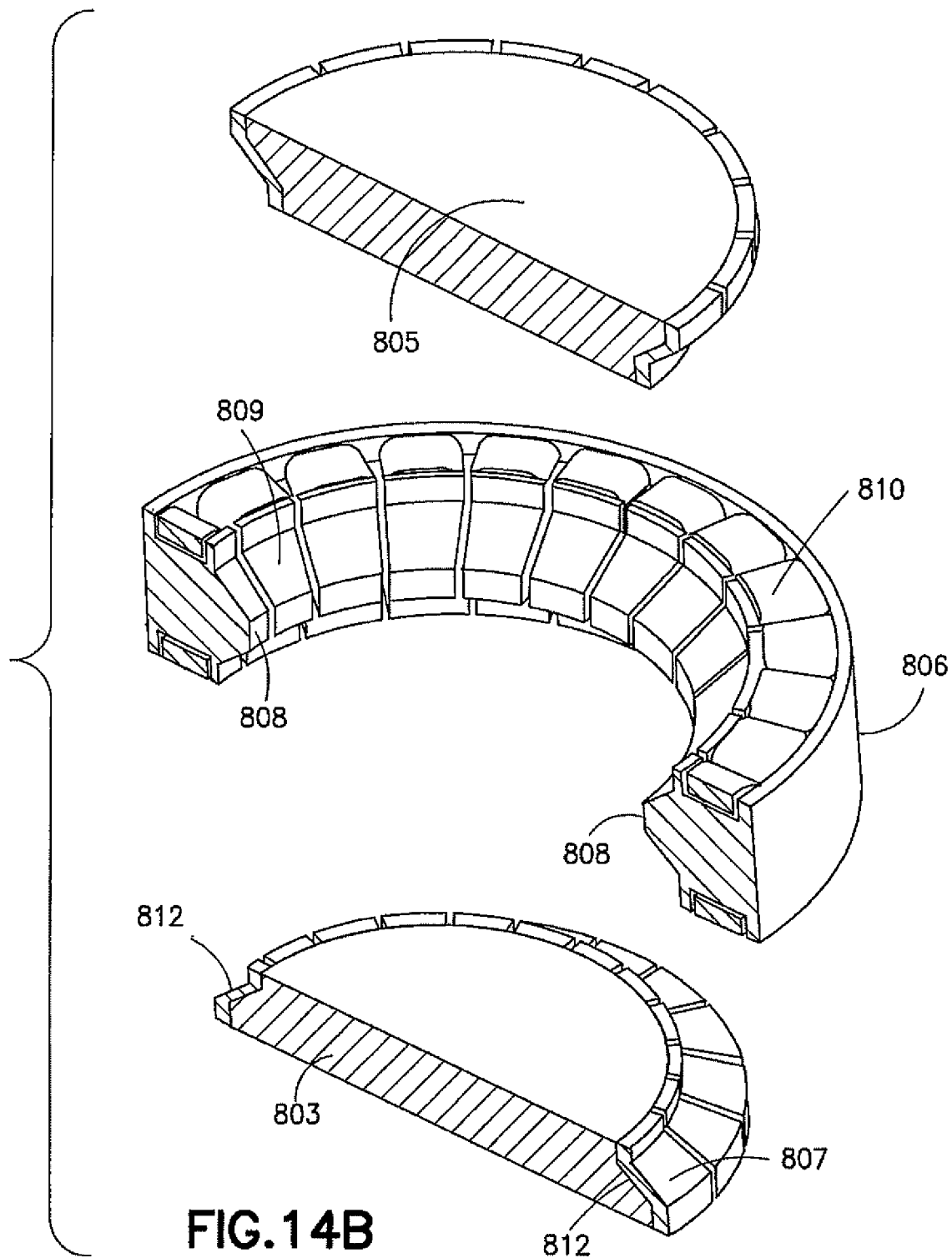
FIG. 14B is an exploded perspective sectional view of the motor of FIG. 14A.

As shown in FIGS. 14A and 14B, another exemplary embodiment of a motor 800 comprises a split concave rotor 802 having first and second rotor portions 803, 805 each with respective magnets 807, 809, each of the first and second rotor portions 803, 805 being axially assembled into a stator 806. The split configuration of the rotor 802 allows for the stator 806 to be of a single unitary construction such that the first and second rotor portions 803, 805 of the rotor 802 may be assembled about the stator 806, for example, after winding the coils 810. A separation line 817 lies in a plane where the flux would be directed in a planar direction. Portions of the rotor 802 on opposing sides of the separation line 817 direct flux between the rotor 802 and the stator 806 in directions that include more than one plane, thereby resulting in a three-dimensional flux pattern. In alternate aspects, the stator 806 could also be split into two or more layers. For example, in a stator 806 split into three portions, a middle portion may be made of laminated steel, for example, as previously disclosed. Motor 800 allows flux flow along the radial, axial, and circumferential directions. Because the motor 800 has stator poles 808 and rotor poles 812 that extend in radial directions, there is an additional conical torque producing air gap area that results in a higher torque capacity, when compared with a conventional motor. Here, the larger torque producing area more than offsets the marginally lower torque producing radius and a marginally lower coil space. As in each of the previously-disclosed embodiments, the rotor 802 and/or stator 806 may be made from the soft magnetic material 10 having a high saturation flux density, permeability, and low energy loss due to hysteresis and energy loss due to eddy currents. A microstructure of the soft magnetic material 10 comprising the densely packed micro-domains with suitable magnetic properties, each surrounded by thin insulating boundaries may yield desired electro-magnetic properties facilitating the use of a magnetic flux path in three dimensions as opposed to conventional motors that utilize a magnetic flux path that is one-dimensional, for example, a path in a plane. Similarly, the further disclosed embodiments may utilize such a material. In alternate embodiments, aspects of any of the disclosed embodiments may be combined in any suitable combination.

Still referring to FIGS. 14A and 14B, the magnets 807, 809 are shown at the rotor poles 812 having two radially outer cylindrical surfaces that abut two conical surfaces of each respective rotor portion 803, 805 and terminate with two smaller diameter cylindrical surfaces. The magnets 807, 809 are shown as being unitary in this shape but alternately may be made of segments to form the shape. The stator pole 808 has similarly shaped surfaces corresponding to the opposing surfaces on the magnets 803, 805. The pole shapes in combination with the magnet shapes direct magnetic flux between the rotor 802 and the stator 806 in directions that are outside of a single plane in three dimensions. The coils 810 shown are shown as individual windings wrapped about individual stator poles 808. In alternate aspects, the coils 810 may comprise distributed windings.

Figure 15A:
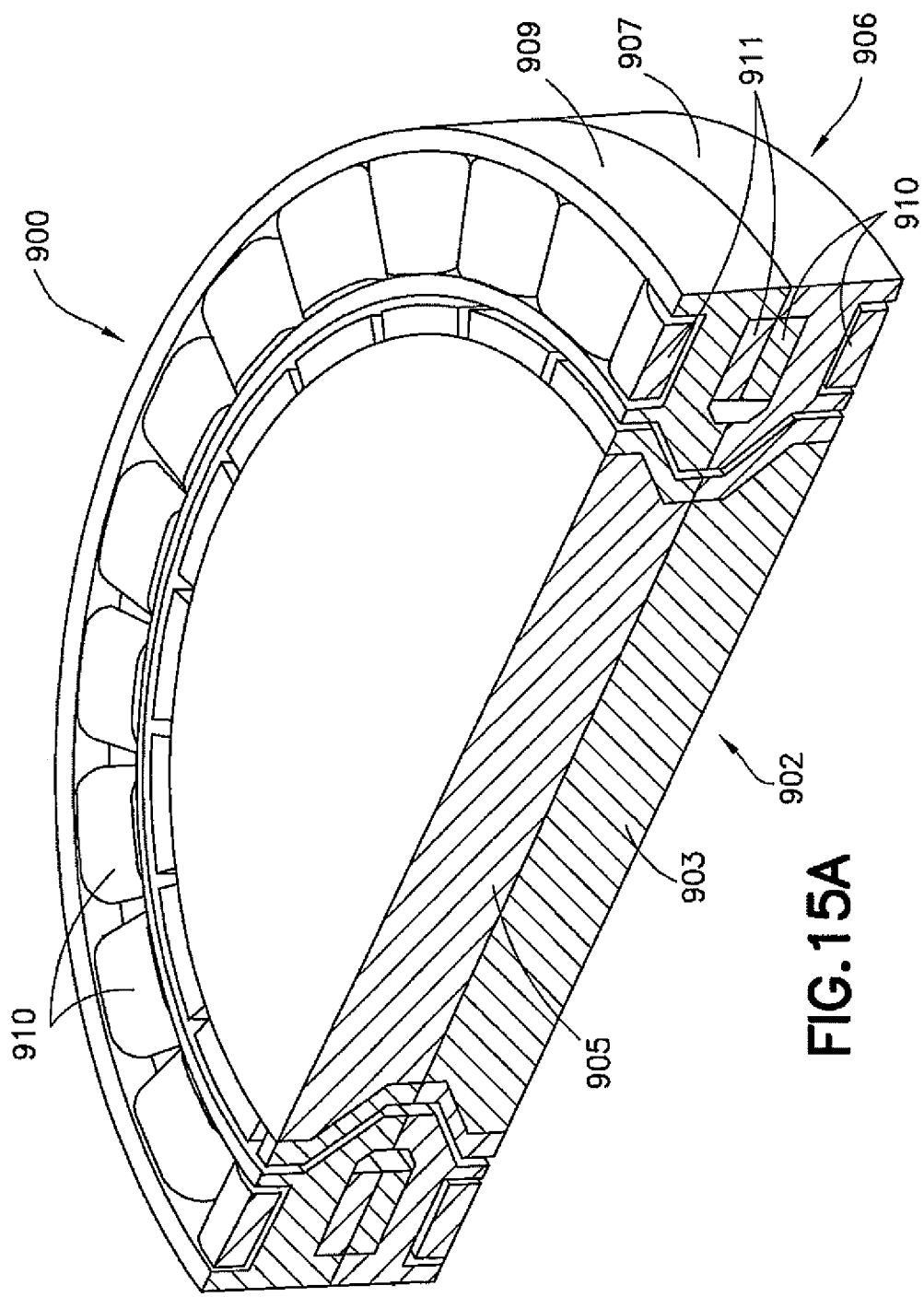
FIG. 15A is a perspective sectional view of another exemplary embodiment of a motor incorporating the soft magnetic material.
Figure 15B:
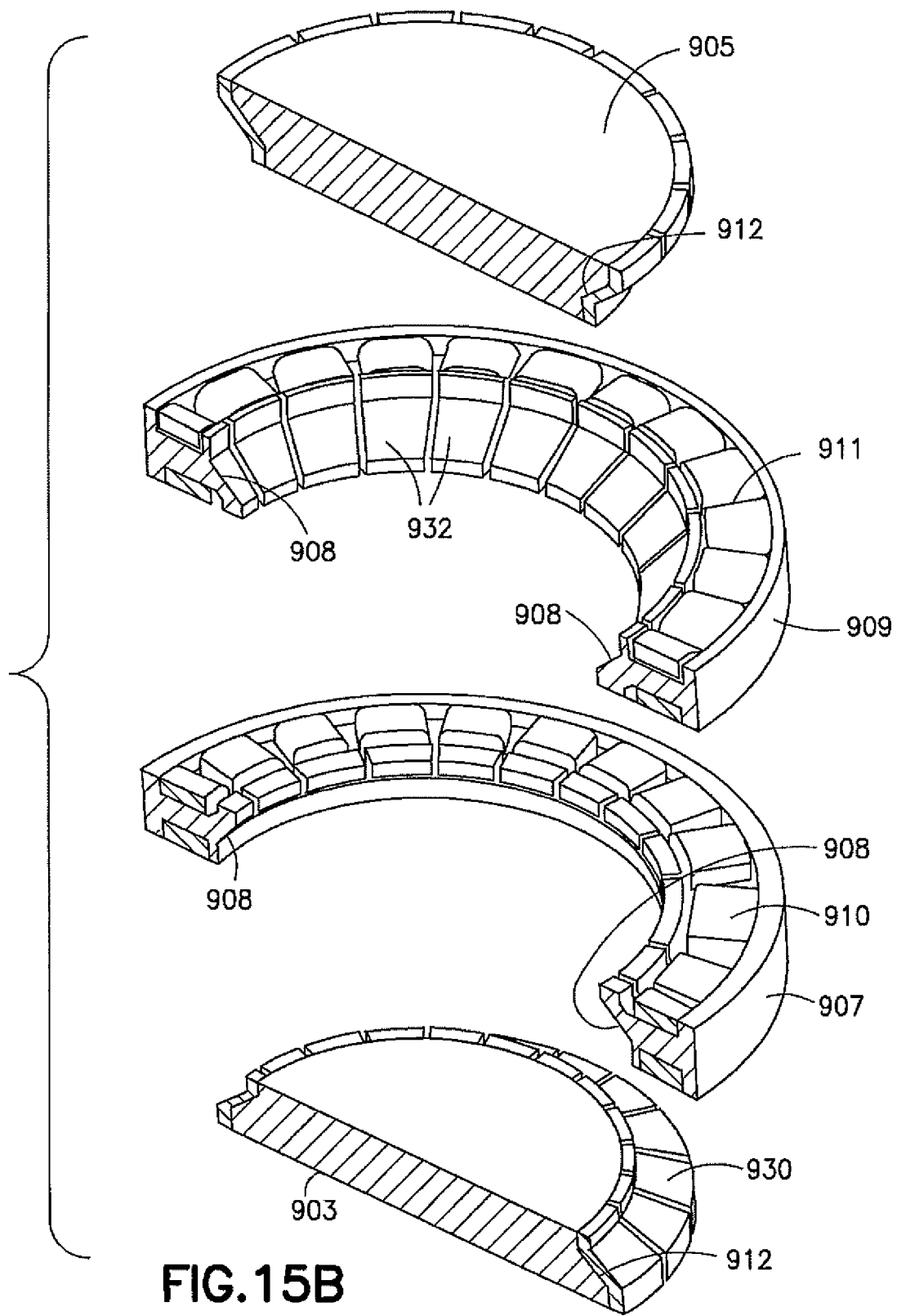
FIG. 15B is an exploded perspective sectional view of the motor of FIG. 15A.

Referring now to FIGS. 15A and 15B, a motor 900 is shown as having a split concave rotor 902 and a split stator 906. The split concave rotor 902 has a first rotor portion 903 and a second rotor portion 905, and the split stator 906 has a first stator portion 907 and a second stator portion 909. In contrast to the split stator 706 shown in FIG. 13, each of the first stator portion 907 and the second stator portion 909 has its own coils 910, 911 such that each of the first stator portion 907 and the second stator portion 909 can be wound prior to assembly of the stator 906 with the rotor 902. Here, the split concave rotor 902 allows for the split stator 906 to be preassembled and wound where the first rotor portion 903 and the second rotor portion 905 may be assembled about the stator 906, for example, after winding. The stator 906 is split such that the motor 900 allows flux flow along the radial, axial, and circumferential directions. Because the motor 900 has extended rotor poles 912 and stator poles 908, there is an additional conical torque producing air gap area that results in a higher torques capacity as compared to a conventional motor. The larger torque producing area more than offsets the marginally lower torque producing radius and a marginally lower coil space. As in each of the disclosed embodiments, the rotor 902 and/or the stator 906 may be made from the soft magnetic material 10 with a high saturation flux density, permeability, and low energy loss due to hysteresis and energy loss due to eddy currents. A microstructure of the soft magnetic material 10 comprising the densely packed micro-domains with suitable magnetic properties, each surrounded by thin insulating boundaries may yield desired electro-magnetic properties facilitating the use of a magnetic flux path in three dimensions as opposed to conventional motors that utilize a magnetic flux path that is one-dimensional, for example, a path in a plane. Similarly, the further disclosed embodiments may utilize such a material. In alternate embodiments, aspects of any of the disclosed embodiments may be combined in any suitable combination.

Also as shown in FIGS. 15A and 15B, the magnets 930, 932 are shown at the rotor poles 912 having two radially outer cylindrical surfaces that abut two conical surfaces of each respective rotor portion 903, 905 and terminate with two smaller diameter cylindrical surfaces. The magnets 930, 932 are shown as being unitary in this shape but alternately may be made of segments to form the shape. The stator poles 908 similarly are shaped poles that have surfaces corresponding to the opposing surfaces on the magnets 930, 932. The pole shapes in combination with the magnet shapes direct magnetic flux between the rotor 902 and the stator 906 in directions that are outside of a single plane in three dimensions. The coils 910 shown are shown as individual windings wrapped about individual stator poles 908. In alternate aspects, the coils 910 may comprise distributed windings.

Figure 16A:
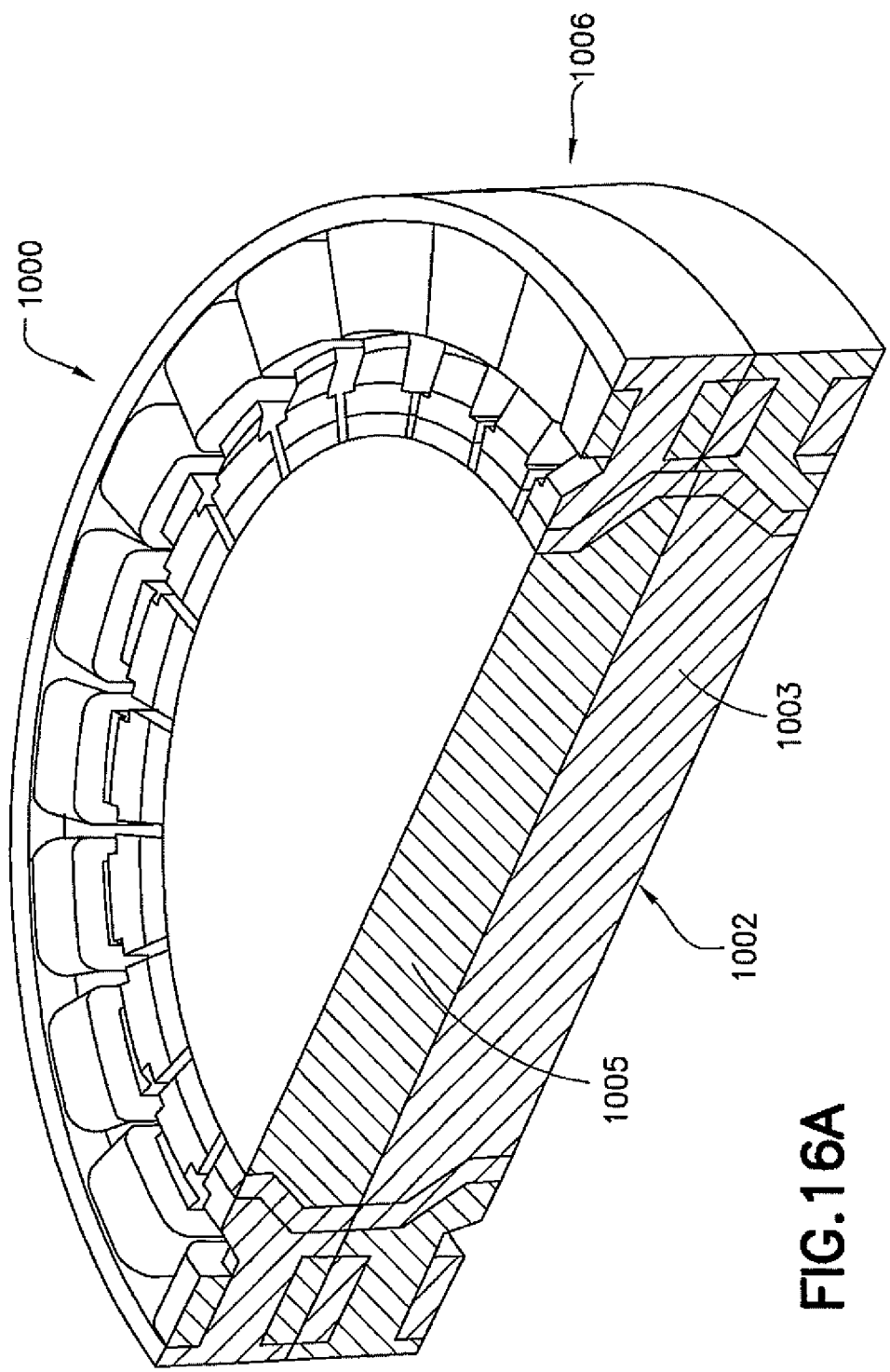
FIG. 16A is a perspective sectional view of another exemplary embodiment of a motor incorporating the soft magnetic material.
Figure 16B:
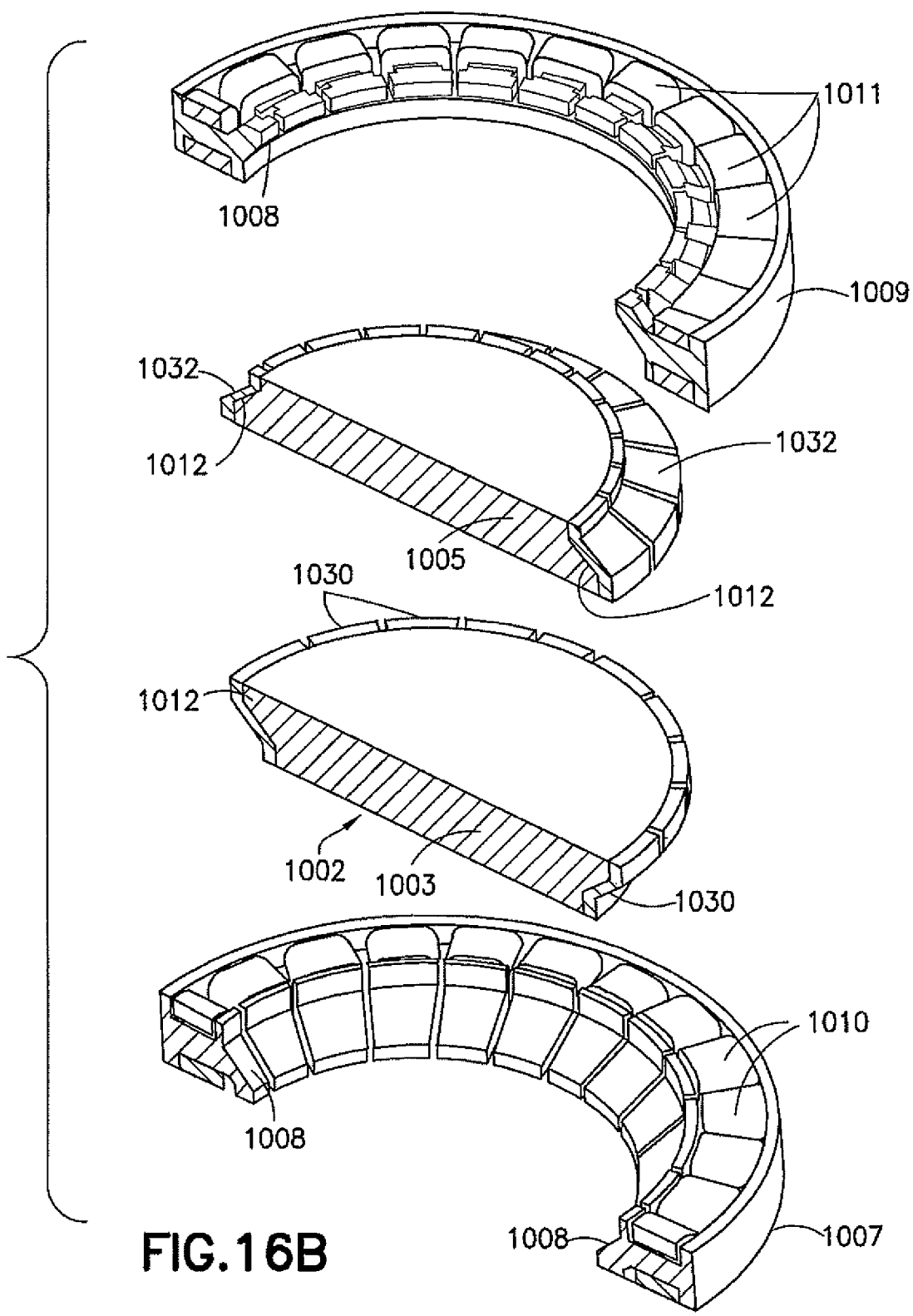
FIG. 16B is an exploded perspective sectional view of the motor of FIG. 16A.

Referring now to FIGS. 16A and 16B, a motor 1000 is shown as having a split convex rotor 1002 axially assembled with a split stator 1006. The split convex rotor 1002 comprises a first rotor portion 1003 and a second rotor portion 1005. In alternate aspects, the rotor 1002 may not be split but may instead comprise a unitary piece. The split stator 1006 comprises a first stator portion 1007 and a second stator portion 1009, each portion of the stator having its own set of coils 1010, 1011. Each stator portion 1007, 1009 can be wound prior to assembly. The stator 1006 is split such that the motor 1000 allows flux flow along the radial, axial, and circumferential directions. Because the motor 1000 has extended rotor poles 1012 and stator poles 1008, there is an additional conical torque producing air gap area that results in a higher torques capacity as compared to a conventional motor. The larger torque producing area more than offsets the marginally lower torque producing radius and a marginally lower coil space. As in each of the disclosed embodiments, the rotor 1002 and/or the stator 1006 may be made from the soft magnetic material 10 with a high saturation flux density, permeability, and low energy loss due to hysteresis and energy loss due to eddy currents. A microstructure of the soft magnetic material 10 comprising the densely packed micro-domains with suitable magnetic properties, each surrounded by thin insulating boundaries may yield desired electro-magnetic properties facilitating the use of a magnetic flux path in three dimensions as opposed to conventional motors (that utilize a magnetic flux path that is one-dimensional, for example, a path in a plane. Similarly, the further disclosed embodiments may utilize such a material. In alternate embodiments, aspects of any of the disclosed embodiments may be combined in any suitable combination.

Still referring to FIGS. 16A and 16B, the magnets 1030, 1032 are shown at the rotor poles 1012 having two radially outer cylindrical surfaces that abut two conical surfaces of each respective rotor portion 1003, 1005 and terminate with two smaller diameter cylindrical surfaces. The magnets 1030, 1032 are shown as being unitary in this shape but alternately may be made of segments to form the shape. The stator poles 1008 similarly are shaped poles that have surfaces corresponding to the opposing surfaces on the magnets 1030, 1032. The pole shapes in combination with the magnet shapes direct magnetic flux between the rotor 1002 and the stator 1006 in directions that are outside of a single plane in three dimensions. The coils 1010, 1011 shown are shown as individual windings wrapped about individual stator poles 1008. In alternate aspects, the coils 1010, 1011 may comprise distributed windings.

Figure 17A:
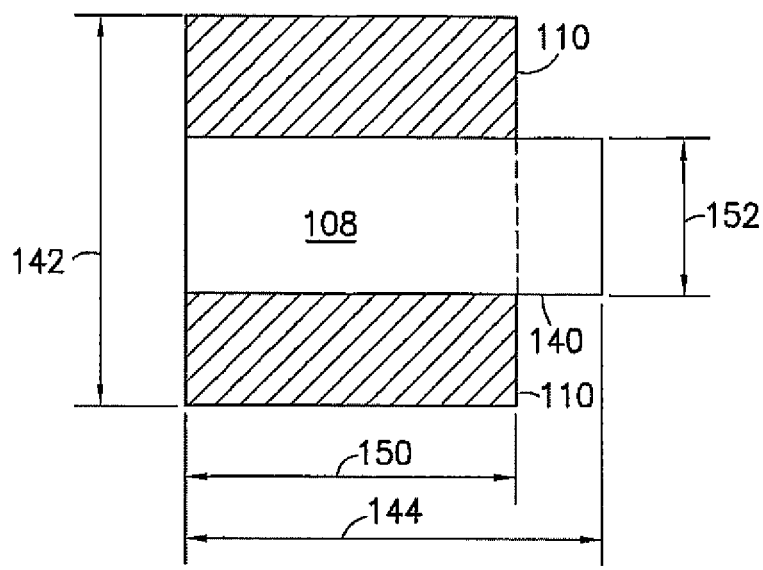
FIG. 17A is a schematic representation of a stator cross section of one exemplary embodiment of a motor.
Figure 17B:
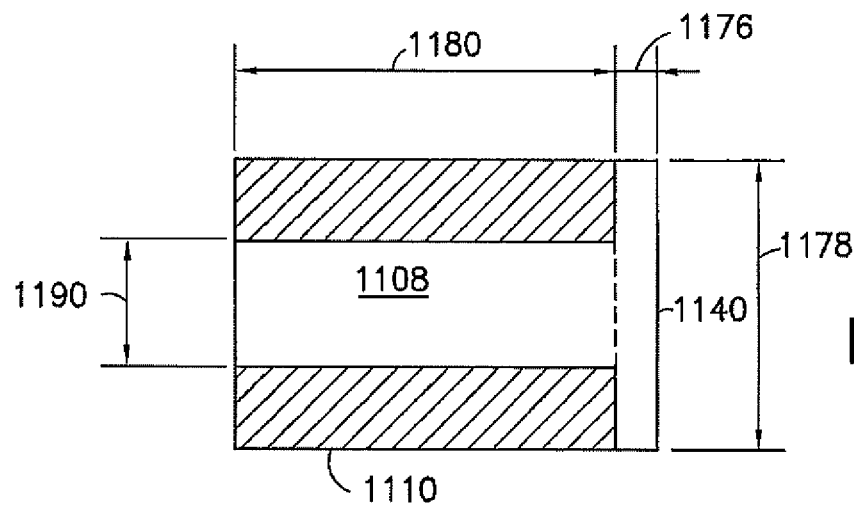
FIGS. 17B and 17C are schematic representations of stator cross sections of exemplary embodiments of motors incorporating the soft magnetic material.
Figure 17C:
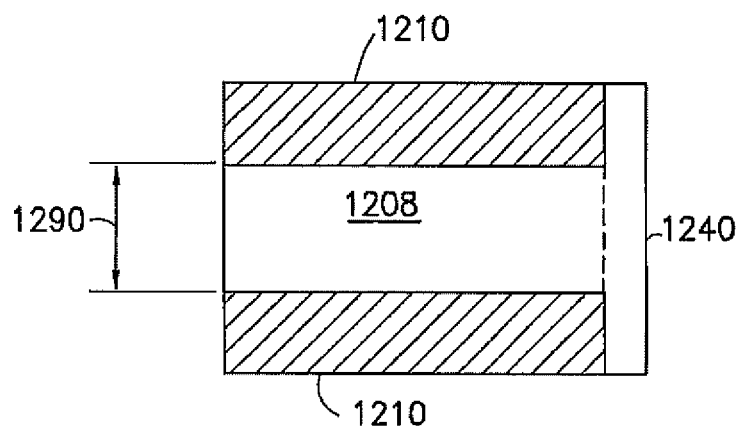

Referring now to FIGS. 17A through 17C, schematic views of stator cross sections are shown. FIG. 17A shows the motor coil 110, stator pole 108, and stator wall 140 in a cross-section. The stator cross section area is denoted by height 142 and width 144 where the coil 110 may have a width 150 and a pole axial height 152. The stator pole 108 may be made of laminated steel suitable for motor stators. As will be described for a given area defined by the height 142 by the width 144, with the use of the soft magnetic material (for example, in FIGS. 17B and 17C) herein described allowing three-dimensional flux flow within the stator, the cross section may be more efficiently utilized. For example, in FIG. 17B, a coil 1110, a stator pole 1108, and a stator wall 1140 are shown where a decreased width 1176 and where the stator wall 1140 is axially longer by a length 1178 may be provided to increase the cross-sectional area of the coil 1108 and a length 1180. A pole axial height 1190 is also shown. By way of further example, in FIG. 17C, a coil 1210, stator pole 1208, and a stator wall 1240 are shown where, as in FIG. 17B, a thinner and axially longer stator wall 1240 may be provided to increase stator pole cross-section area but also where the coil 1210 is wider but thinner to maintain same area as the coil in FIG. 17A. Here, the pole axial height 1290 may be larger than the pole axial height 1190 FIG. 17B.

Figure 18A:
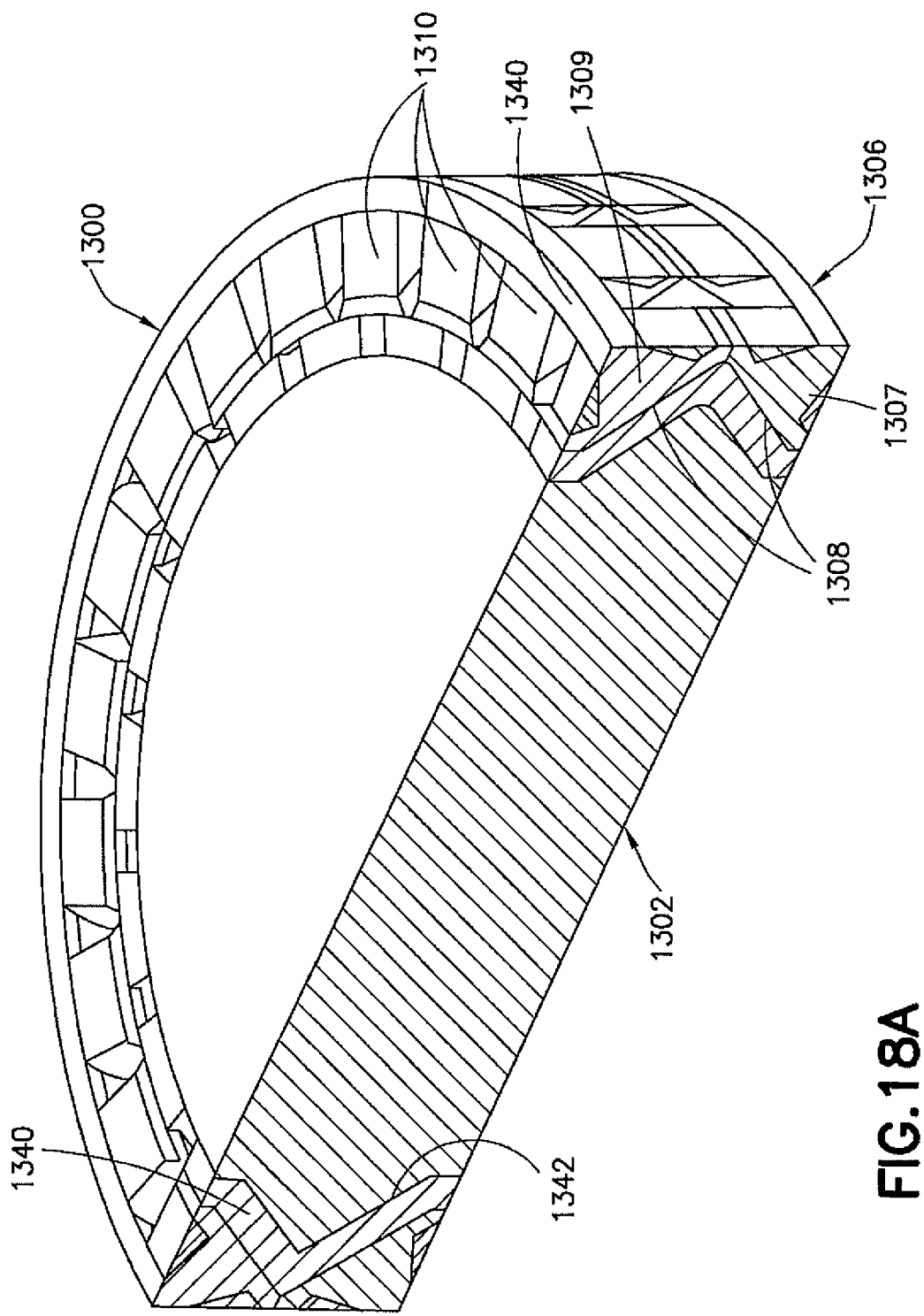
FIG. 18A is a perspective sectional view of another exemplary embodiment of a motor incorporating the soft magnetic material.
Figure 18B:
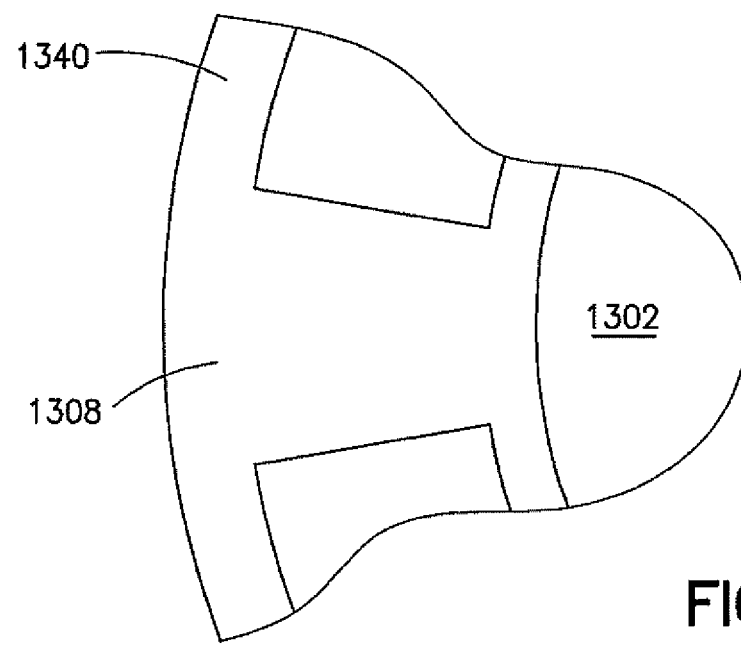
FIG. 18B is a schematic representation of a top view of a tapered stator pole of the motor of FIG. 18A.

Referring now to 18A through 18C, a section of another exemplary embodiment of a motor 1300 has a convex rotor 1302 and a split stator 1306. Each half of the stator 1306 has its own set of windings. Although a single rotor 1302 and stator 1306 are shown, in alternate aspects multiple rotors and/or stators may be stacked. The embodiment shown includes a triangular cross section and may be configured with a single triangular cross section or multiple cross sections, for example, concave or convex cross sections. Further, in alternate aspects, the motor 1300 may be provided with a concave rotor or any suitable shape. Each portion of the stator 1307, 1309 can be wound prior to assembly. Stator portions 1307, 1309 have angled windings 1310 wound about tapered poles 1308. Flux is directed from pole to pole by a stator wall 1340 where the stator wall 1340 has a triangular shape section in the upper and lower corners of the stator 1306. The side section of FIG. 18A shows a stator pole 1308 tapered with the cross section increasing axially toward the rotor 1302. The top section of FIG. 18B shows the stator pole 1306 tapered with the cross section decreasing axially toward the rotor. Here, with the combination of tapers, the cross sectional area of the stator pole 1306 may be maintained. The split configuration of the stator 1306 allows for the stator 1306 to be preassembled and wound where the two stator portions 1307, 1309 may be assembled about the rotor 1302, for example, after winding. The stator 1306 is shown split where the motor 1300 allows flux flow along the radial, axial, and circumferential directions. Because the motor 1300 has extended rotor poles and stator poles, as previously described in other example embodiments, there is an additional conical torque producing air gap area that results in a higher torque capacity, when compared with a conventional motor. The larger torque producing area more than offsets the marginally lower torque producing radius and a marginally lower coil space. As in each of the disclosed embodiments, the rotor 1302 and/or the stator 1306 may be made from the soft magnetic material 10 with a high saturation flux density, permeability, and low energy loss due to hysteresis and energy loss due to eddy currents. A microstructure of the soft magnetic material 10 comprising the densely packed micro-domains with suitable magnetic properties, each surrounded by thin insulating boundaries may yield desired electro-magnetic properties facilitating the use of a magnetic flux path in three dimensions as opposed to conventional motors that utilize a magnetic flux path that is one-dimensional, for example, a path in a plane. Similarly, the further disclosed embodiments may utilize such a material. In alternate embodiments, aspects of any of the disclosed embodiments may be combined in any suitable combination.

Figure 18C:
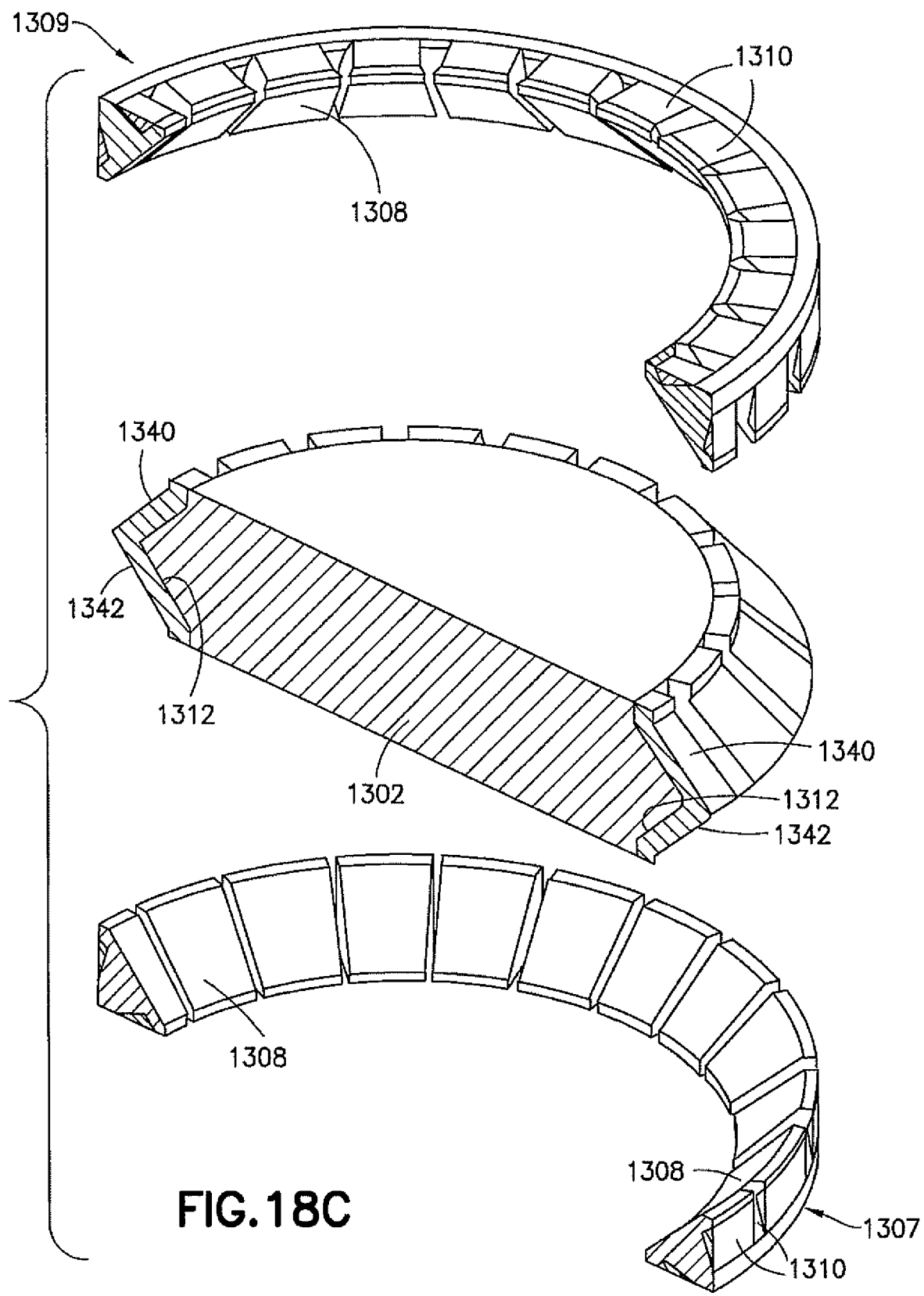
FIG. 18C is an exploded perspective sectional view of the motor of FIG. 18A.

Referring now to FIGS. 18A and 18C, the magnets 1340, 1342 are shown at the rotor poles 1312 having two radially outer cylindrical surfaces that abut two conical surfaces of each respective rotor portion 1307, 1309 and terminate with two smaller diameter cylindrical surfaces. The magnets 1340, 1342 are shown as being unitary in this shape but alternately may be made of segments to form the shape. The stator poles 1308 similarly are shaped poles that have surfaces corresponding to the opposing surfaces on the magnets 1340, 1342. The pole shapes in combination with the magnet shapes direct magnetic flux between the rotor 1302 and the stator 1306 in directions that are outside of a single plane in three dimensions. The coils 1310 shown are shown as individual windings wrapped about individual stator poles 1308. In alternate aspects, the coils 1310 may comprise distributed windings.

Figure 19:
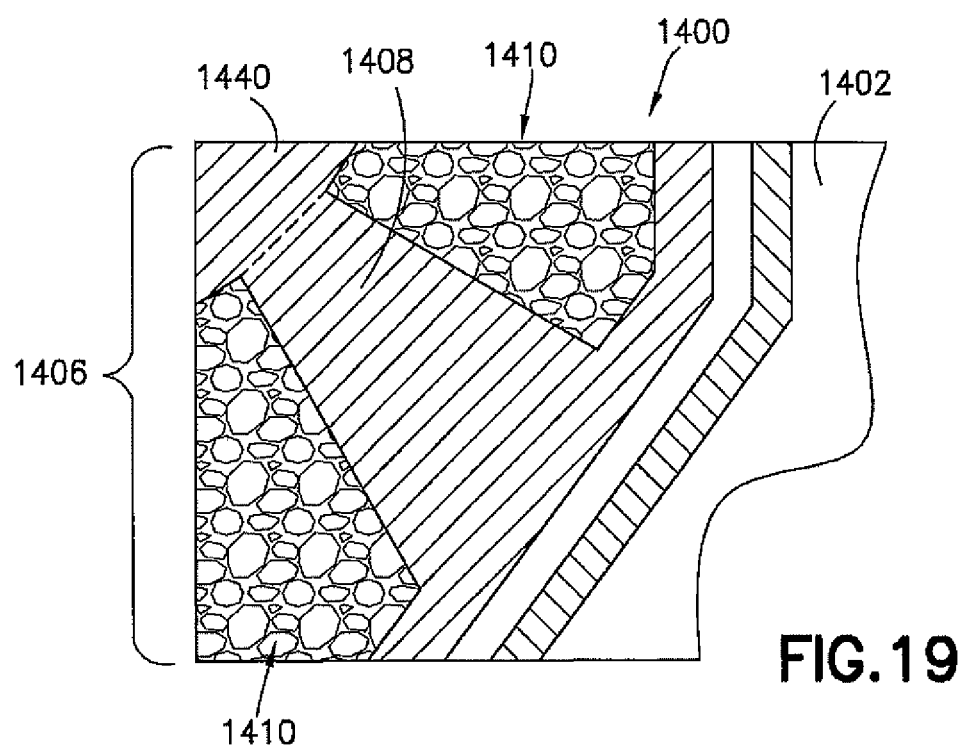
FIG. 19 is a schematic representation of a section of a motor incorporating the soft magnetic material.

Referring now to FIG. 19, a section of a motor 1400 having a convex rotor 1402 and a stator 1406 is shown. Although a single rotor 1402 and a single stator 1406 are shown, in alternate aspects, multiple rotors and/or stators may be stacked. Stator 1406 has angled windings 1410 wound about tapered poles 1408. Flux is directed from pole to pole by a stator wall 1440 where the stator wall 1440 has a triangle-shaped section in the upper corner of the stator 1406. In the embodiment shown, the triangle-shaped section has a width at the termination of the pole 1408 that is wider allowing for additional winding area for the winding 1410. Similarly, the pole 1408 faces opposing the magnets of rotor 1402 may be extended as shown or otherwise to increase additional winding area for the winding 1410. In alternate embodiments, aspects of any of the disclosed embodiments may be combined in any suitable combination.

Figure 20:
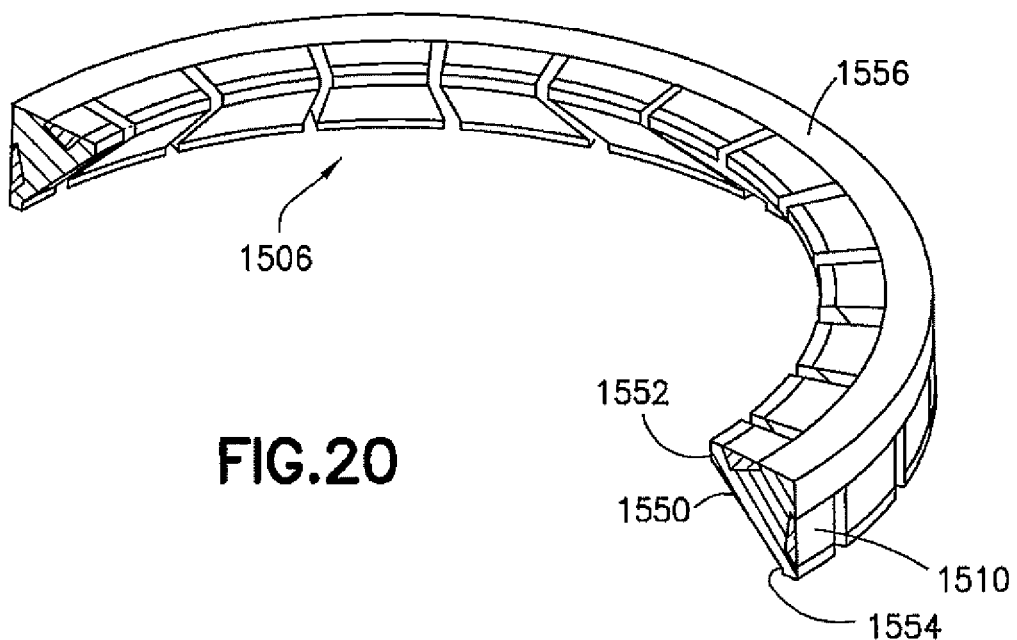
FIG. 20 is a perspective sectional view of an exemplary embodiment of a stator of a motor incorporating the soft magnetic material.
Figure 21:
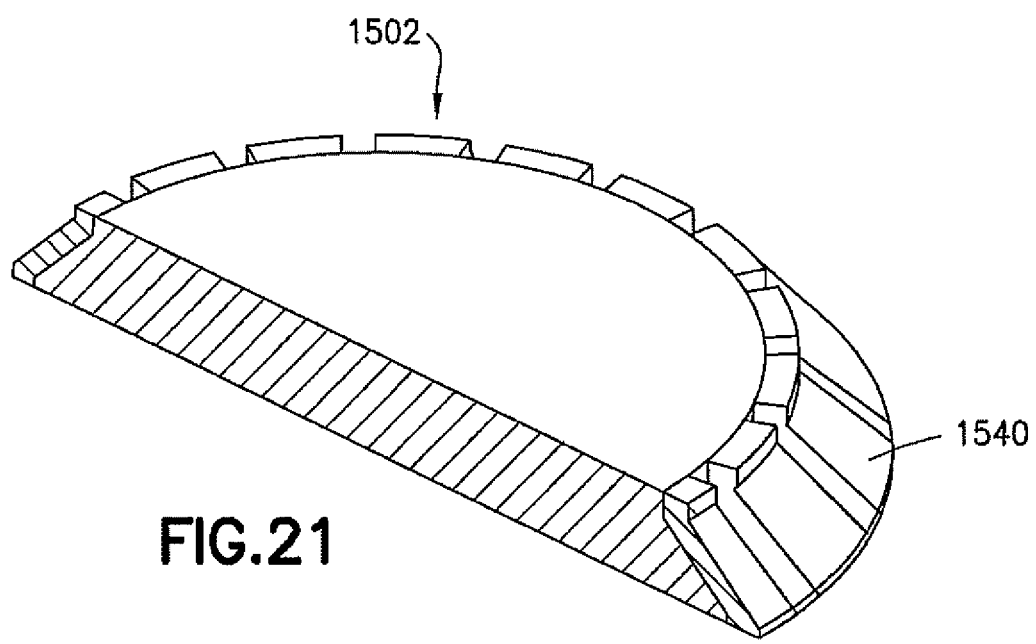
FIG. 21 is a perspective sectional view of an exemplary embodiment of a rotor for use with the stator of FIG. 20.

Referring now to FIGS. 20 and 21, there are shown isometric section views of a stator 1506 and a rotor 1502, respectively. In the exemplary embodiments shown, inwardly angled stator teeth 1550 are located at an angle to be normal with the orientation of the outwardly angled magnets 1540. Such an arrangement makes use of available space and increases the cross-sectional area for flux flow. The teeth 1550 have upper 1552 and lower 1554 portions that overlap coils 1510 such that flux flows across the entire cross section of each of the stator teeth 1550. Similarly, portions overlap coils 1510 of a stator ring 1556 such that flux flows across the entire cross section of the stator ring 1556 from tooth to tooth of the stator 1506. Although individual windings are shown for each pole, distributed windings may alternately be provided.

Figure 22:
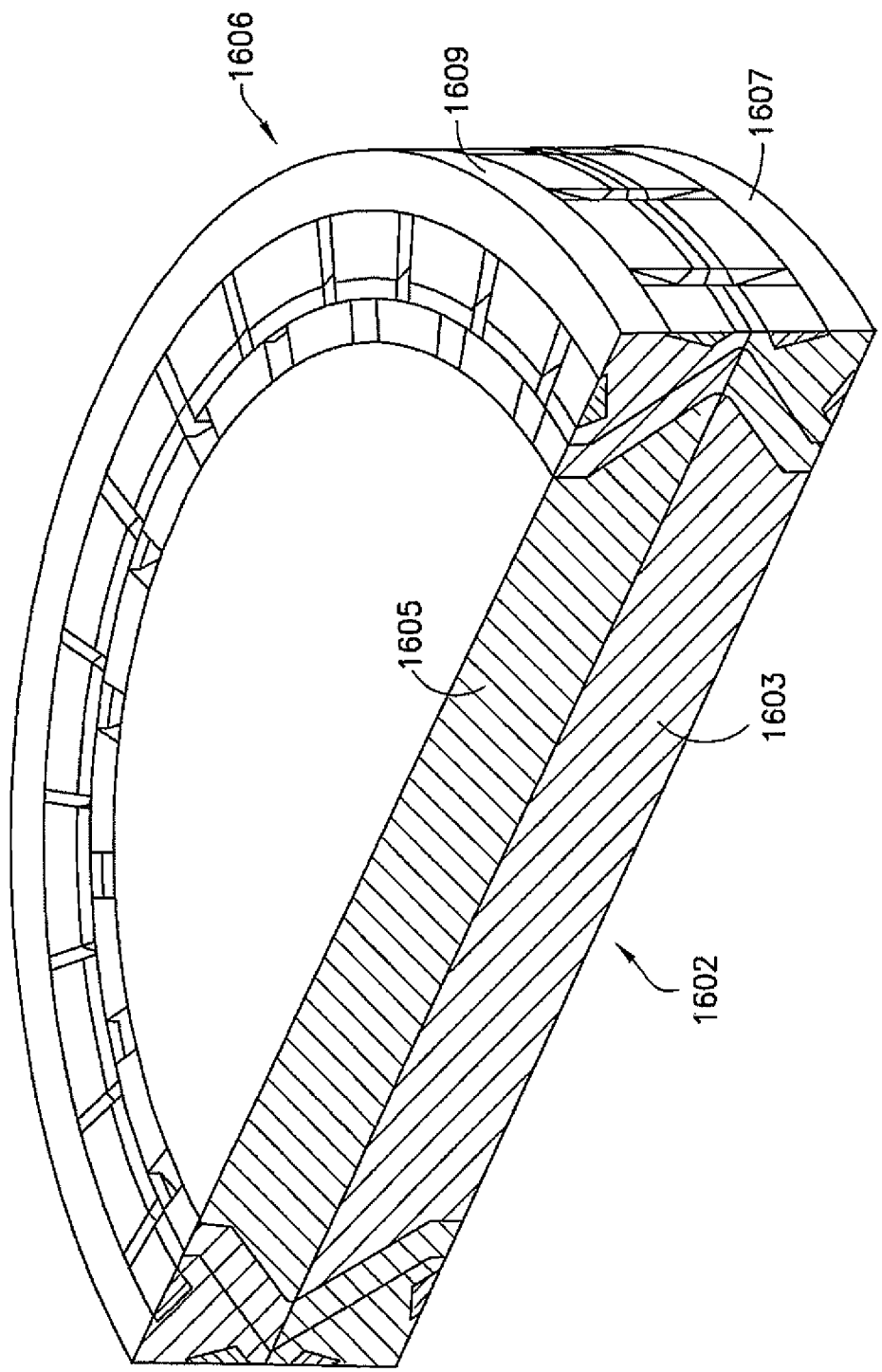
FIGS. 22 and 23 are perspective sectional views of exemplary embodiments of motors incorporating the soft magnetic material.
Figure 23:
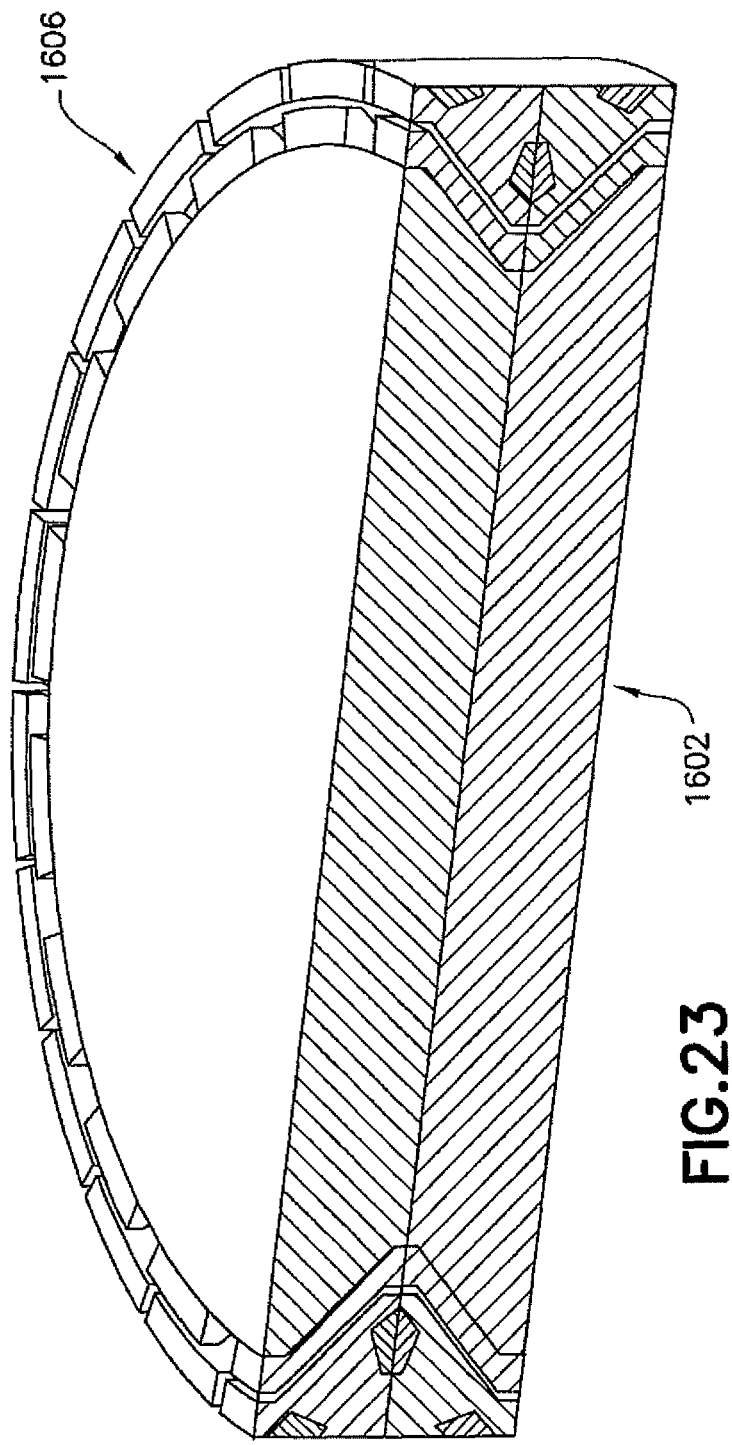

Referring now to FIGS. 22 and 23, there is shown arrangements of an assembled rotor 1602 and stator 1606. In one exemplary aspect, a single stator 1606 and rotor 1602 may be provided. As seen in FIG. 22, the stator 1606 may comprise a first stator portion 1607 and a second stator portion 1609, and the rotor 1602 may comprise a first rotor portion 1603 and a second rotor portion 1605. The stator 1606 and rotor 1602 may be assembled such that the first and second stator portions form two triangular cross sections mating radially at the narrow portion of the triangular cross section. As seen in FIG. 23, the first stator portion 1607 and the second stator portion 1609 along with the first rotor portion 1603 and the second rotor portion 1605 may alternately be assembled such that the stator portions form two triangular cross sections mating radially at the wide portion of the triangular cross sections. In alternate aspects, any suitable combination may be provided. The stator teeth are convex and the rotor teeth are concave.

Figure 26:
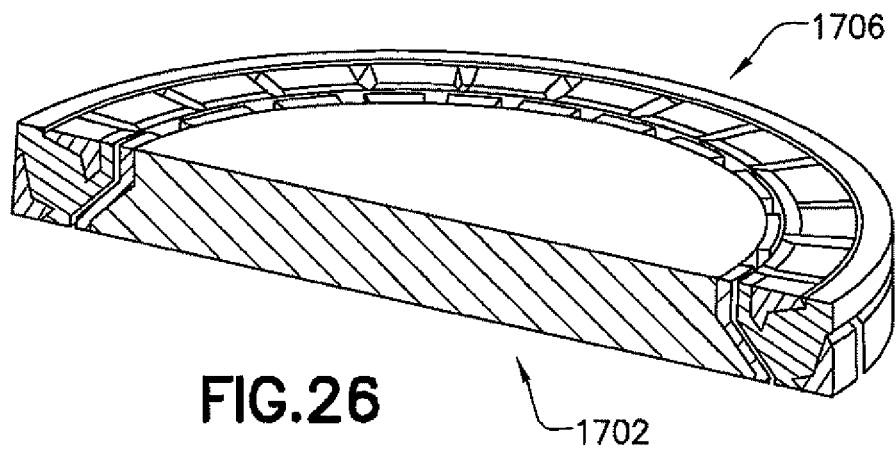
FIG. 26 is a perspective sectional view of an assembly of the rotor and stator of FIGS. 24 and 25, respectively.
Figure 27:
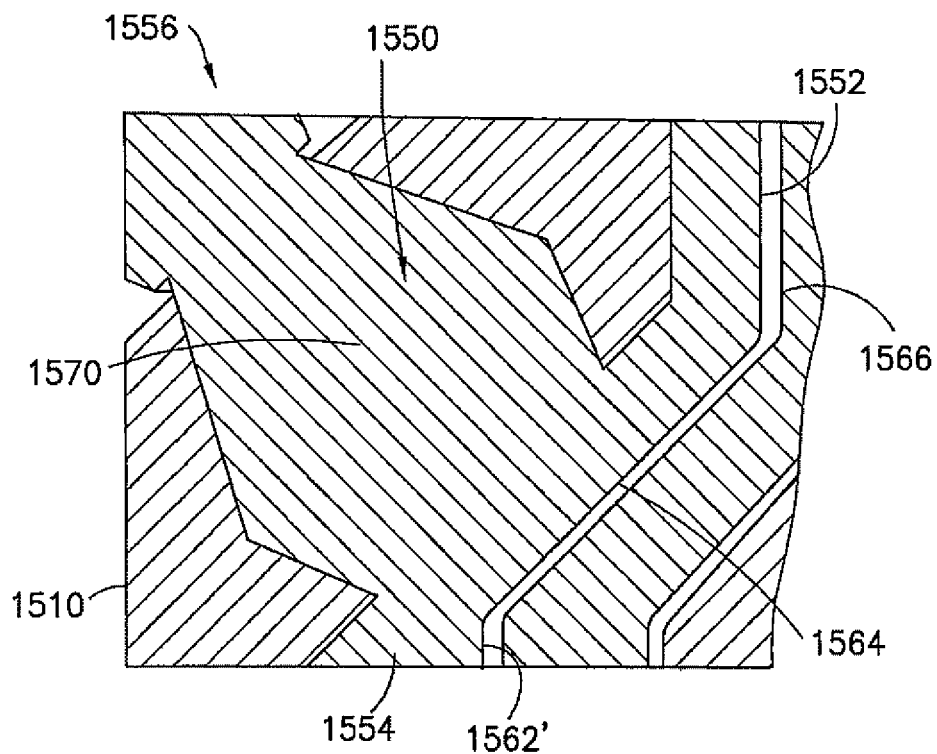
FIG. 27 is a schematic representation of a cross section of an exemplary embodiment of a stator incorporating the soft magnetic material.

The exemplary embodiments of FIGS. 20 through 23 may not allow for independent sizing of tooth cross-sectional area and coil cross-sectional area. As a result, larger tooth cross-section comes at the expense of smaller coil cross-section and vice versa. The embodiments of FIGS. 24-29, as described below, provide options to alter the tooth cross sections independently in order to achieve an optimal design. However, this flexibility comes at the expense of a smaller magnet area. The embodiment as shown in FIG. 20, however, is a special case of the embodiment as shown in FIG. 27, for example, when a=0 in FIG. 27. For example, setting a=0 and b=c yields the embodiment of FIGS. 20-23.

Figure 24:
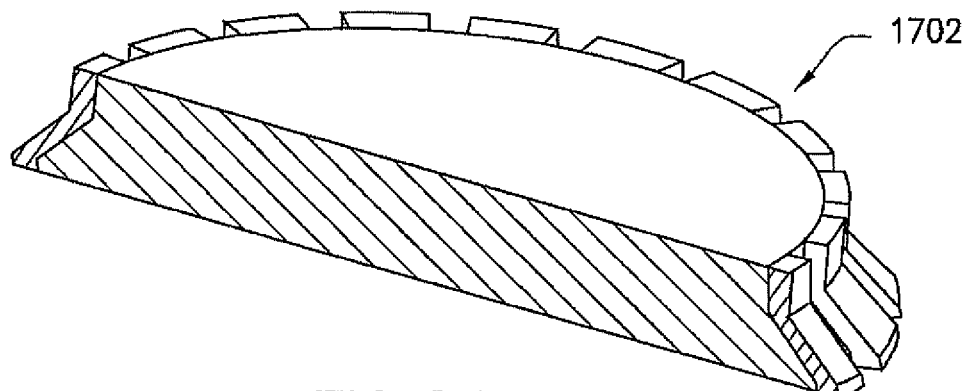
FIG. 24 is a perspective sectional view of an exemplary embodiment of a rotor of a motor incorporating the soft magnetic material.
Figure 25:
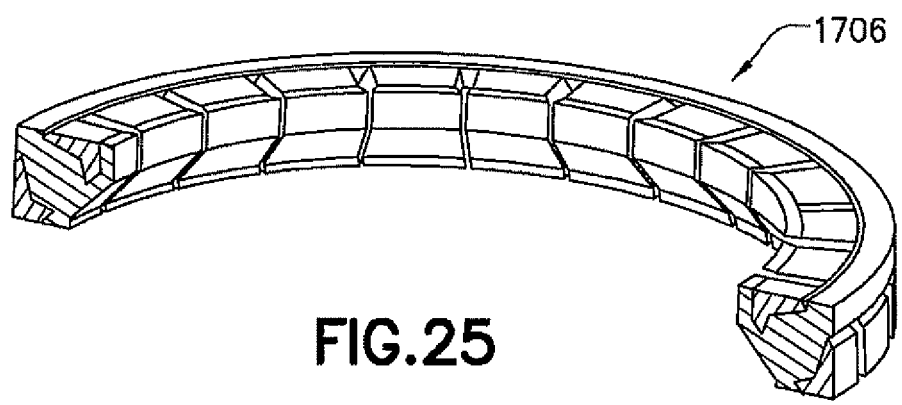
FIG. 25 is a perspective sectional view of an exemplary embodiment of a stator for use with the rotor of FIG. 24.
Figure 28:
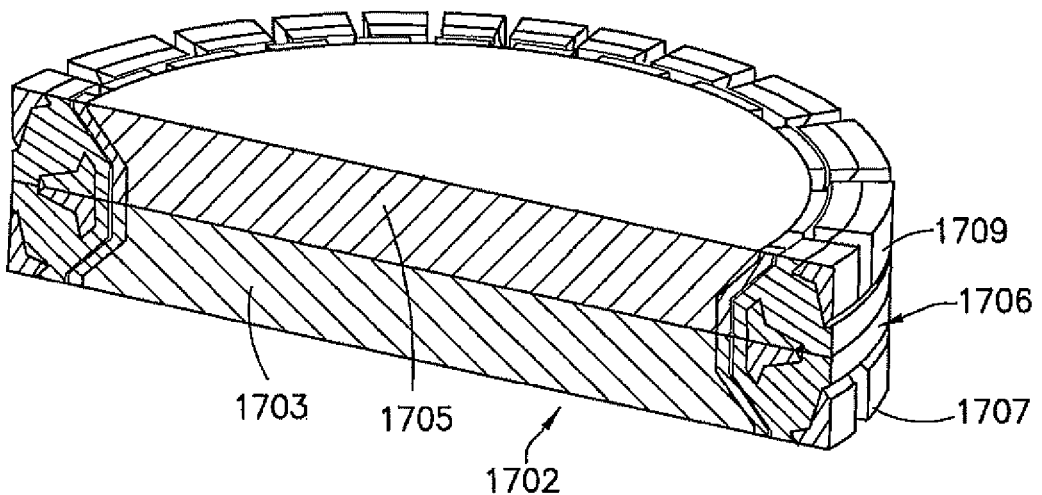
FIGS. 28 and 29 are perspective sectional views of exemplary embodiments of motors incorporating the soft magnetic material.

Referring now to FIGS. 24 and 25, there are shown isometric section views of a rotor 1702 and a stator 1706, respectively. Referring also to FIG. 26, the rotor 1702 and the stator 1706 are shown assembled. As shown in FIG. 26, a single stator 1706 and a single rotor 1702 may be provided. As shown in FIG. 28, the stator 1706 may comprise a first stator portion 1707 and a second stator portion 1709, both of which may be assembled with the rotor 1702 comprising a first rotor portion 1703 and a second rotor portion 1705 to form two cross sections mating radially at the wide portion of the cross sections.

Figure 29:
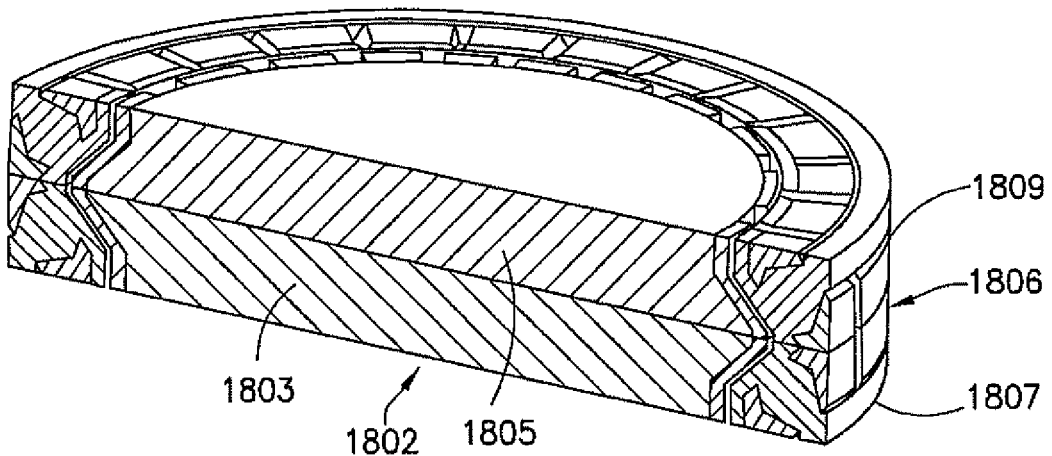

As shown in FIG. 29, a stator 1806 may comprise a first stator portion 1807 and a second stator portion 1809, both of which may be assembled with a rotor 1802 comprising a first rotor portion 1803 and a second rotor portion 1805 to form two cross sections mating radially at the wide portion of the cross sections.

Referring back to FIG. 27, there is shown a stator pole cross-section showing variable parameters. In the embodiment shown, the stator teeth 1550 have faces 1562, 1564, and 1566 located at various angles to be normal with the orientation of the magnets. Such an arrangement makes use of available space, and increases the cross-sectional area for flux flow. The teeth 1550 have upper 1552 and lower 1554 portions that overlap the coils 1510 such that flux flows across the entire cross section of the stator tooth 1550. Although individual windings are shown for each pole, distributed windings may alternately be provided. The stator tooth 1550 has a section 1570 with a varying cross section such that the coil 1510 denoted by measurement parameters a, b, c, and d may be optimized. In alternate aspects, any suitable combination may be provided.

Figure 30:
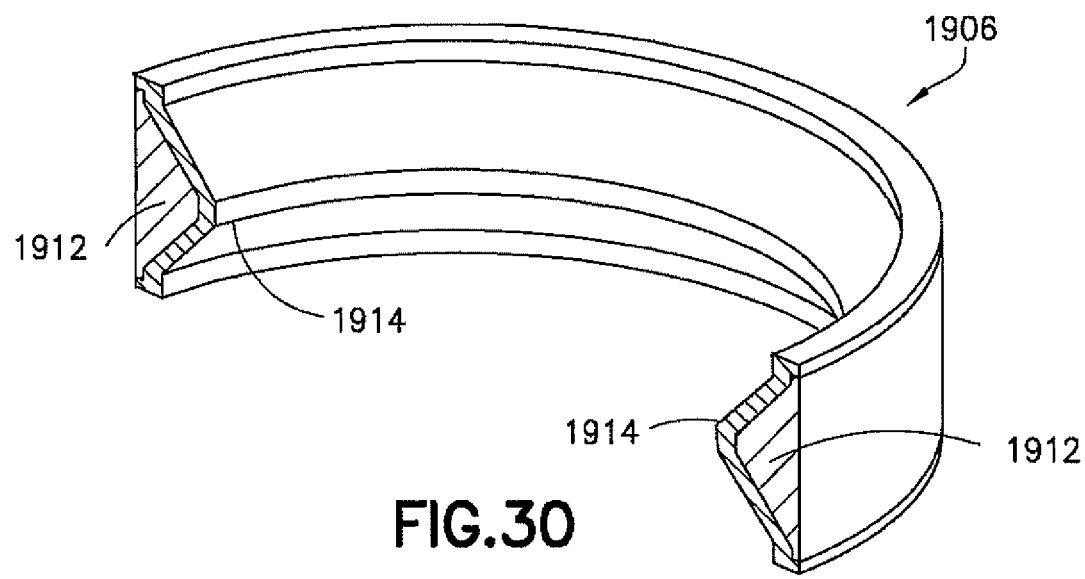
FIG. 30 is a perspective sectional view of one exemplary embodiment of a slotless stator incorporating the soft magnetic material.
Figure 31:
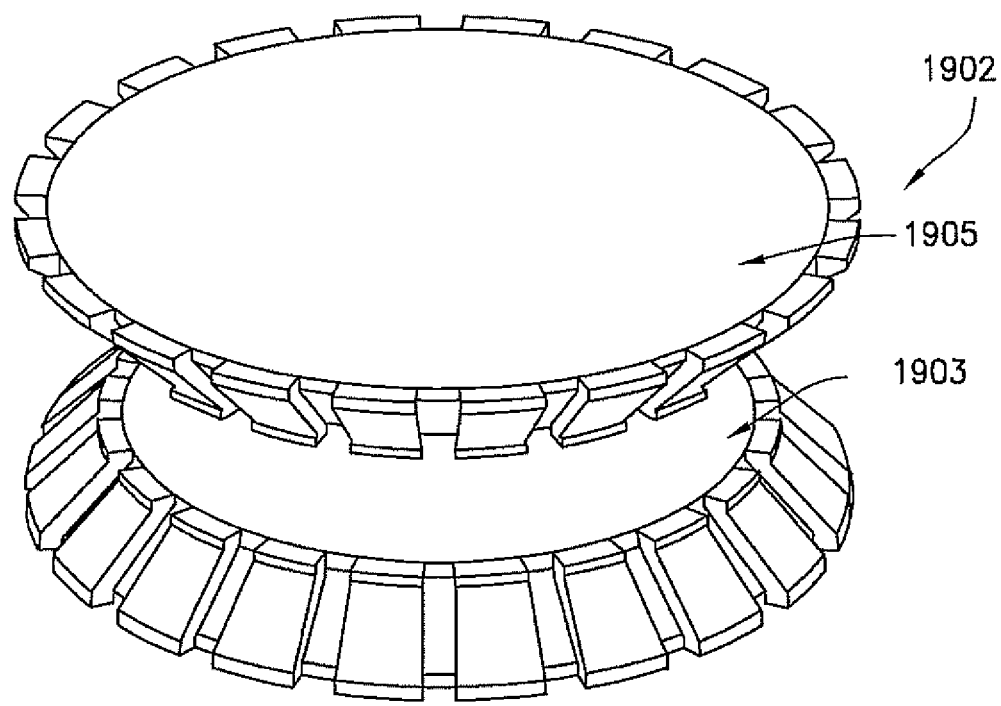
FIG. 31 is an exploded perspective sectional view of one exemplary embodiment of a rotor for use with the slotless stator of FIG. 30.
Figure 32:
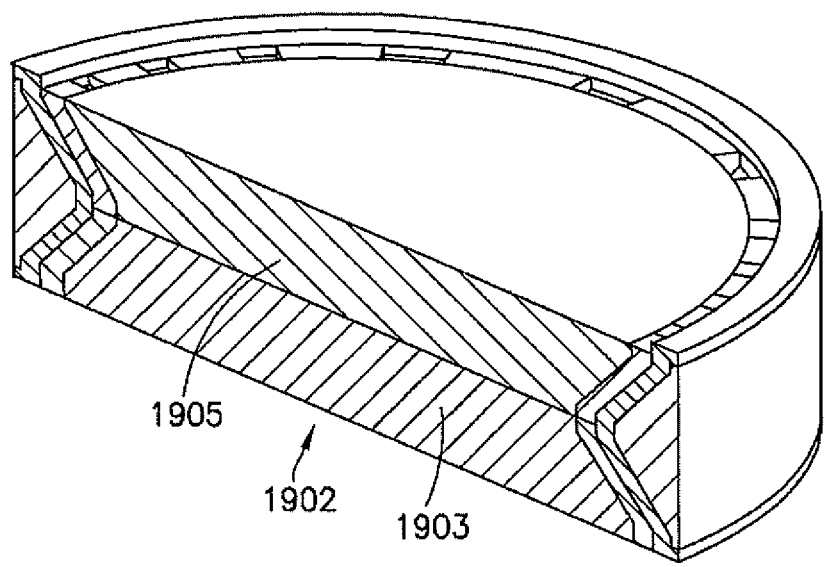
FIG. 32 is a perspective sectional view of one exemplary embodiment of a motor incorporating the slotless stator and the rotor of FIGS. 30 and 31, respectively.

Referring now to FIGS. 30 and 31, isometric section views of a stator 1906 and a rotor 1902 are respectively shown. The exemplary embodiment illustrated includes a slotless stator design in which the stator 1906 has a soft magnetic core 1912 and a potted winding 1914. The soft magnetic core 1912 is defined directly on a surface of the stator 1906 (thus avoiding the use of slots) and may comprise the soft magnetic material 10, as described above. As shown, the rotor 1902 may be a two-piece rotor as illustrated in FIGS. 31 and 32 (comprising a first rotor portion 1903 and a second rotor portion 1905). Alternately, a motor may be made with just one half of the rotor 1902 and the stator 1906.

Figure 33:
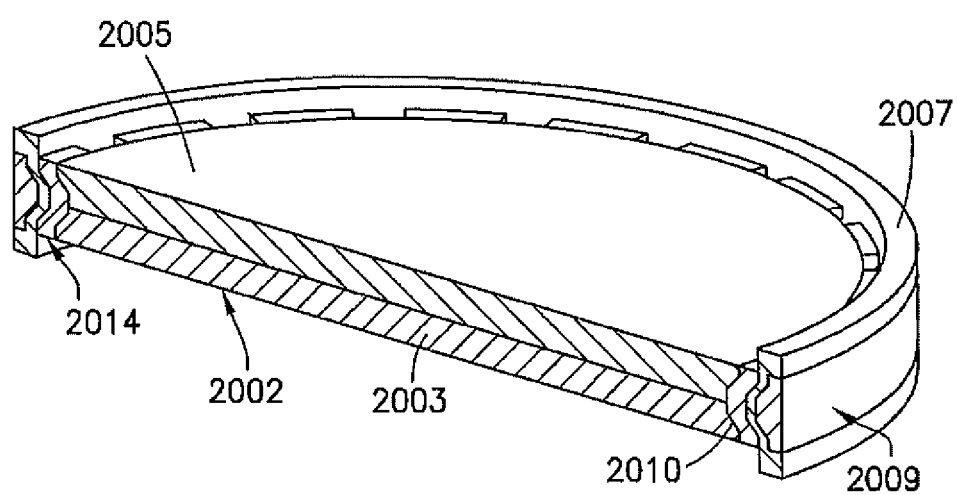
FIG. 33 is a perspective sectional view of another exemplary embodiment of a motor incorporating a slotless stator and the soft magnetic material.

Referring now to FIG. 33, another exemplary embodiment of a slotless motor is shown generally at 2000. Slotless motor 2000 comprises a rotor 2002 rotatably mounted to a slotless stator 2006. The rotor 2002 comprises a first rotor portion 2003 and a second rotor portion 2005, both portions being symmetrical. The slotless stator 2006 comprises a wall 2007 and a backing portion 2009 that form a continuous portion having a constant cross section. Magnets 2014 are mounted between the rotor 2002 and the slotless stator 2006. Windings in the form of coils 2010 are self-supported and evenly distributed on an inner-facing surface around the slotless stator 2006 and have a horizontal V-shaped cross section. Motor 2000 is further described with regard to Example 3 below.

Figure 34:
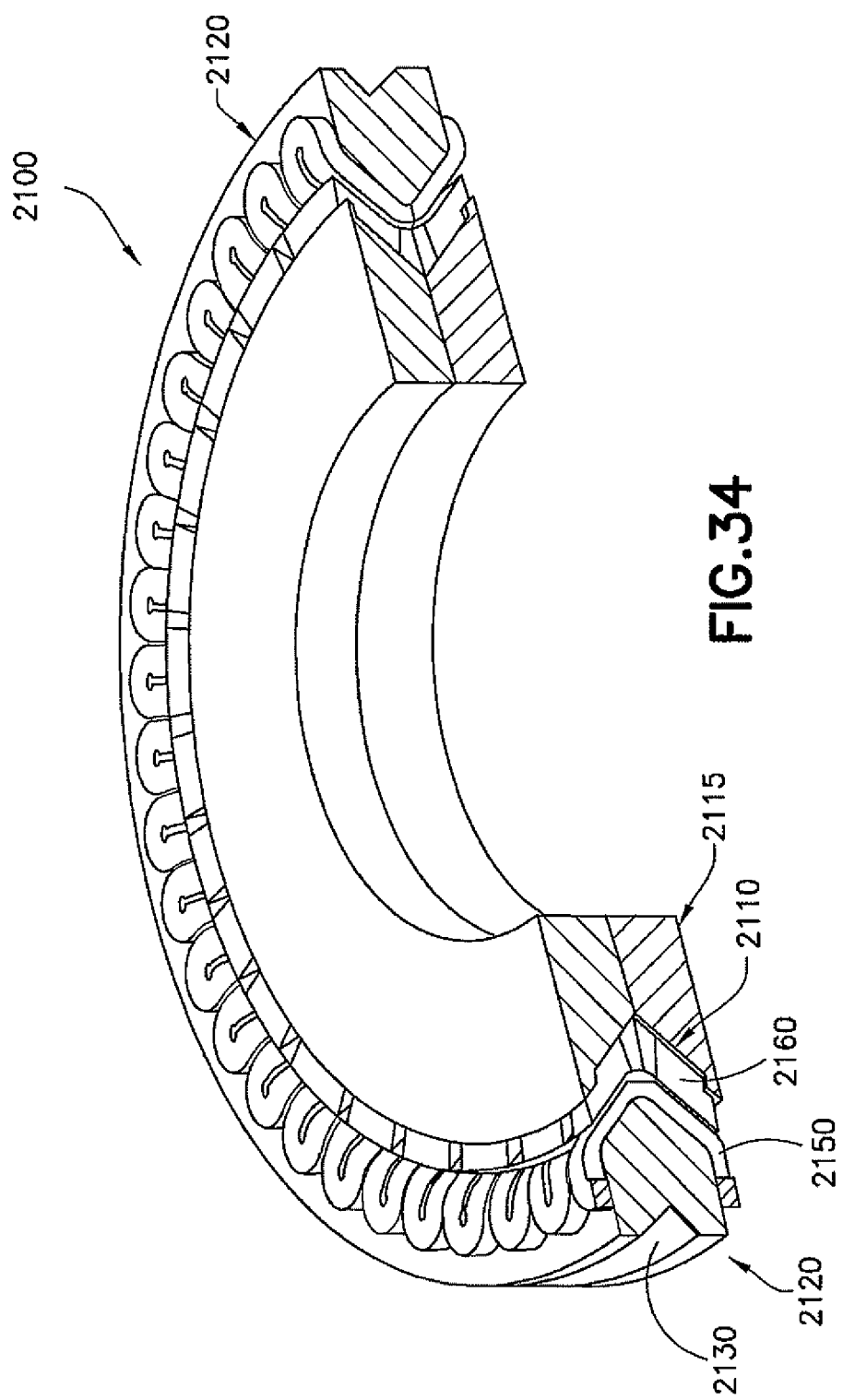
FIG. 34 is a perspective sectional view of one exemplary embodiment of a hybrid slotless motor.
Figure 36A:
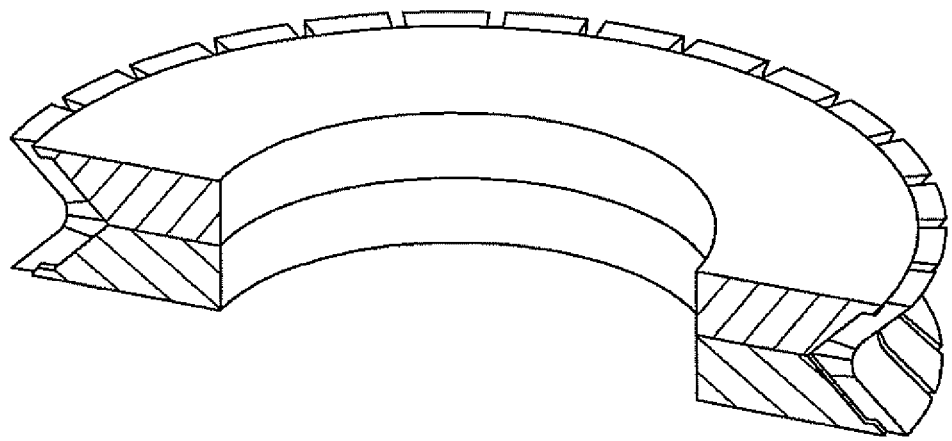
FIGS. 36A through 36E are perspective and perspective sectional views of a rotor of the motor of FIG. 34.
Figure 36B:
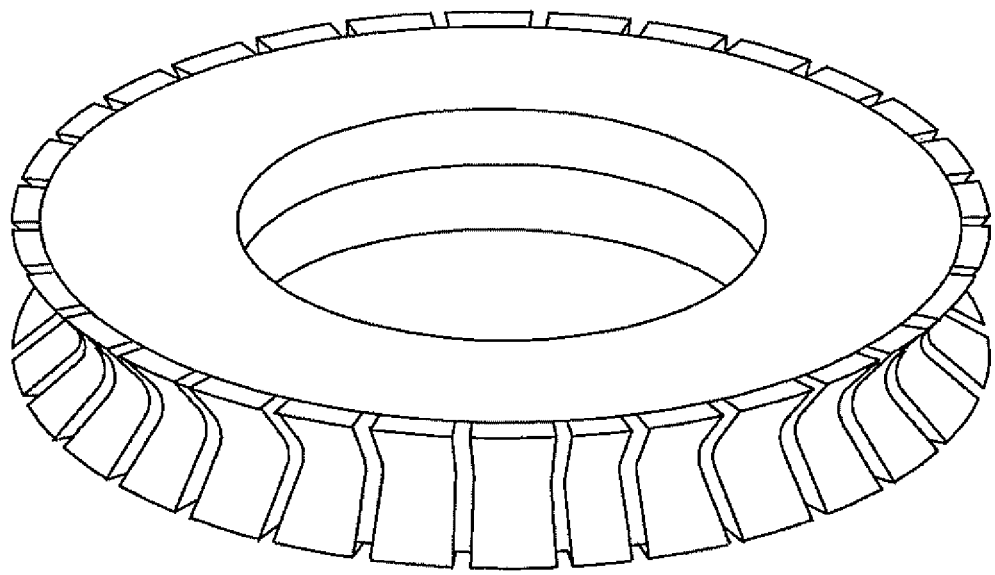
Figure 36C:
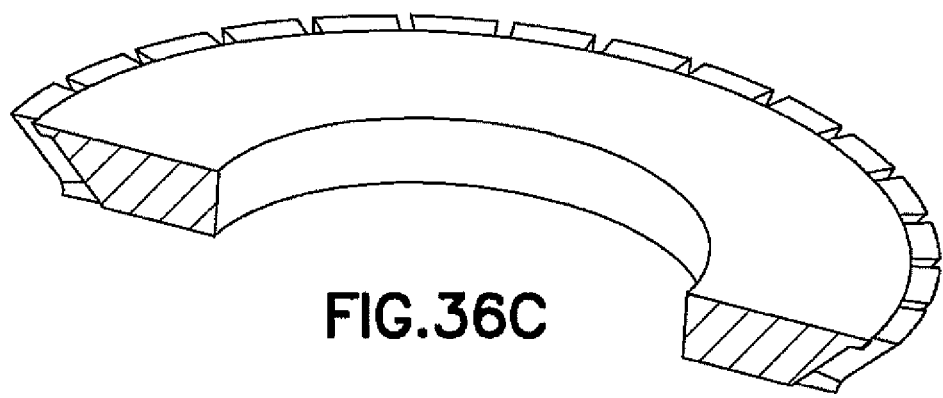
Figure 36D:
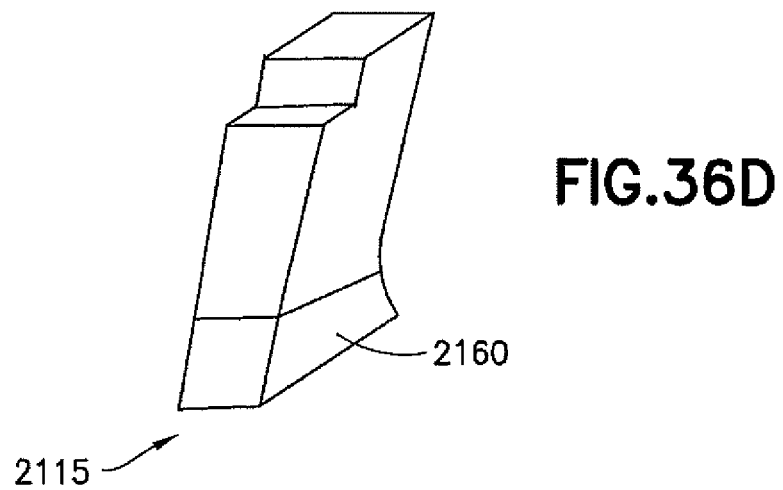
Figure 36E:
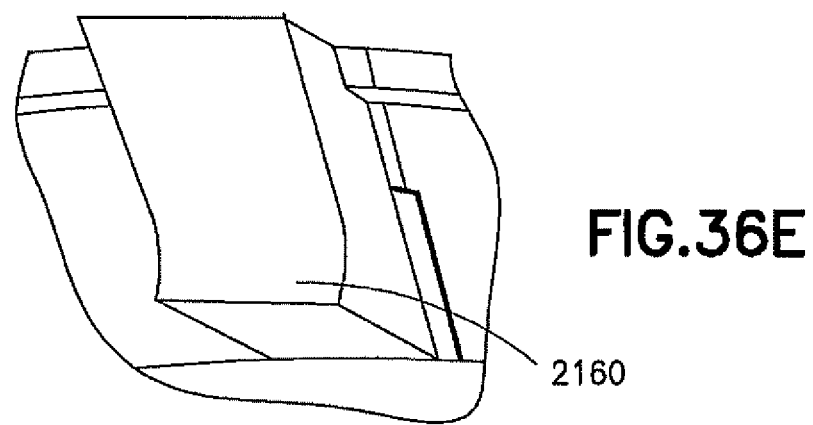
Figure 37:
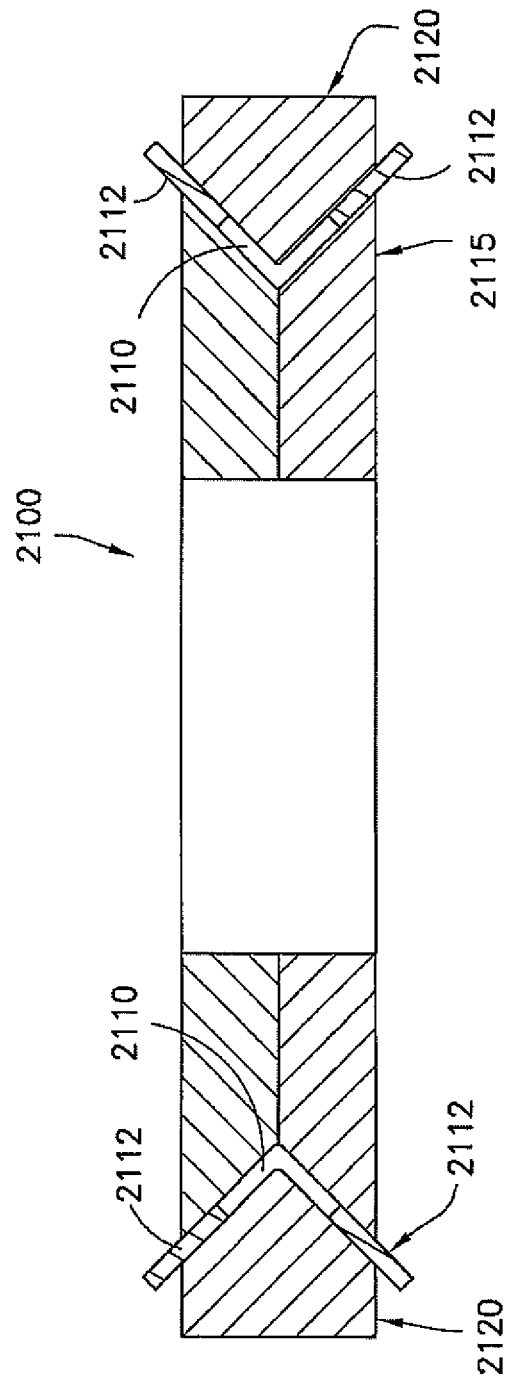
FIG. 37 is a schematic representation of the motor of FIG. 34.

Referring now to FIGS. 34 through 40, a slotless brushless permanent magnet motor into which the soft magnetic material as described herein may be incorporated is shown generally at 2100. Motor 2100 is a hybrid motor. As can be seen in FIGS. 34 and 37, an air gap cross section 2110 is V-shaped and may include a spacer 2112.

Figure 35A:
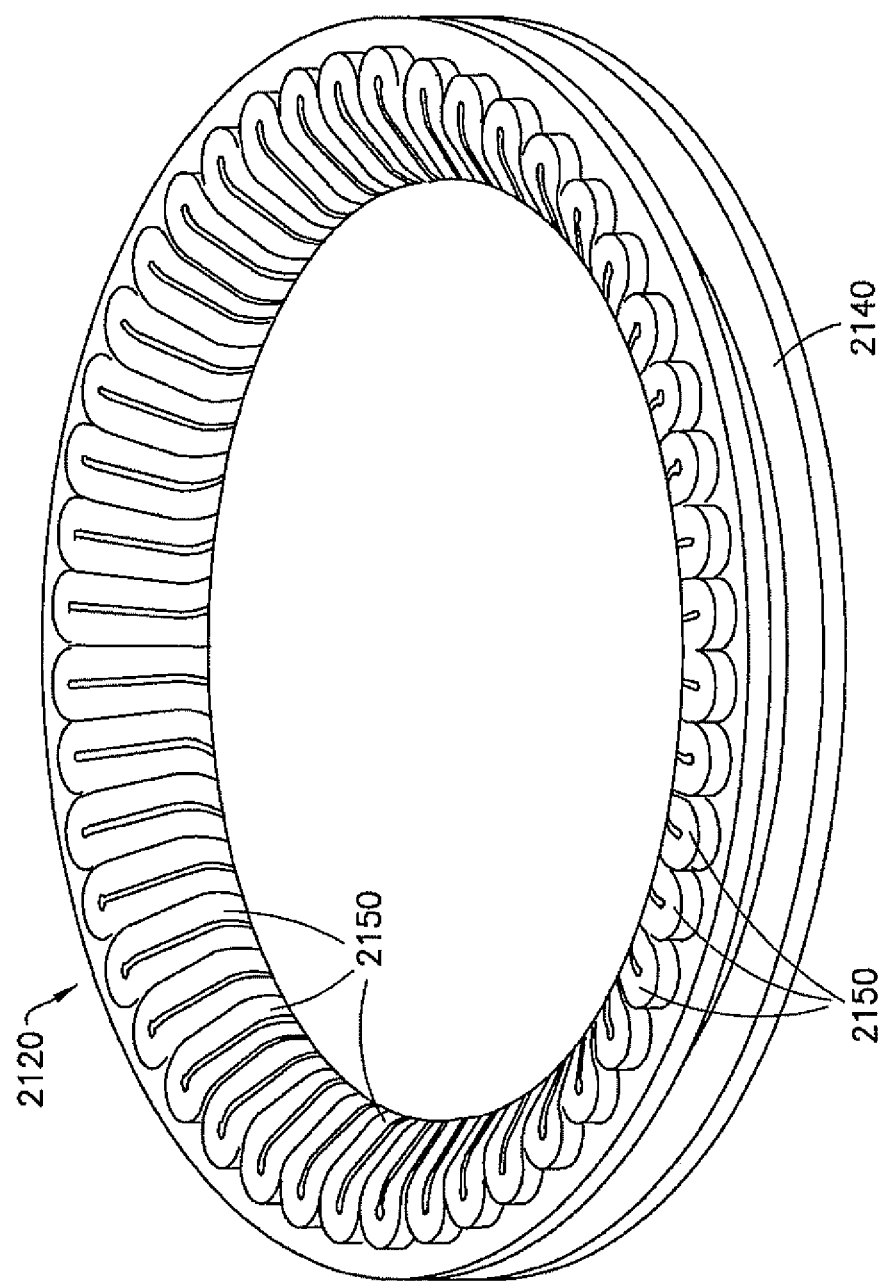
FIGS. 35A through 35C are perspective views of a stator of the motor of FIG. 34.
Figure 35B:
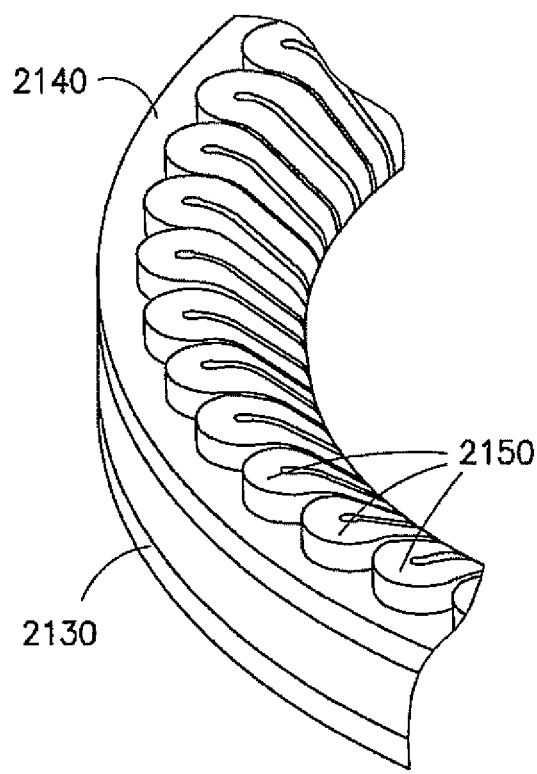
Figure 35C:
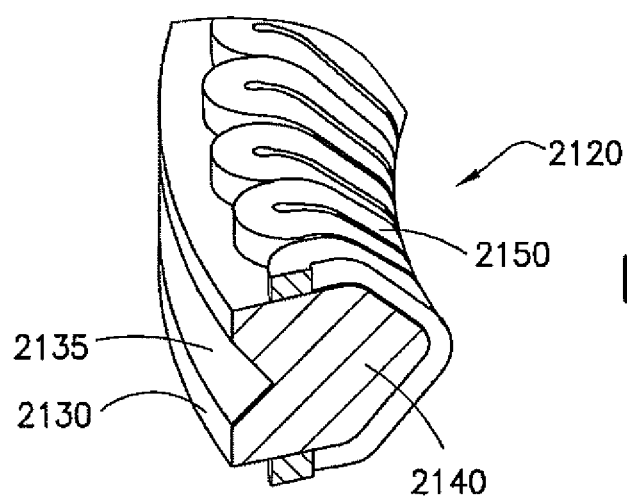
Figure 35D:
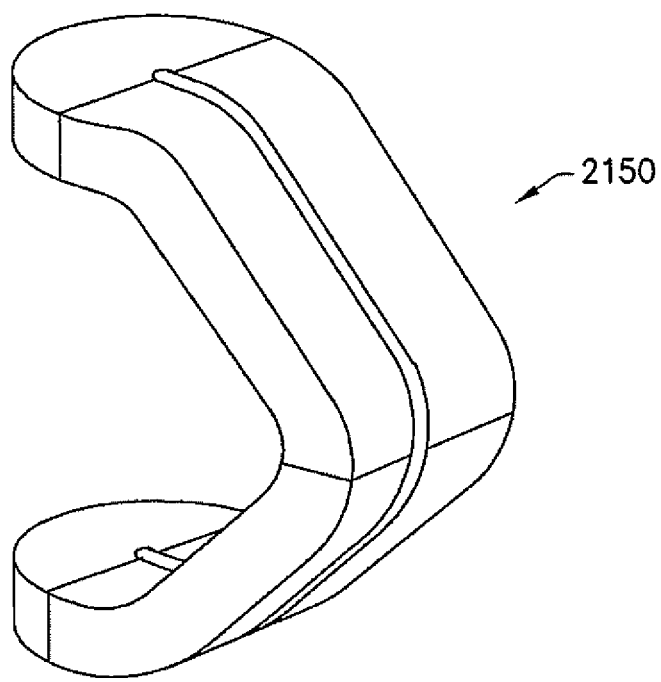
FIGS. 35D and 38 are perspective views of a coil winding of the motor of FIG. 34.
Figure 35E:
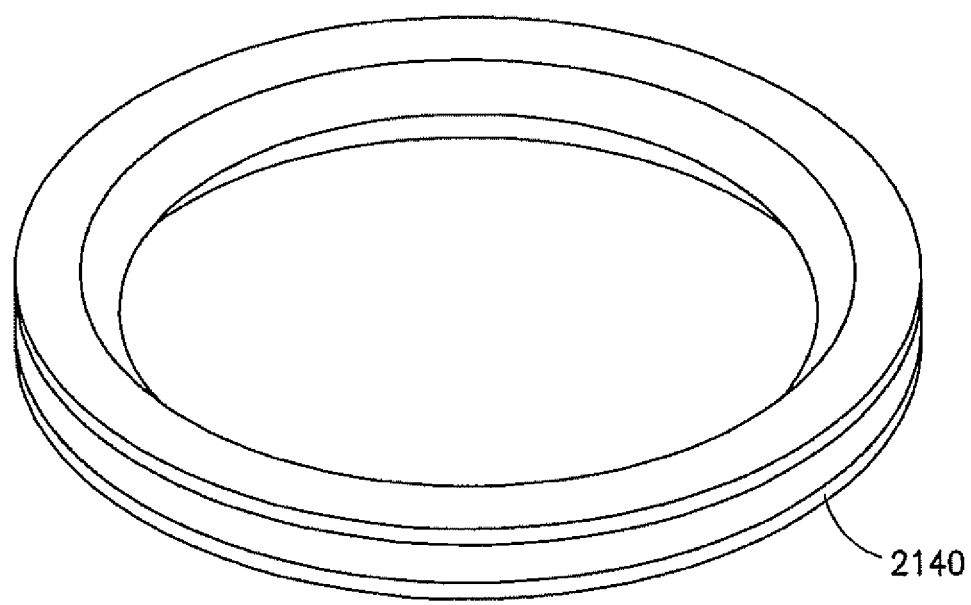
FIG. 35E is a perspective view of a stator core of the motor of FIG. 34.
Figure 40:
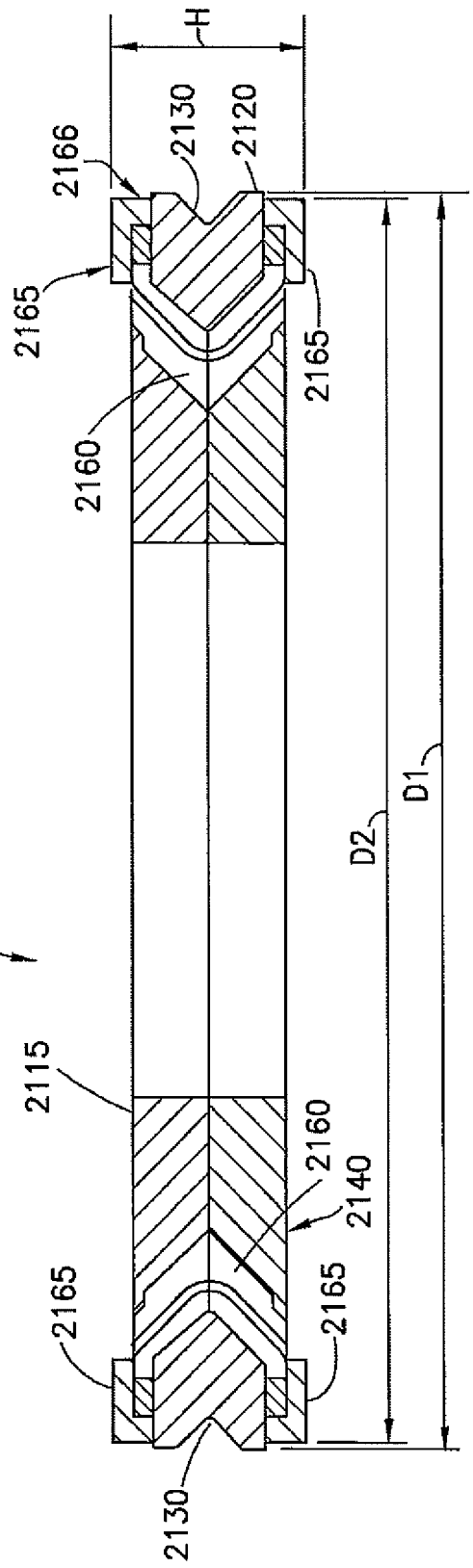
FIG. 40 is a schematic representation of the motor of FIG. 34 showing coil windings potted onto the stator.

As shown in FIGS. 35A through 35E, a stator assembly of the motor 2100 is shown generally at 2120. As can be seen in FIG. 35C, the stator assembly 2120 has a cutout 2130 at a back wall 2135 thereof (the back wall 2135 follows the profile of the coils) to allow for cooling lines or the like. The cutout 2130 may have any suitable shape and may be provided to reduce material consumption. The cutout 2130 may also be shaped for uniform flux distribution in one or more portions of the stator, for example, between the windings or poles or the like. As shown in FIG. 35E, a core 2140 of the stator assembly 2120 is made of a material with isotropic magnetic properties. FIGS. 35A, 35B, and 35C show the stator cross-section with winding coils 2150 overlaid on the stator core 2140. As shown in FIG. 40, the winding coils 2150 may be coupled to the core 2140 using a potting material 2165. An outer surface 2166 of the potting material 2165 may provide for winding leads and thermocouple leads. Overall, the motor 2100 has a diameter defined by a diameter of the stator D1 (diameter D2 to the outer surface 2166) and a height H.

FIG. 35D shows an individual winding coil 2150. Three winding coils, one of each phase, may have thermocouples embedded in them. In one exemplary embodiment, the stator assembly 2120 is Wye-wound with 4 flying leads (3 line leads and 1 center tap). Since the stator assembly 2120 may be axially clamped, the flying leads will exit the stator ring at the outer diameter through the outer surface 2166. The stator core 2140 and the winding coils 2150 may be potted using the potting material 2165 to provide one integrated "stator ring."

Figure 38:
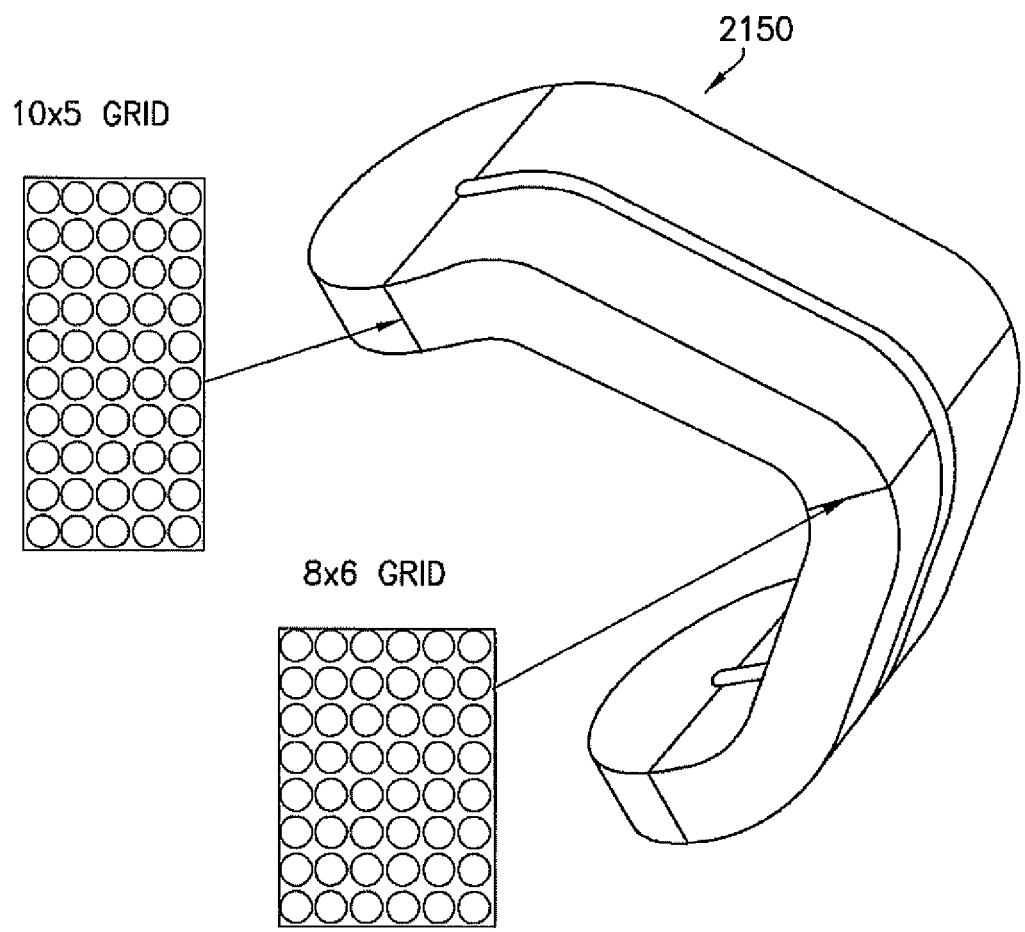

An individual winding coil 2150 is shown in FIG. 35D and FIG. 38. The winding coils 2150 each have a rectangular cross-section that varies along the coil length. The coil cross-section width increases with radius and its thickness decreases so that the area of cross-section remains more or less constant along its length. FIG. 38 illustrates this concept. The wire may be 25 AWG, with insulation layer that is stable up to 120 degrees C. or class H. The coil is alpha-wound with start and finish on the outside. In accordance with the varying cross-section of the coils, the wire grid changes from an 8×6 grid to a 10×5 grid along the length of the coil to make optimal use of space. The winding thickness decreases with increasing radius. The air gap clearance is thus reduced accordingly. Note that this is a suggested grid pattern. Alternate more efficient grid patterns that satisfy the spatial constraints of the windings may be employed.

Referring now to FIGS. 34 and 36, a rotor assembly of the motor 2100 is shown generally at 2115. To facilitate assembly, the rotor assembly 2115 is comprised of two substantially identical halves, one of which is shown in FIG. 36C, and each being magnetized in a different direction (or having a continuously varying magnetization direction in an individual pole). The rotor assembly 2115 may also be made of a single ring in which case the magnetization will vary continuously in two orthogonal directions (circumferentially and along the pole length). The rotor halves may be made of low-carbon steel such as 1018 steel. To prevent corrosion, the rotor halves may be powder coated.

Figure 39:
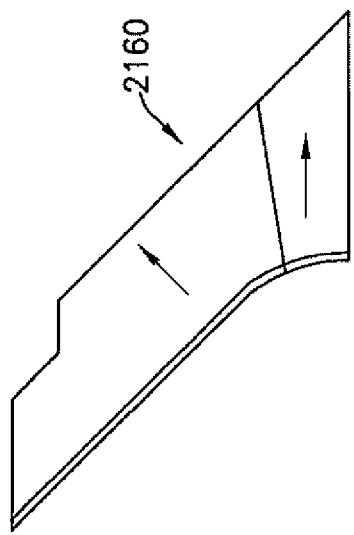
FIG. 39 is a side sectional view of a rotor pole of the motor of FIG. 34.

The rotor assembly 2115 has a plurality of rotor poles, each comprising two magnet pieces 2160. FIG. 36E shows one of the rotor halves and one of the magnets 2160 attached to it. There may be about 30 magnets 2160 in each rotor half, each magnetized in the radial direction. Neighboring magnets are magnetized in diametrically opposite directions. Rotor magnets 2160 may be made of Neodymium with a remanence flux density of approximately 1.3. A magnet with properties similar to N42UH or N42SH or equivalent may be used. The magnet shapes may be cut from a pre-magnetized block and finished by grinding. FIGS. 36D and 39 show the two magnet pieces that comprise a pole in one rotor half. Each piece may be magnetized as shown such that the magnetization is parallel, not radial. Upon grinding, the magnets 2160 may be coated to prevent corrosion.

As an alternative to the hybrid motor 2100, a radial flux motor may be employed. Such a motor may utilize a 3-phase brushless DC motor with slotless windings. In such a motor, the stator may be made of laminated silicon steel.

In one embodiment, a soft magnetic material comprises a plurality of iron-containing particles and an insulating layer on the iron-containing particles. The insulating layer comprises an oxide. The soft magnetic material is an aggregate of permeable micro-domains separated by insulation boundaries. The oxide of the insulating layer may comprise alumina. The iron-containing particles may have a body-centered cubic structure. The iron-containing particles may include silicon. The iron-containing particles may include at least one of aluminum, cobalt, nickel, and silicon.

In another embodiment, a soft magnetic material comprises a plurality of iron-containing particles, each of the iron-containing particles having an alumina layer disposed on the iron-containing particles. An arrangement of the iron-containing particles with the alumina layers forms a body-centered cubic lattice micro-structure that defines an aggregate of micro-domains having high permeability and low coercivity, the micro-domains being separated by insulation boundaries. The iron-containing particles may comprise about 89 wt. % iron, about 10 wt. % aluminum, and about 0.25 wt. % carbon. The iron-containing particles may include silicon. The iron-containing particles may include at least one of aluminum, cobalt, nickel, and silicon. The iron-containing particles may be defined by a core of a uniform composition of iron-containing and the alumina layer may comprise substantially pure aluminum oxide. The soft magnetic material may be defined by particles having a core of a uniform composition of iron-aluminum alloy, and the alumina layer may be defined by a concentration gradient consisting essentially of zero aluminum oxide at a surface of the core to essentially pure aluminum oxide at an outer surface of the alumina layer. The body-centered cubic lattice micro-structure may be substantially isotropic in an XZ, YZ, and XY plane.

In one embodiment of making the soft magnetic material, a method comprises providing an iron-aluminum alloy particle; heating the iron-aluminum alloy particle to a temperature that is below the melting point of the iron-aluminum alloy particle but sufficiently high enough to soften the iron-aluminum alloy particle; thermally spraying the iron-aluminum alloy particle; causing the iron-aluminum alloy particle to oxidize; depositing the iron-aluminum alloy particle onto a substrate; subsequently building up a bulk quantity of the iron-aluminum alloy particle on the substrate and on successive layers of the iron-aluminum alloy particle deposited on the substrate; and heat treating the bulk quantity of the iron-aluminum alloy particles. The iron-aluminum alloy particle may comprise an alloy having a composition of about 89 wt. % iron, about 10 wt. % aluminum, and about 0.25 wt. % carbon. Heating the iron-aluminum alloy particle may comprise heating to less than about 1450 degrees C. Thermally spraying the iron-aluminum alloy particle may comprise gas-atomizing the iron-aluminum alloy particle in a carrier gas. Thermally spraying the iron-aluminum alloy particle may comprise using a high velocity air fuel system in which a carrier gas operates at about 900 degrees C. to about 1200 degrees C. to gas-atomize the iron-aluminum alloy particle. Thermally spraying the iron-aluminum alloy particle may comprise using a high velocity oxy fuel system operating at about 1400 degrees C. to about 1600 degrees C. to deposit the iron-aluminum alloy particle as a thin coating. Thermally spraying the iron-aluminum alloy particle may comprise using a low energy plasma spray. Causing the iron-aluminum alloy particle to oxidize may comprise forming alumina on an outer surface of the iron-aluminum alloy particle.

In one embodiment, a motor comprises a stator comprising at least one core; a coil wound on the at least one core of the stator; a rotor having a rotor pole and being rotatably mounted relative to the stator; and at least one magnet disposed between the rotor and the stator. The at least one core comprises a composite material defined by iron-containing particles having an alumina layer disposed thereon. The rotor pole and the stator in conjunction with the at least one magnet may direct magnetic flux between the rotor and the stator in directions that are outside of a single plane in three dimensions. The stator may be configured to approximate a cross sectional shape that defines surfaces corresponding to a cross sectional shape of the at least one magnet. A conical air gap may be located between the stator and the at least one magnet, wherein the conical air gap allows flux flow along radial, axial, and circumferential directions of the motor. The rotor pole may be extended in the direction of the stator to produce the conical air gap between the stator and the at least one magnet. The coil may be tapered in the radial direction. The at least one core may be formed on a surface of the stator to form a slotless stator. The rotor may comprise a first rotor portion and a second rotor portion. The stator may comprise at least a first stator portion and a second stator portion.

In another embodiment, a motor comprises a slotless stator comprising at least one core formed of a soft magnetic composite material and coils disposed on the at least one core; a rotor rotatably mounted relative to the slotless stator; and at least one magnet mounted on the rotor between the rotor and the slotless stator. The soft magnetic composite material may comprise particles containing at least iron and having insulating outer surfaces comprising alumina. The particles containing at least iron may comprise an iron-aluminum alloy. The motor may include an air gap between the slotless stator and the at least one magnet, the air gap being conical in cross sectional shape. The slotless stator may comprise a wall that forms a continuous surface on which the at least one core is formed. The soft magnetic material may comprise about 89 wt. % iron, about 10 wt. % aluminum, and about 0.25 wt. % carbon. The soft magnetic material may further comprise silicon.

In another embodiment, a slotless flux motor comprises a stator defined by a continuous surface at which at least one core is disposed and a winding disposed on the at least one core; a rotor having a rotor pole and being rotatably mounted in the stator; and at least one magnet mounted between the stator and the rotor pole. A conical air gap is defined between the stator and the at least one magnet, wherein the conical air gap allows flux flow along radial, axial, and circumferential directions of the motor. The at least one core comprises a soft magnetic composite material defined by iron-containing particles encapsulated in alumina. The iron-containing particles may comprise an iron-aluminum alloy that may comprise about 89 wt. % iron, about 10 wt. % aluminum, and about 0.25 wt. % carbon. The iron-containing particles may further comprise silicon. The iron-containing particles of the soft magnetic composite material may include one or more of iron-cobalt alloy, iron-nickel alloy, and iron-silicon alloy. The at least one core may be self-supported on an inner-facing surface of the stator and have a horizontal V-shaped cross section.

One embodiment of a composition comprises a plurality of iron-containing particles and an insulating layer on the iron-containing particles. The iron-containing particles define an aggregate of permeable micro-domains separated by insulation boundaries. The insulating layer may comprise an oxide. The oxide may be aluminum oxide. The iron-containing particles may have a body-centered cubic structure. The body-centered cubic structure may be substantially isotropic in three dimensions. The iron-containing particles may include at least one of aluminum, cobalt, nickel, and silicon. The aggregate of permeable micro-domains may have a high permeability and a low coercivity. The iron-containing particles may comprise about 89 wt. % iron, about 10 wt. % aluminum, and about 0.25 wt. % carbon. The insulating layer may be defined by an oxide layer having a concentration gradient. The iron-containing particles and the insulating layer may define a soft magnetic material.

One embodiment of a method comprises heating an iron-aluminum alloy particle; thermally spraying the iron-aluminum particle; causing the iron-aluminum particle to oxidize; and depositing the oxidized iron-aluminum particle on a substrate. The iron-aluminum alloy particle may comprise about 89 wt. % iron, about 10 wt. % aluminum, and about 0.25 wt. % carbon. Heating the iron-aluminum alloy particle may comprise heating to less than about 1450 degrees C. Thermally spraying the iron-aluminum alloy particle may comprise spraying using a high velocity air fuel system, a high velocity oxy fuel system, or a low energy plasma spray. Causing the iron-aluminum particle to oxidize may comprise forming alumina on an outer surface of the iron-aluminum alloy particle. Depositing the oxidized iron-aluminum particle on a substrate may comprise forming a soft magnetic material.

One embodiment of an apparatus comprises a stator having at least one core; a coil on the at least one core; a rotor rotatably mounted in the stator; and at least one magnet mounted between the stator and the rotor. The at least one core comprises a composition defined by iron-containing particles having an oxide layer disposed thereon. The stator may be slotless. The magnetic flux may be directed between the rotor and the stator in three dimensions. The apparatus may further comprise a rotor pole defined by an outer-facing surface of the rotor and a stator pole defined by an inner-facing surface of the stator, wherein the at least one magnet is mounted on the outer-facing surface of the rotor. A cross sectional shape of the at least one magnet may define surfaces that correspond to a cross sectional shape of the inner-facing surface of the stator. The at least one magnet and the inner-facing surface of the rotor may define a conical air gap between the rotor and the stator. The conical air gap may allow flux flow along radial, axial, and circumferential directions of the apparatus. The composition defined by iron-containing particles may have an oxide layer comprises a soft magnetic material. The iron-containing particles may comprise an alloy having about 89 wt. % iron, about 10 wt. % aluminum, and about 0.25 wt. % carbon. The oxide layer may be aluminum oxide. The composition may further comprise silicon. The composition may comprise a concentration gradient in the oxide layer.

Referring to FIGS. 41 through 45, various exemplary aspects of the manufacture of the soft magnetic material 10 are described in the following Examples.

Example 1

In the deposition processes 20 described herein, due to its higher deposition efficiency, the HVAF system was selected to produce material samples for characterization of the insulation boundaries and electromagnetic properties. Two different HVAF settings were selected for assessing the material properties. The first setting corresponded to a fuel-air mixture at the stoichiometric ratio. The second setting corresponded to a leaner mixture resulting in a lower carrier gas temperature. The second setting produced a microstructure with a lower percentage of fully molten particles. A subset of the samples produced by both settings was also subjected to a heat treatment process in which the samples were heated to and held at a temperature of 1050 degrees C. (50 C degrees above the eutectic temperature) for 4 hours in a reducing environment, and then slowly cooled to room temperature to produce samples 1A and 2A, respectively, as shown in Table 1 (below). The samples were produced in the form of thin rectangular specimens as well as rings of about 2 inches in diameter and about 0.25 inches thickness. The thin rectangles were used to study the microstructure under an electron microscope as well as in an X-ray diffraction system. The rings were used to characterize the magnetic properties per the ASTM A773 standard.

Figure 41:
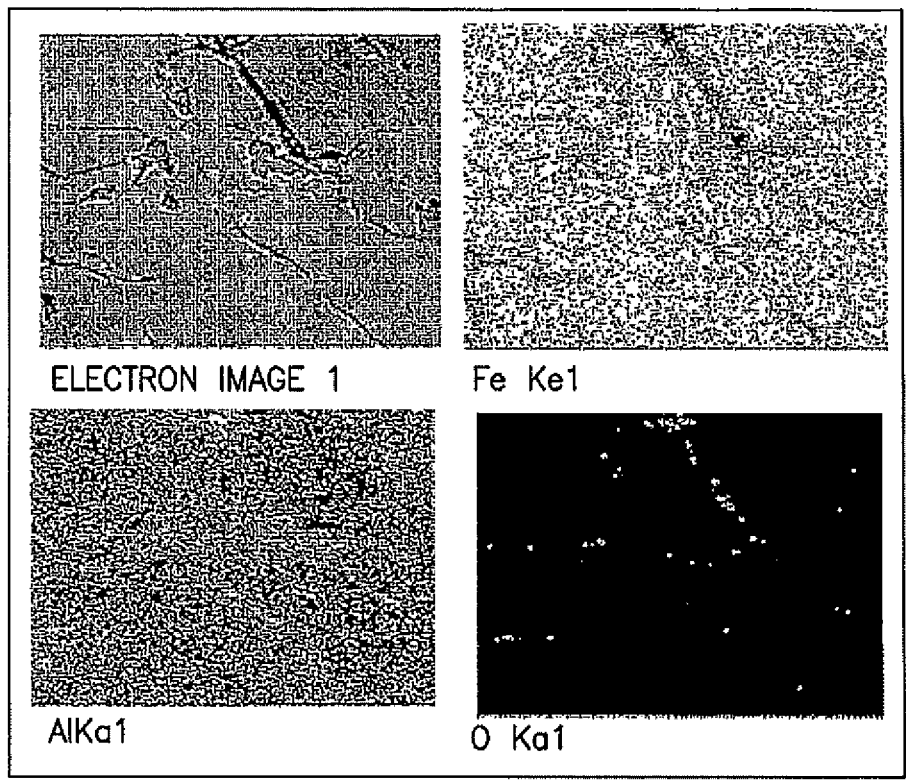
FIG. 41 is an electron microscope image of a cross section of the soft magnetic material.
Figure 42:
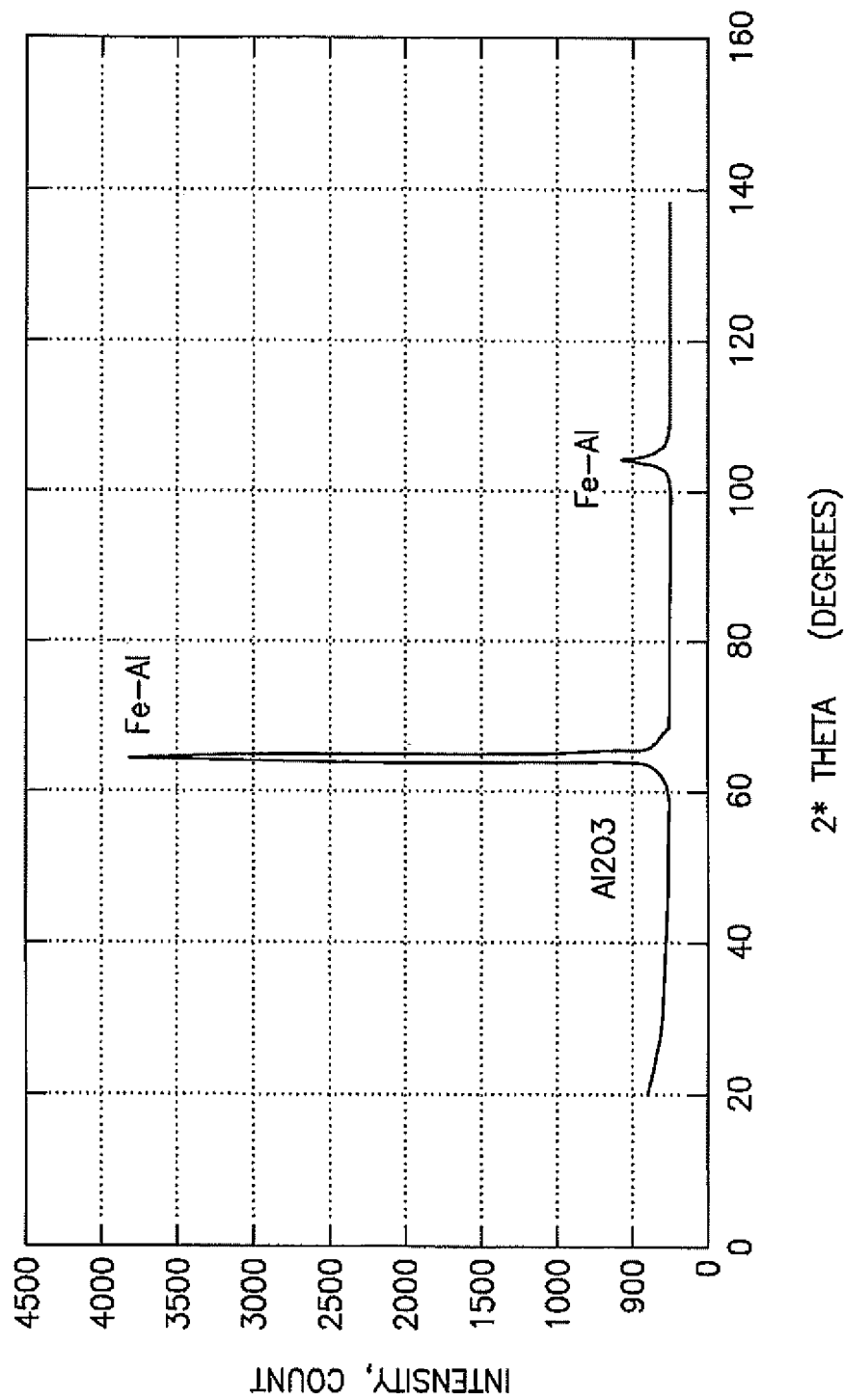
FIG. 42 is a graphical representation of an X-ray diffraction spectrum of the soft magnetic material.
Figure 44A:
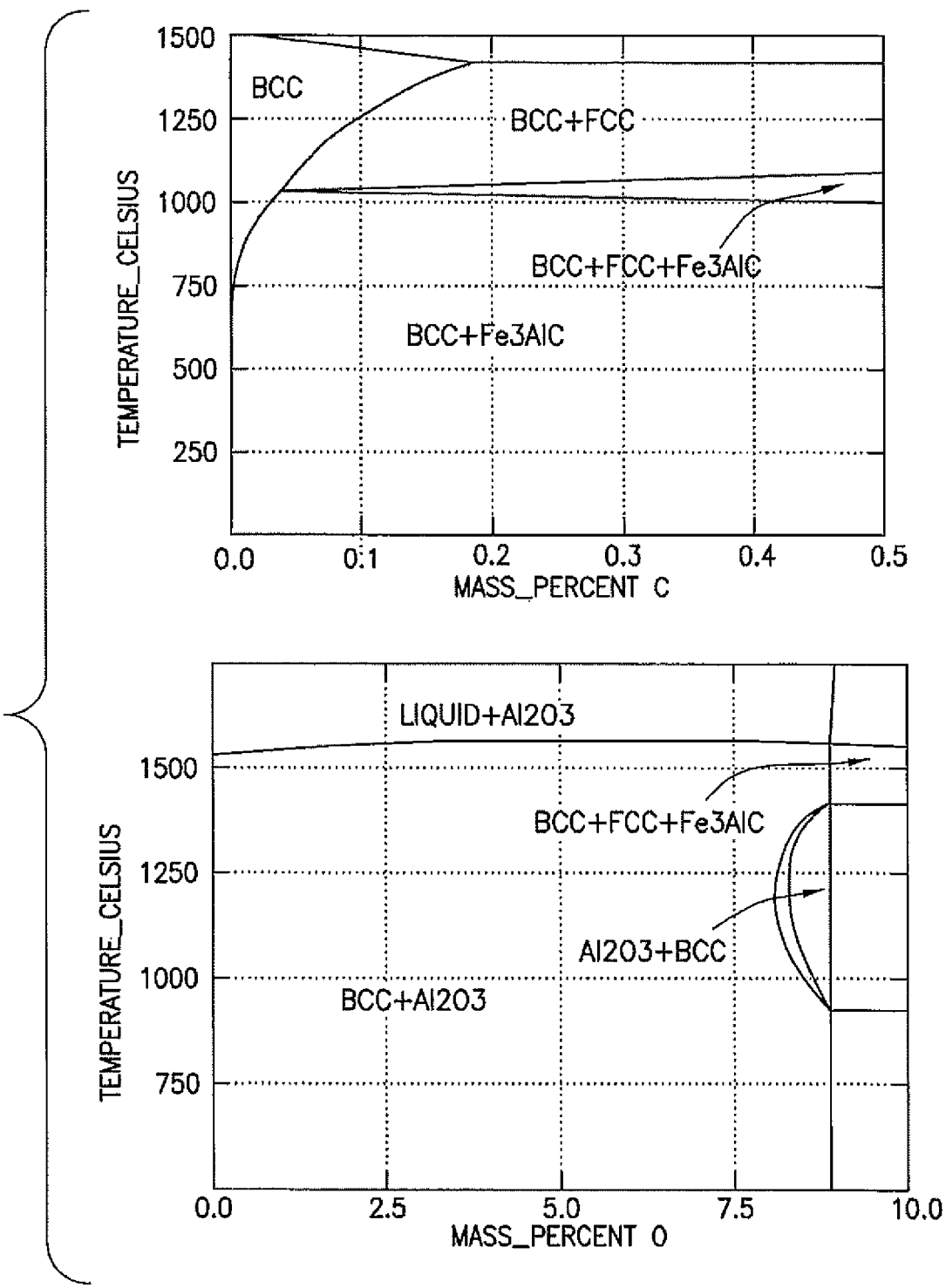
FIGS. 44A and 44B are phase diagrams of Fe—Al—Si alloy and Fe—Al alloy, respectively.
Figure 44B:
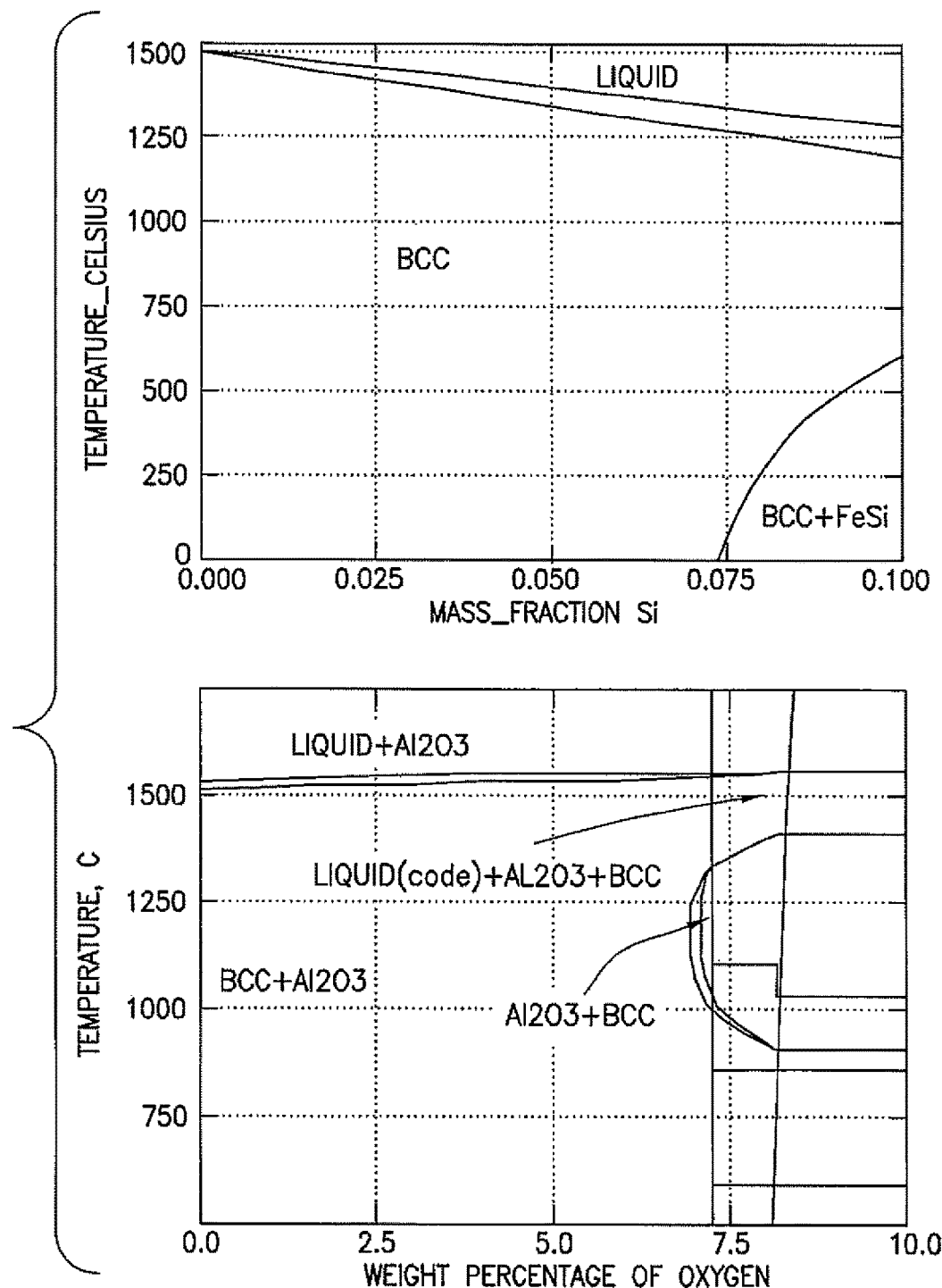

The cross-sections of the thin rectangular samples were polished, etched, and observed under the electron microscope as well as an Energy Dispersive Spectroscopy (EDS) system to produce an elemental map across the cross-section. FIG. 41 shows a cross-section of the sample 2A (Electron Image 1) as well as elemental maps corresponding to the elements iron, aluminum, and oxygen. Oxygen atoms are primarily concentrated at the particle boundaries, and iron atoms are absent at the particle boundaries. There is a larger concentration of aluminum atoms at the boundaries than in the particle interior, indicating that the particle boundaries are composed of alumina, which is an excellent electrical insulator, and the particle interior is composed of Fe—Al alloy, which is a desirable soft-magnetic material. In support of the above finding, FIG. 42 shows an X-ray diffraction spectrum of the material, confirming the presence of alumina along with the Fe—Al alloy.

Thus, an insulation layer composed of alumina may be stable at high temperatures (unlike an insulation layer made of iron-oxide). From the electron microscope images, the thickness of the insulation boundaries was estimated to be in the range of 100 nm to about 500 nm.

Measurements of magnetic properties were also performed per the ASTM A773 standard on ring-shaped samples shown in FIG. 41. The following properties were measured on samples 1, 1A, 2 and 2A: magnetization curves (B-H curves) up to a magnetizing field of 40 kA/m, flux density at 40 kA/m, $B_{sat@40kA/m}$, coercivity, $H_c$, magnetizing field at a flux density of 1T, $H_{1T}$, relative permeability at zero flux density, $m_r$, DC energy loss (due to hysteresis), and AC power loss at 60 Hz and 400 Hz oscillations of the magnetic flux density. Table 1 shows the results for the samples.

TABLE 1

Measured magnetic properties of ring samples 1, 2, 1A, and 2A, compared against a phase-1 sample (shown as P1)

| Sample | $B_{sat@40kA/m}$ (T) | $H_c$ (A/m) | $H_{req.1T}$ (A/m) | $\mu_r$ | DC energy loss per cycle (J/kg) | AC power loss (W/kg) 60 Hz | AC power loss (W/kg) 400 Hz |
|---|---|---|---|---|---|---|---|
| P1 | 0.9 | 700 | 41000 | 459 | 2237 | 39 | 685 |
| 1 | 1.31 | 3650 | 15400 | 230 | 9500 | 105.6 | 835 |
| 2 | 1.28 | 3500 | 17700 | 207 | 9725 | 93.5 | 766 |
| 1A | 1.42 | 420 | 2700 | 2500 | 1600 | 26.5 | 657 |
| 2A | 1.35 | 615 | 8800 | 830 | 2100 | 24.8 | 306 |

For use of soft magnetic materials as disclosed herein in an electric motor, the saturation magnetic flux density and relative permeability should be maximized, and the required magnetizing field, coercivity, DC energy loss, and AC power loss should be minimized. The results in Table 1 show that sample 1A has the highest saturation flux density, initial permeability, and lowest DC energy loss, while sample 2A has the lowest AC power loss. The annealed samples have higher permeability and saturation flux density and a lower coercivity than their un-annealed counterparts. Annealing reduces internal stress and dislocation density, and increases grain size, thereby reducing the resistance to movement of magnetic domain boundaries. Since samples 1 and 1A correspond to a higher combustion temperature than samples 2 and 2A they have a higher percentage of fully melted particles coupled with a lower porosity. As a result, sample 1A has a higher permeability and lower coercivity than sample 2A. Sample 2A, on the other hand, has lower eddy currents and a corresponding lower AC power loss due to its lower percentage of fully molten particles.

Since the insulation layers are composed of alumina, which is stable at high temperatures, heat treatment is very effective in improving saturation flux density and permeability as well as in decreasing coercivity without compromising on the insulation layers and eddy current losses. With regard to samples 1A and 2A, these samples have more desirable magnetic properties than the sample designated as P1 in Table 1.

Further improvements in magnetic properties may be achievable by changes to process parameters as well as particle chemistry and size. For example, there may be an optimal set of process parameters that will result in a combustion temperature that lies in between those of samples 1 and 2, leading to a lower percentage of fully melted particles and, at the same time, keeping the porosity at negligible levels. In addition, the use of powder with larger sized particles may result in lower hysteresis losses as this will facilitate free movement of magnetic domain boundaries. A reduction in carbon content in the alloy to under 0.05% will also result in a significant decrease in carbide impurities contributing to lower hysteresis losses. Also, there is likely an optimal lower percentage of aluminum in the Fe—Al alloy that will result in an increase in the saturation flux density without compromising the integrity of the inter-particle insulation.

Example 2

The particle size and shape previously considered was in the range of 15-45 microns in size and spherical in shape.

Magnetic materials are comprised of aggregates of magnetic micro-domains which grow in the direction of the applied magnetic field. When the material is comprised of aggregates of particles, the presence of insulation layers may limit the movement of domain boundaries to the particle boundaries, thereby limiting the effective permeability and saturation flux density. In addition, simulations of material properties may show that the ideal ration of particle dimensions to boundary dimensions is 1000:1. Since insulation layers previously obtained had a thickness of 0.1-0.5 microns, it is generally desirable for particle sizes to be in the 100-200 micron range.

In the thermal spray processes using HVAF and HVOF, particle sizes are typically in the 15-45 micron range as this size allows the particles to acquire sufficient velocity and temperature to form a dense solid deposit. In order to spray larger sized particles, certain process modifications are needed in order to increase the energy and enthalpy input to the particles.

Figure 43:
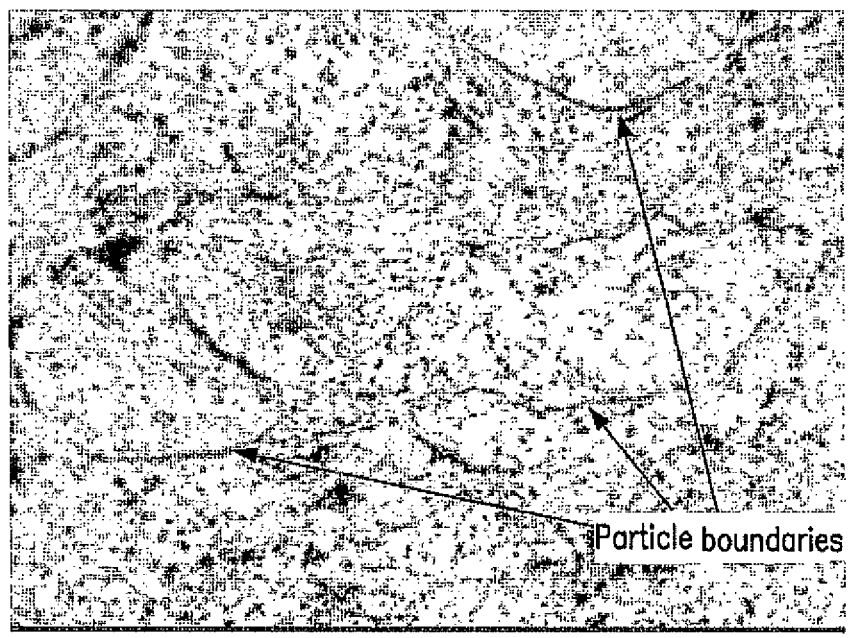
FIG. 43 is an image of a microstructure of sprayed particles of a nickel-aluminum alloy.

In order to determine the feasibility of spraying larger sized particles, experiments were conducted with a thermal spray powder (Metco-450NS, available from Oerlikon Metco, of Switzerland), which is an alloy of 95% nickel and 5% aluminum of a larger size range of 45-90 microns. The thermal energy input to the particles was controlled by selecting the combustion chamber and the mechanical energy input was controlled by selecting the right exit diameter of the converging diverging nozzle. After some experimentation, a densely packed layer of the deposited particles was obtained. FIG. 43 shows the microstructure of the resulting material. The material layers at the bottom were sprayed with a smaller combustion chamber and the layers at the top were sprayed using the larger combustion chamber. The velocity of the exiting particles was controlled by selecting an appropriate size of converging-diverging nozzle.

Although carbon is added to assist in the atomization process, carbon does not form a solid solution with iron and instead forms carbide precipitates which obstruct the movement of magnetic domain boundaries, thereby lowering permeability and saturation flux density. Therefore, the carbon was replaced with silicon (which improves magnetic permeability) to enable atomization. At concentrations below 7.5%, silicon formed a solid solution with a BCC lattice structure and hence did not form precipitates. In addition, at low concentrations, silicon did not inhibit the formation of alumina at the temperatures below 1500 C, as indicated in the phase diagrams of FIGS. 44A and 44B, which show an isopleth of Fe-9% Al—Si alloy showing a BCC structure up to 1400 degrees C. (FIG. 44A(a)), an isopleth of Fe-9% Al-1% Si—O showing preference for the formation of alumina (FIG. 44A(b)), an isopleth of Fe-10% Al—C showing a BCC structure up to 1000 degrees C. (FIG. 44B(a)), and an isopleth of Fe-10% Al—O showing preference for the formation of alumina (FIG. 44B(b)). After such consideration, an alloy composition of Fe-9% Al-1% Si was selected for spray forming tests. The powder with the above concentration was successfully produced by a gas atomization process, and the concentration of carbon was reduced to 0.04%. The addition of silicon reduced the melting point of the alloy marginally. This was expected to be beneficial in the spraying of larger sized particles.

The presence of aluminum as an alloying element facilitated the formation of insulation layers. However, it also reduced the saturation flux density of the material. At 10% by weight, the saturation flux density of the alloy was reduced by 20% from that of pure iron. It was thus determined to be desirable to have a particle chemical composition that is satisfies the following conditions:

(a) Sufficient concentration of aluminum at the surface to form a contiguous layer of aluminum oxide at the surface and at the same time have less or no aluminum beneath the surface in order to ensure a high saturation flux density; and (b) The aluminum at the surface should be present in the form of a solid solution of iron and aluminum rather than elemental aluminum. This is because elemental aluminum has a melting point lower than the operating temperature of the thermal spray. In addition, un-oxidized elemental aluminum will form an undesirable electrically conducting boundary around the particle domains.

Example 3

To obtain approximate performance characteristics of the slotless motor 2000, an analytical model was developed and implemented using a computer modelling program. The model was used to obtain a desired set of motor parameters such as number of stator and rotor poles, number of winding turns, and approximate magnet and stator tooth dimensions. Based on the model, a hybrid field motor conforming to the dimensions in Table 2, with 20 rotor poles, will have a 24% higher motor constant than a conventional motor designed to the same constraints.

TABLE 2

| Motor dimensional specification | |
| --- | --- |
| Stator outer diameter | 172 mm |
| Air gap (radial) | 1 mm |
| Rotor bore diameter | 100 mm |
| Motor height (including end turns) | 21 mm |

The analytical model, however, has limitations as it does not account for nonlinearity in the B-H curve of the soft magnetic material and flux saturation. For the same reason, the analytical model is not sufficient to estimate motor constant values for other configurations. In order to obtain a more precise solution, the motors of other configurations were analyzed with finite element analysis techniques. As a first step, precise geometric models of the motors have been developed, and the finite element analysis of the motors was performed.

Optimization criteria in the motor design process included (a) maximization of motor efficiency under static and constant velocity conditions and (b) maximization of torque capacity under constant velocity operating conditions.

Figure 45:
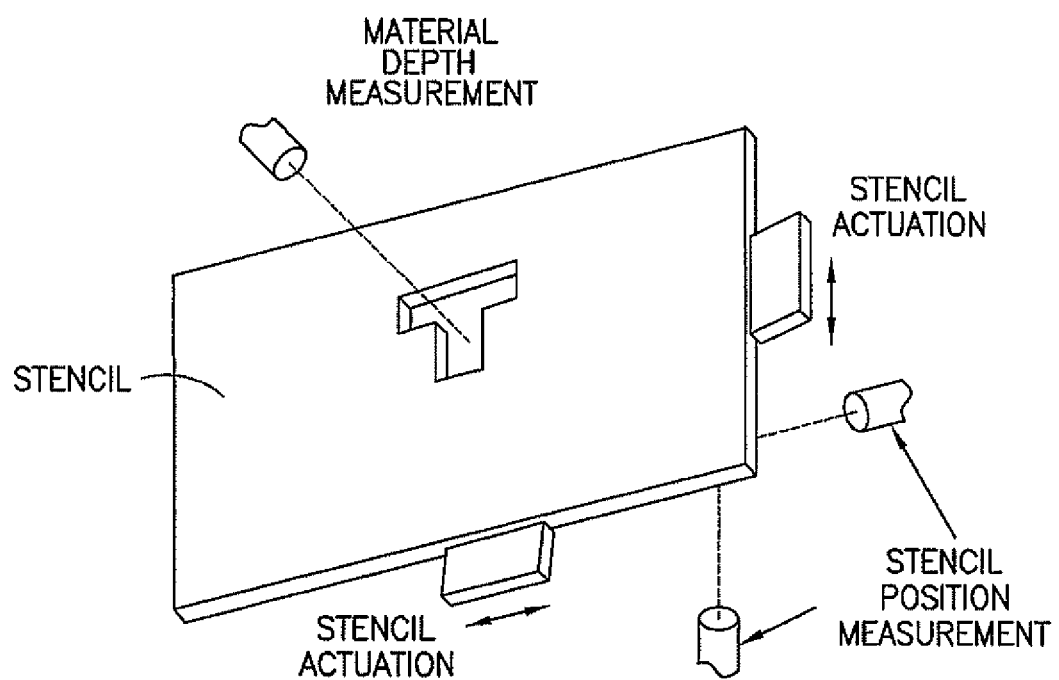
FIG. 45 is a schematic representation of a mask and stencil system used to form a stator incorporating the soft magnetic material.

Near-net shape manufacturing was used to form the parts of the motor 2000. A thermal process was used to spray ring-shaped parts that were used to measure magnetic properties per the ASTM A773 standards. The strategy used in obtaining the ring-shaped sample was modified to obtain the stator geometries required to fabricate the slotless and coreless motor shown in FIG. 33. The stator geometries in the other motors utilized a strategy that involved the use of masks or stencils and a controlled movement of the stencil (as shown in FIG. 45) in response to measurements of the material deposition depth. This required measurement systems to measure deposited material thickness and a stencil actuation mechanism that was coordinated with a robot controlling the spray system. A computer operated as a master controller that performed the task of coordination between the measurement systems, the stencil actuation mechanism, and the spray system.

Stencils and masks of complex shapes were employed in the fabrication of molds which were achieved through 3-D printing. The 3-D printed molds were used to fabricate a prototype of a stator. This prototyping capability facilitated scrutiny of the stator design particularly with regard to processes that utilized thermal spraying techniques.

Figure 46A:
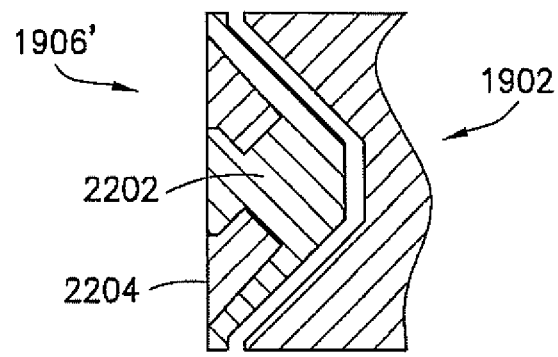
FIGS. 46A through 46C are schematic representations of an exemplary embodiment of a motor having a slotted stator.
Figure 46B:
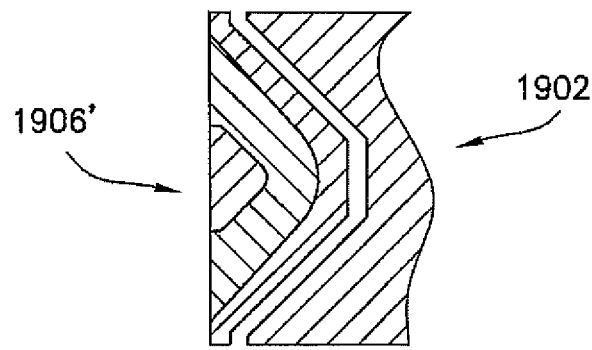
Figure 46C:
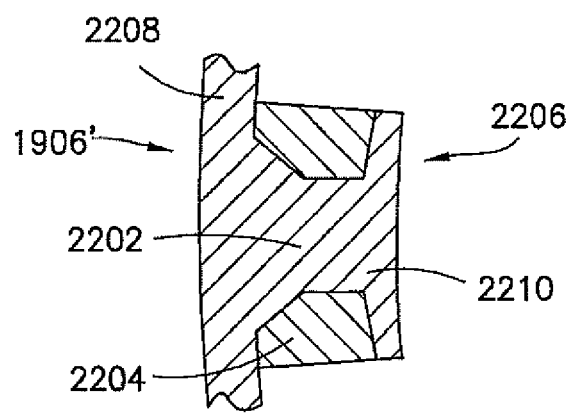

Referring now to FIGS. 46A through 46C, there is shown an alternate aspect of the motor shown in FIG. 32. In the embodiment shown, the motor is a slotted motor as opposed to a slotless motor shown in FIG. 32. Stator 1906' may have applicable features similar to stator 1906 and is provided having poles or teeth where FIG. 46O shows a section view of tooth 2202 and winding 2204 in a view axial with respect to the motor. FIG. 46A shows a section view of tooth 2202 and winding 2204 in a view tangential with respect to the stator and passing through the center of tooth 2202. FIG. 46B shows a section view of tooth 2202 and winding 2204 in a view tangential with respect to the stator and passing offset from the center of tooth 2202 and through tooth 2202 and winding 2204. Tooth 2202 is shown having face 2206 and ring portion 2208 connected by core portion 2210. Here, stator 1906' is constructed such that the cross-section of winding 2204 remains substantially the same and the cross-section of tooth 2202 remains substantially the same along the flux path. Face portion 2206 is shown having conical surfaces interfacing with the magnet portions of rotor 1902 and opposing surfaces interfacing with winding 2204. Core portion 2210 extends from face portion 2206 to ring portion 2208 and forms the structure about which the wires of winding 2204 are wound. Here, core portion 2210 may have a non-uniform cross section, for example, as shown in FIGS. 46A and 46C such that the cross-section of winding 2204 remains substantially the same and the cross-section of tooth 2202 remains substantially the same along the flux path. Ring portion 2208 may have a triangular cross section as shown and may provide adjoining structure and a flux path for adjoining teeth. Although stator 1906' was described with respect to the geometry shown, any suitable geometry may be provided. Stator 1906' or any other stator as described may be provided with salient windings as shown or alternately with distributed windings. Similarly, any of the stators described may have skewed poles or any suitable geometry poles. Similarly, any of the stators described may be fabricated with any suitable soft magnetic material, for example as disclosed, or other suitable material, for example, sintered, machined, laminated, or any suitable material.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. A slotless flux motor, comprising:
    a stator defined by a continuous surface at which at least one core is disposed and a winding disposed on the at least one core, an outer wall circumferentially positioned around the at least one core, an edge of the outer wall extending radially beyond an outer edge of the winding disposed on the at least one core and between an upper edge of winding and a lower edge of the winding;
    a rotor having a rotor pole and being rotatably mounted in the stator; and
    at least one magnet mounted between the stator and the rotor pole;
    wherein a V-shaped air gap is defined between the stator pole and the at least one magnet, wherein the V-shaped air gap includes a spacer and allows flux flow along radial, axial, and circumferential directions of the motor; and
    wherein a separation plane normal to an axis of rotation extends through the stator and the rotor, and wherein the at least one magnet and the V-shaped air gap are together configured to allow flux flow between the stator and the rotor in a three-dimensional flux pattern such that the flux flow does not cross the separation plane.

2. The slotless flux motor of claim 1, wherein the at least one core is self-supported on an inner-facing surface of the stator and has a horizontal V-shaped cross section.

3. The slotless flux motor of claim 1, wherein an outer-facing surface at a back wall of the stator has a cutout.

4. The slotless flux motor of claim 1, wherein a cutout at an outer-facing surface at a back wall of the stator has a uniform cross sectional shape to provide uniform flux distribution in one or more portions of the stator.

5. The slotless flux motor of claim 1, wherein the at least one core comprises a soft magnetic composite material defined by iron-containing particles encapsulated in alumina.

6. The slotless flux motor of claim 1, wherein the rotor pole and the stator in conjunction with the at least one magnet directs magnetic flux between the rotor and the stator in directions that are outside of a single plane in three dimensions.

7. The slotless flux motor of claim 1, wherein the stator is configured to approximate a cross sectional shape that defines surfaces corresponding to a cross sectional shape of the at least one magnet.

8. The slotless flux motor of claim 1, wherein the rotor pole is extended in the direction of the stator to produce the V-shaped air gap between the stator and the at least one magnet.

9. The slotless flux motor of claim 1, wherein the at least one magnet comprises two magnets, each of the two magnets being magnetized in different directions.

10. The slotless flux motor of claim 1, wherein the rotor comprises a first rotor half and a second rotor half, and wherein the motor is configured to operate based on rotation of either the first rotor half or the second rotor half.

11. A slotless flux motor, comprising:
    a stator defined by a continuous wall having an upper edge and a lower edge and a soft magnetic core defined directly on an inner-facing surface of the continuous wall between the upper edge and the lower edge so as to be flush with the upper edge and the lower edge of the continuous wall, and a potted winding disposed on an inner-facing surface of the soft magnetic core, the outer-facing surface terminating beyond an outermost edge of the winding;
    a rotor having a rotor pole and being rotatably mounted in the stator; and
    at least one magnet mounted between the stator and the rotor pole;
    wherein a V-shaped air gap is defined between the stator and the at least one magnet, wherein the V-shaped air gap includes a spacer and allows flux flow along radial, axial, and circumferential directions of the motor; and wherein a separation plane normal to an axis of rotation extends through the stator and the rotor, and wherein the at least one magnet and the V-shaped air gap are together configured to allow flux flow between the stator and the rotor in a three-dimensional flux pattern such that the flux flow does not cross the separation plane.

12. The slotless flux motor of claim 11, wherein the soft magnetic core has a V-shaped cross section.

13. The slotless flux motor of claim 11, wherein the rotor comprises a first rotor half and a second rotor half, and wherein the motor is configured to operate based on rotation of either the first rotor half or the second rotor half.

14. The slotless flux motor of claim 11, wherein the soft magnetic core comprises a soft magnetic composite material defined by iron-containing particles encapsulated in alumina.

15. The slotless flux motor of claim 11, wherein the rotor pole and the stator in conjunction with the at least one magnet directs magnetic flux between the rotor and the stator in directions that are outside of a single plane in three dimensions.

16. The slotless flux motor of claim 11, wherein the stator is configured to approximate a cross sectional shape that defines surfaces corresponding to a cross sectional shape of the at least one magnet.

17. The slotless flux motor of claim 11, wherein the rotor pole is extended in the direction of the stator to produce the V-shaped air gap between the stator and the at least one magnet.

18. The slotless flux motor of claim 11, wherein the at least one magnet comprises two magnets, each of the two magnets being magnetized in different directions.

* * * * *